United States Patent
Hedayat et al.

(10) Patent No.: US 10,219,271 B1
(45) Date of Patent: Feb. 26, 2019

(54) BANDWIDTH ALLOCATION SIGNALLING

(71) Applicant: NEWRACOM, INC., Irvine, CA (US)

(72) Inventors: Ahmad Reza Hedayat, Aliso Viejo, CA (US); Amin Jafarian, Princeton, NJ (US)

(73) Assignee: NEWRACOM, INC., Irvine, CA (US)

( * ) Notice: Subject to any disclaimer, the term of this patent is extended or adjusted under 35 U.S.C. 154(b) by 208 days.

(21) Appl. No.: 15/201,275

(22) Filed: Jul. 1, 2016

Related U.S. Application Data

(60) Provisional application No. 62/187,774, filed on Jul. 1, 2015, provisional application No. 62/190,635, filed on Jul. 9, 2015, provisional application No. 62/214,878, filed on Sep. 4, 2015, provisional application No. 62/243,575, filed on Oct. 19, 2015, provisional application No. 62/247,123, filed on Oct. 27, 2015, provisional application No. 62/217,916, filed on Sep. 13, 2015.

(51) Int. Cl.
*H04L 5/00* (2006.01)
*H04W 72/04* (2009.01)

(52) U.S. Cl.
CPC ....... *H04W 72/0446* (2013.01); *H04L 5/0055* (2013.01)

(58) Field of Classification Search
CPC ............................ H04W 84/12; H04W 72/044
See application file for complete search history.

(56) References Cited

U.S. PATENT DOCUMENTS

2016/0353322 A1* 12/2016 Li ............................. H04L 5/00
2017/0223665 A1* 8/2017 Chun .................... H04W 72/04

OTHER PUBLICATIONS

"Part 11: Wireless LAN Medium Access Control (MAC) and Physical Layer (PHY) Specifications", IEEE Standards 802.11™—2012 (Revision of IEEE Standard 802.11-2007), Mar. 29, 2012, pp. 1-2695, IEEE (The Institute of Electrical and Electronic Engineers, Inc.), New York, NY, USA.
"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™—2013, 2013, pp. 1-395, IEEE (The Institute of Electrical and Electronic Engineers, Inc.), New York, NY, USA.

(Continued)

*Primary Examiner* — Kevin C. Harper

(57) ABSTRACT

An Access Point (AP) may allocate Resource Units (RUs) of a bandwidth of a Multi-User (MU) frame, including determining that an RU is not allocated to a station; determine a value of an RU Allocation Subfield according to the allocation of the RUs, the value of the RU Allocation Subfield indicating that the RU is not allocated; and generate a High Efficiency Signal B (HE-SIG-B) field including the RU Allocation Subfield in a common info field thereof. An AP may perform an MU transmission by transmitting a length to a station; determining identifiers each having the length; and transmitting an HE-SIG-B field including one of the identifiers to the station after transmitting the length. An AP may perform an MU transmission by allocating RUs and responding to receiving a frame from a station by transmitting a Multi-User Acknowledgement (MU-ACK) frame that includes information on the allocation of the RUs.

7 Claims, 22 Drawing Sheets

(56) References Cited

OTHER PUBLICATIONS

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

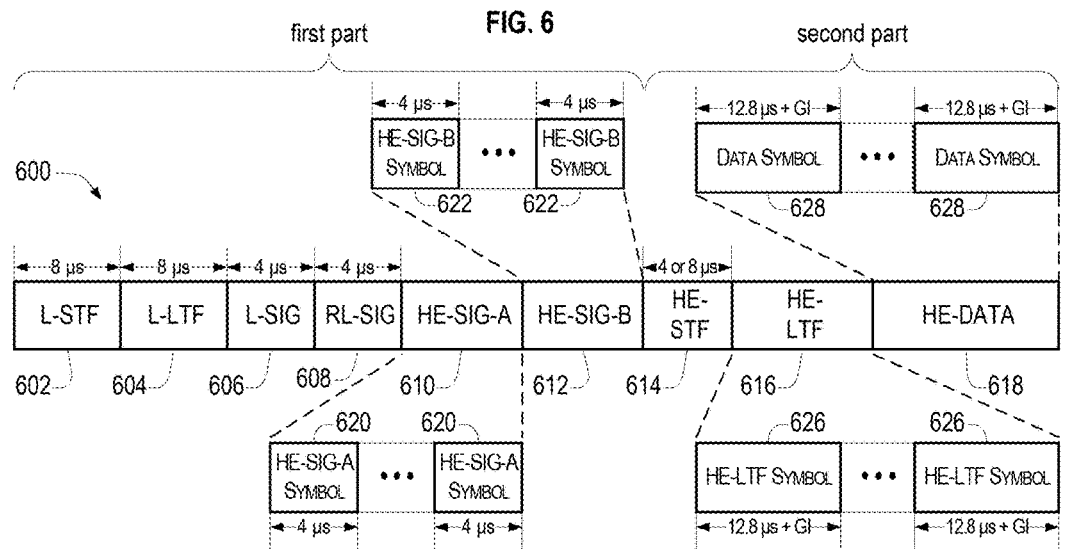

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA}$ * 4 μs | 3.2 μs | 0.8 μs | 312.5 kHz |
| HE-SIG-B | HE SIGNAL B field | $N_{HESIGB}$ * 4 μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA}$ * (DFT period + GI) μs | 12.8 μs | supports 0.8, 1.6, 3.2 μs | 78.125 kHz |

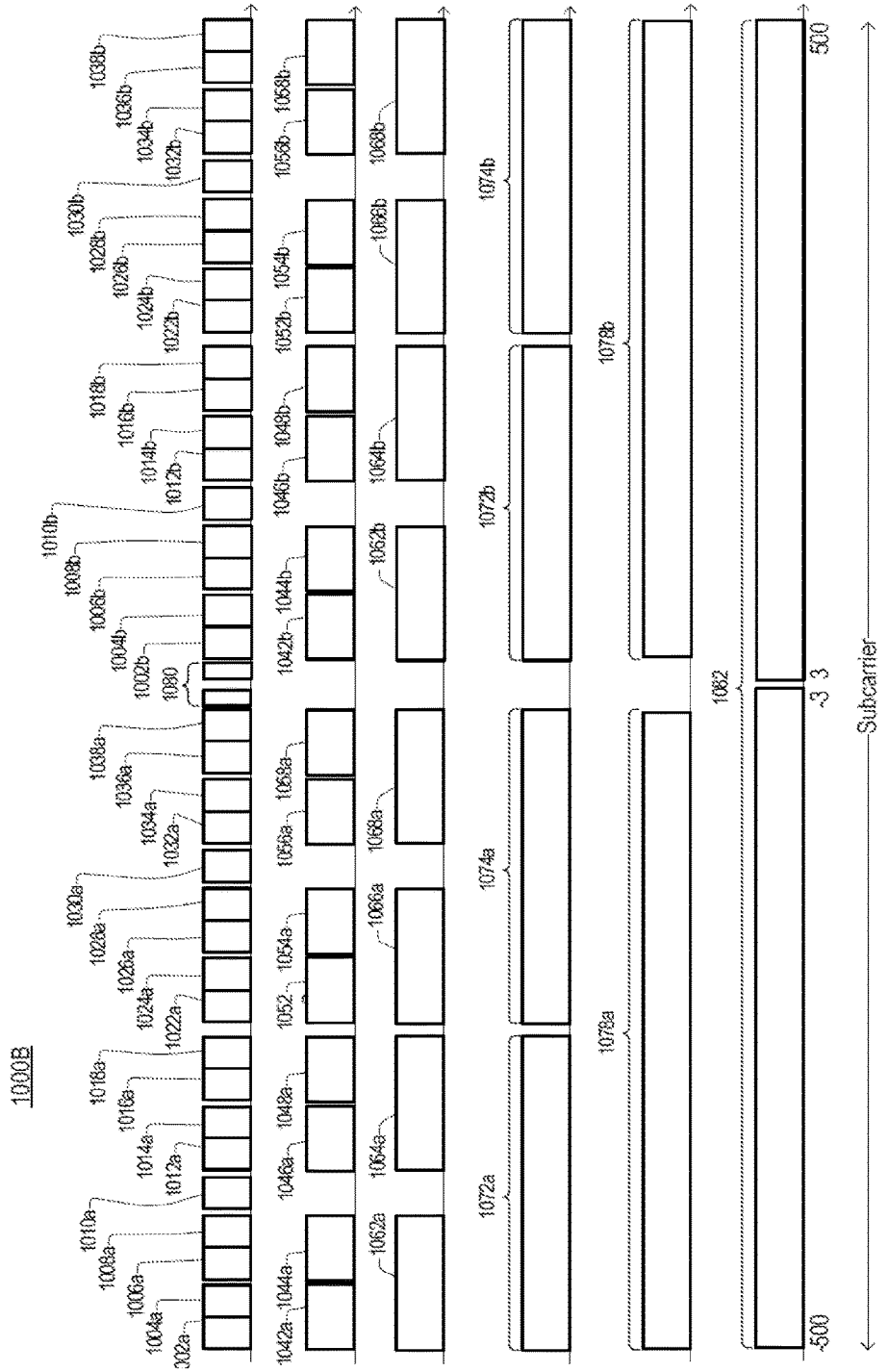

FIG. 13
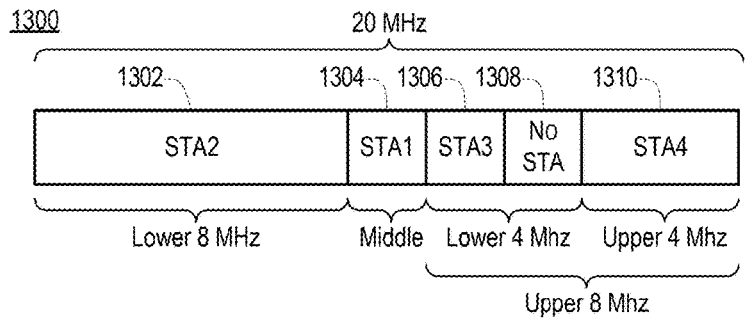
FIG. 14
Table 2
| At: | Processing | Bit String |
|---|---|---|
| S1104 | Center RU | 1 |
| S1106 | First (Low) 8MHz | 11 |
| S1108 | Second (High) 8MHz | 111 |
| S1122 | First (Low) 8MHz | 11100 |
| S1126 | Third 4MHz ($1^{st}$ 4MHz of $2^{nd}$ 8MHz) | 111001 |
| S1128 | Fourth 4MHz ($2^{nd}$ 4MHz of $2^{nd}$ 8MHz) | 1110011 |
| S1146 | Sixth 2MHz ($1^{st}$ 2MHz of 3rd 4MHz) | 11100111 |
| S1148 | Seventh 2MHz ($2^{nd}$ 2MHz of 3rd 4MHz) | 111001110 |
| S1142 | Fourth 4MHz ($2^{nd}$ 4MHz of $2^{nd}$ 8MHz) | 11100111000 |
FIG. 15A
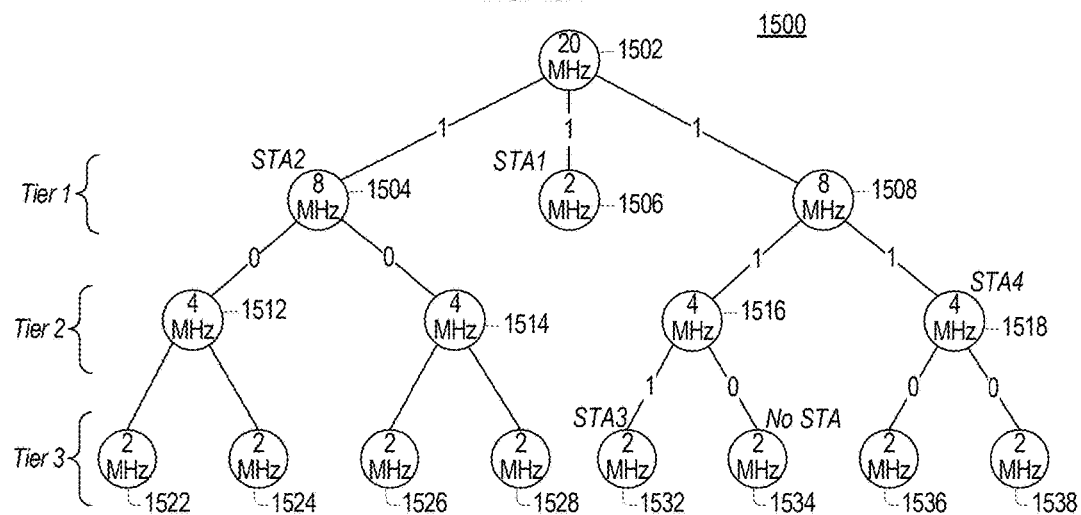

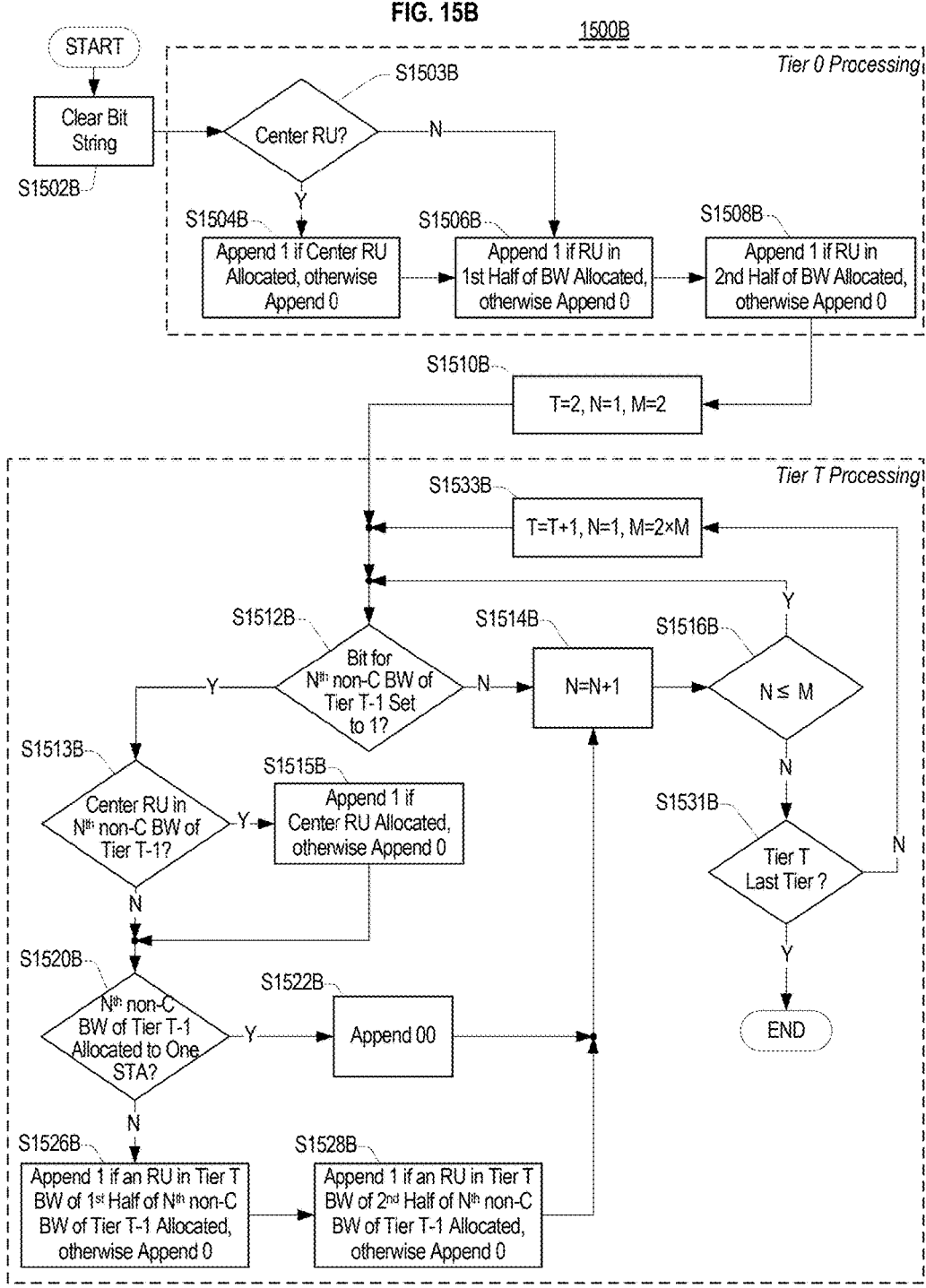

Table 3

| Number of STAs | Compress Method | 16Mhz 20 MHz PPDU | 32Mhz 40 MHz PPDU | 64Mhz 80 MHz PPDU | 128Mhz 160 MHz PPDU |
|---|---|---|---|---|---|
| 1 | Fixed | 10.00 | 20.00 | 40.00 | 80.00 |
| 1 | Flexible | 5.47 | 7.29 | 9.17 | 11.10 |
| 2 | Fixed | 10.00 | 20.00 | 40.00 | 80.00 |
| 2 | Flexible | 8.87 | 12.14 | 15.52 | 19.05 |
| 3 | Fixed | 10.00 | 20.00 | 40.00 | 80.00 |
| 3 | Flexible | 11.11 | 15.90 | 20.80 | 25.89 |
| 4 | Fixed | 10.00 | 20.00 | 40.00 | 80.00 |
| 4 | Flexible | 12.59 | 18.98 | 25.38 | 32.01 |
| 5 | Fixed | 10.00 | 20.00 | 40.00 | 80.00 |
| 5 | Flexible | 13.45 | 21.52 | 29.43 | 37.57 |
| 6 | Fixed | 10.00 | 20.00 | 40.00 | 80.00 |
| 6 | Flexible | 13.86 | 23.61 | 33.05 | 42.70 |
| 7 | Fixed | 10.00 | 20.00 | 40.00 | 80.00 |
| 7 | Flexible | 14.00 | 25.30 | 36.32 | 47.47 |
| 8 | Fixed | 10.00 | 20.00 | 40.00 | 80.00 |
| 8 | Flexible | 14.00 | 26.66 | 39.27 | 51.93 |
| 9 | Fixed | NA | 20.00 | 40.00 | 80.00 |
| 9 | Flexible | NA | 27.72 | 41.96 | 56.12 |

FIG. 18

Table 4:
Usage-Based Prefixes,
1st Illustrative Embodiment

| 3 bit encodings, 0bb | |
|---|---|
| Allocation | Code word |
| 224 | 0 00 |
| 422 | 0 01 |
| 44 | 0 10 |
| 8 | 0 11 |

| 5 bit encodings, 10ccc | |
|---|---|
| Allocation | Code word |
| 2222 | 10 000 |
| X4 | 10 001 |
| 4X | 10 010 |
| X | 10 011 |
| X24 | 10 100 |
| 2X4 | 10 101 |
| 42X | 10 110 |
| 4X2 | 10 111 |

| 6 bit encodings, 11dddd | |
|---|---|
| Allocation | Code word |
| 22X | 11 0000 |
| X22 | 11 0001 |
| 222X | 11 0010 |
| 22X2 | 11 0011 |
| 2X22 | 11 0100 |
| X222 | 11 0101 |
| 2XX2 | 11 0110 |
| 2X2X | 11 0111 |
| X2X2 | 11 1000 |
| X22X | 11 1001 |
| 2XXX | 11 1010 |
| X2XX | 11 1011 |
| XX2X | 11 1100 |
| XXX2 | 11 1101 |

FIG. 19

Table 5:
Usage-Based Prefixes,
2nd Illustrative Embodiment

| 4 bit encodings, 0bbb | |
|---|---|
| Allocation | Code word |
| 2222 | 0 000 |
| 224 | 0 001 |
| 422 | 0 010 |
| 44 | 0 011 |
| 8 | 0 100 |
| X4 | 0 101 |
| 4X | 0 110 |
| X | 0 111 |

| 5 bit encodings, 10ccc | |
|---|---|
| Allocation | Code word |
| X24 | 10 000 |
| 2X4 | 10 001 |
| 42X | 10 010 |
| 4X2 | 10 011 |
| 22X | 10 100 |
| X22 | 10 101 |
| 222X | 10 110 |
| X222 | 10 111 |

| 6 bit encodings, 11dddd | |
|---|---|
| Allocation | Code word |
| 22X2 | 11 0000 |
| 2X22 | 11 0001 |
| 2XX2 | 11 0010 |
| 2X2X | 11 0011 |
| X2X2 | 11 0100 |
| X22X | 11 0101 |
| 2XXX | 11 0110 |
| X2XX | 11 0111 |
| XX2X | 11 1000 |
| XXX2 | 11 1001 |

FIG. 20

Table 6:
Usage-Based Prefixes,
3rd Illustrative Embodiment

| 4 bit encodings, 0bbb | |
|---|---|
| Allocation | Code word |
| 2222 | 0 000 |
| 224 | 0 001 |
| 422 | 0 010 |
| 44 | 0 011 |
| 8 | 0 100 |
| X4 | 0 101 |
| 4X | 0 110 |
| X | 0 111 |

| 6 bit encodings, 1eeeee | |
|---|---|
| Allocation | Code word |
| X24 | 1 00000 |
| 2X4 | 1 00001 |
| 42X | 1 00010 |
| 4X2 | 1 00011 |
| 222X | 1 00100 |
| 22X2 | 1 00101 |
| 2X22 | 1 00110 |
| X222 | 1 00111 |
| 22X | 1 01000 |
| X22 | 1 01001 |
| 2XX2 | 1 01010 |
| 2X2X | 1 01011 |
| X2X2 | 1 01100 |
| X22X | 1 01101 |
| 2XXX | 1 01110 |
| X2XX | 1 01111 |
| XX2X | 1 10000 |
| XXX2 | 1 10001 |

FIG. 21
Table 7: Usage-Based Prefixes,
Illustrative Embodiment for half of 40MHz

| 3 bit encodings, 0bb | |
|---|---|
| Allocation | Code word |
| T | 0 00 |
| 88 | 0 01 |
| 844 | 0 10 |
| 448 | 0 11 |

| 5 bit encodings, 10ccc | |
|---|---|
| Allocation | Code word |
| 4444 | 10 000 |
| 8422 | 10 001 |
| 8224 | 10 010 |
| 4228 | 10 011 |
| 2248 | 10 100 |
| 82222 | 10 101 |
| 22228 | 10 110 |

| 6 bit encodings, 10dddd | |
|---|---|
| Allocation | Code word |
| 822X2 | 11 0000 |
| 2X228 | 11 0001 |
| 4X28 | 11 0010 |
| 82X4 | 11 0011 |
| 4422X2 | 11 0100 |
| 2X2244 | 11 0101 |
| 222222X2 | 11 0110 |
| 2X222222 | 11 0111 |
| 222222XX | 11 1000 |
| XX222222 | 11 1001 |
| 22222XXX | 11 1010 |
| XXX22222 | 11 1011 |
| 2222XXXX | 11 1100 |
| XXXX2222 | 11 1101 |
| 44XX22 | 11 1110 |
| 22XX44 | 11 1111 |

FIG. 22
Table 8: Examples of VLAIDs for Two PPDUs

| Client | Association ID (AID) | In PPDU1? | VLAID in PPDU1 | In PPDU2? | VLAID in PPDU2 |
|---|---|---|---|---|---|
| STA1 | 0000 0000 0001 | Yes | 00001 | Yes | 001 |
| STA2 | 0000 0000 0011 | Yes | 00011 | No | |
| STA3 | 0000 0000 0110 | Yes | 00110 | Yes | 110 |
| STA4 | 0000 0000 1001 | Yes | 01001 | No | |
| STA5 | 0000 0001 0110 | Yes | 10110 | No | |
| STA6 | 0000 0001 0011 | Yes | 10011 | Yes | 011 |
| STA7 | 0000 0001 0101 | Yes | 10101 | No | |
| STA8 | 0000 0001 1000 | Yes | 11000 | Yes | 000 |
| STA9 | 0000 0001 1001 | Yes | 11001 | No | |
| STA10 | 0000 0001 1011 | Yes | 11011 | No | |
| STA11 | 0000 0001 1101 | No | | Yes | 101 |
| STA12 | 0000 0001 1110 | No | | No | |
| STA13 | 0000 0010 0001 | No | | No | |
| STA14 | 0000 0010 0010 | No | | Yes | 010 |
| STA15 | 0000 0010 0101 | No | | No | |
| STA16 | 0000 0011 1101 | No | | No | |
| STA17 | 0000 0100 0100 | No | | Yes | 100 |
| STA18 | 0000 0110 0011 | No | | No | |
| STA19 | 0000 0110 0110 | No | | No | |
| STA20 | 0000 1110 0110 | No | | No | |

Table 9

| RAS code | #1 | #2 | #3 | #4 | #5 | #6 | #7 | #8 | #9 |
|---|---|---|---|---|---|---|---|---|---|
| 0 | 26 | 26 | 26 | 26 | 26 | 26 | 26 | 26 | 26 |
| 1 | 52 | | 52 | | 26 | 52 | | 52 | |
| 2 | 52 | | 26 | 26 | 26 | 26 | 26 | 26 | 26 |
| 3 | 26 | 26 | 52 | | 26 | 26 | 26 | 26 | 26 |
| 4 | 26 | 26 | 26 | 26 | 26 | 52 | | 26 | 26 |
| 5 | 26 | 26 | 26 | 26 | 26 | 26 | 26 | 52 | |
| 6 | 52 | | 52 | | 26 | 26 | 26 | 26 | 26 |
| 7 | 52 | | 26 | 26 | 26 | 52 | | 26 | 26 |
| 8 | 52 | | 26 | 26 | 26 | 26 | 26 | 52 | |
| 9 | 26 | 26 | 52 | | 26 | 52 | | 26 | 26 |
| 10 | 26 | 26 | 52 | | 26 | 26 | 26 | 52 | |
| 11 | 26 | 26 | 26 | 26 | 26 | 52 | | 52 | |
| 12 | 52 | | 52 | | 26 | 52 | | 26 | 26 |
| 13 | 52 | | 52 | | 26 | 26 | 26 | 52 | |
| 14 | 52 | | 26 | 26 | 26 | 52 | | 52 | |
| 15 | 26 | 26 | 52 | | 26 | 52 | | 52 | |
| 16...79 | 106 | | | | 26 | 106 | | | |
| 80...87 | 106 | | | | 26 | 26 | 26 | 26 | 26 |
| 88...95 | 106 | | | | 26 | 26 | 26 | 52 | |
| 96...103 | 106 | | | | 26 | 52 | | 26 | 26 |
| 104...111 | 106 | | | | 26 | 52 | | 52 | |
| 112...119 | 26 | 26 | 26 | 26 | 26 | 106 | | | |
| 120...127 | 26 | 26 | 52 | | 26 | 106 | | | |
| 128...135 | 52 | | 26 | 26 | 26 | 106 | | | |
| 136...143 | 52 | | 52 | | 26 | 106 | | | |
| 144...151 | 242 | | | | | | | | |
| 152...159 | 484 | | | | | | | | ... |
| 160...167 | 996 | | | | | | | | ... |
| 168...175 | 2 × 996 | | | | | | | | ... |

2900 → 2904, 2906-1, 2906-2, 2906-K

| Common Info | RAS | User Specific Subfield 1 | User Specific Subfield 2 | ... | User Specific Subfield K |

Table 10

| RAS code | #1 | #2 | #3 | #4 | #5 | #6 | #7 | #8 | #9 |
|---|---|---|---|---|---|---|---|---|---|
| 176+$n_1$ | X | | 52 | | 26 | 106 | | | |
| 176+$n_1$+1 | 52 | | X | | 26 | 106 | | | |
| 176+$n_1$+2 | 52 | | 52 | | 26 | X | | | |

FIG. 31

Table 11

| RAS code | #1 | #2 | #3 | #4 | #5 | #6 | #7 | #8 | #9 |
|---|---|---|---|---|---|---|---|---|---|
| 176+$n_2$ | X | 26 | 26 | 26 | | 106 | | | |
| 176+$n_2$+1 | 52 | X | 26 | 26 | | 106 | | | |
| 176+$n_2$+2 | 52 | 26 | X | 26 | | 106 | | | |
| 176+$n_2$+3 | 52 | 26 | 26 | 26 | | X | | | |

FIG. 32

Table 12

| RAS code | #1 | #2 | #3 | #4 | #5 | #6 | #7 | #8 | #9 |
|---|---|---|---|---|---|---|---|---|---|
| 176+$n_3$ | X | 26 | 52 | 26 | | 106 | | | |
| 176+$n_3$+1 | 26 | X | 52 | 26 | | 106 | | | |
| 176+$n_3$+2 | 26 | 26 | X | 26 | | 106 | | | |
| 176+$n_3$+3 | 26 | 26 | 52 | 26 | | X | | | |

FIG. 33

Table 13

| RAS code | #1 | #2 | #3 | #4 | #5 | #6 | #7 | #8 | #9 |
|---|---|---|---|---|---|---|---|---|---|
| 176+$n_4$ | X | 26 | 26 | 26 | 26 | 106 | | | |
| 176+$n_4$+1 | 26 | X | 26 | 26 | 26 | 106 | | | |
| 176+$n_4$+2 | 26 | 26 | X | 26 | 26 | 106 | | | |
| 176+$n_4$+3 | 26 | 26 | 26 | X | 26 | 106 | | | |
| 176+$n_4$+4 | 26 | 26 | 26 | 26 | 26 | X | | | |

FIG. 34

Table 14

| RAS code | #1 | #2 | #3 | #4 | #5 | #6 | #7 | #8 | #9 |
|---|---|---|---|---|---|---|---|---|---|
| 176+$n_5$ | 106 | | | | 26 | X | | 52 | |
| 176+$n_5$+1 | 106 | | | | 26 | 52 | | X | |
| 176+$n_5$+2 | X | | | | 26 | 52 | | 52 | |

FIG. 35
Table 15

| RAS code | #1 | #2 | #3 | #4 | #5 | #6 | #7 | #8 | #9 |
|---|---|---|---|---|---|---|---|---|---|
| $176+n_6$ | | 106 | | | 26 | X | 26 | 26 | |
| $176+n_6+1$ | | 106 | | | 26 | 52 | X | 26 | |
| $176+n_6+2$ | | 106 | | | 26 | 52 | 26 | X | |
| $176+n_6+3$ | | X | | | 26 | 52 | 26 | 26 | |

FIG. 36
Table 16

| RAS code | #1 | #2 | #3 | #4 | #5 | #6 | #7 | #8 | #9 |
|---|---|---|---|---|---|---|---|---|---|
| $176+n_7$ | | 106 | | | 26 | X | 26 | 52 | |
| $176+n_7+1$ | | 106 | | | 26 | 26 | X | 52 | |
| $176+n_7+2$ | | 106 | | | 26 | 26 | 26 | X | |
| $176+n_7+3$ | | X | | | 26 | 26 | 26 | 52 | |

FIG. 37
Table 17

| RAS code | #1 | #2 | #3 | #4 | #5 | #6 | #7 | #8 | #9 |
|---|---|---|---|---|---|---|---|---|---|
| $176+n_8$ | | 106 | | | 26 | X | 26 | 26 | 26 |
| $176+n_8+1$ | | 106 | | | 26 | 26 | X | 26 | 26 |
| $176+n_8+2$ | | 106 | | | 26 | 26 | 26 | X | 26 |
| $176+n_8+3$ | | 106 | | | 26 | 26 | 26 | 26 | X |
| $176+n_8+4$ | | X | | | 26 | 26 | 26 | 26 | 26 |

FIG. 38
Table 18

| RAS code | #1 | #2 | #3 | #4 | #5 | #6 | #7 | #8 | #9 |
|---|---|---|---|---|---|---|---|---|---|
| $176+n_9$ | X | 26 | 52 | | 26 | | 52 | | 52 |
| $176+n_9+1$ | 26 | X | 52 | | 26 | | 52 | | 52 |
| $176+n_9+2$ | 26 | 26 | X | | 26 | | 52 | | 52 |
| $176+n_9+3$ | 26 | 26 | 52 | | 26 | | X | | 52 |
| $176+n_9+4$ | 26 | 26 | 52 | | 26 | | 52 | | X |

FIG. 39
Table 19

| RAS code | #1 | #2 | #3 | #4 | #5 | #6 | #7 | #8 | #9 |
|---|---|---|---|---|---|---|---|---|---|
| $176+n_{10}$ | 52 | X | 26 | | 26 | | 52 | | 52 |
| $176+n_{10}+1$ | 52 | 26 | X | | 26 | | 52 | | 52 |
| $176+n_{10}+2$ | 52 | 26 | 26 | | 26 | | X | | 52 |
| $176+n_{10}+3$ | 52 | 26 | 26 | | 26 | | 52 | | X |
| $176+n_{10}+4$ | X | 26 | 26 | | 26 | | 52 | | 52 |

FIG. 40
Table 20

| RAS code | #1 | #2 | #3 | #4 | #5 | #6 | #7 | #8 | #9 |
|---|---|---|---|---|---|---|---|---|---|
| $176+n_{11}$ | 52 || 52 || 26 | X | 26 | 52 ||
| $176+n_{11}+1$ | 52 || 52 || 26 | 26 | X | 52 ||
| $176+n_{11}+2$ | 52 || 52 || 26 | 26 | 26 | X ||
| $176+n_{11}+3$ | X || 52 || 26 | 26 | 26 | 52 ||
| $176+n_{11}+4$ | 52 || X || 26 | 26 | 26 | 52 ||

FIG. 41
Table 21

| RAS code | #1 | #2 | #3 | #4 | #5 | #6 | #7 | #8 | #9 |
|---|---|---|---|---|---|---|---|---|---|
| $176+n_{12}$ | 52 || 52 || 26 | 52 | X | 26 ||
| $176+n_{12}+1$ | 52 || 52 || 26 | 52 | 26 | X ||
| $176+n_{12}+2$ | X || 52 || 26 | 52 | 26 | 26 ||
| $176+n_{12}+3$ | 52 || X || 26 | 52 | 26 | 26 ||
| $176+n_{12}+4$ | 52 || 52 || 26 | X | 26 | 26 ||

FIG. 42
Table 22

| RAS code | #1 | #2 | #3 | #4 | #5 | #6 | #7 | #8 | #9 |
|---|---|---|---|---|---|---|---|---|---|
| $176+n_{13}$ | 52 || 52 || 26 | X | 26 | 26 | 26 |
| $176+n_{13}+1$ | 52 || 52 || 26 | 26 | X | 26 | 26 |
| $176+n_{13}+2$ | 52 || 52 || 26 | 26 | 26 | X | 26 |
| $176+n_{13}+3$ | 52 || 52 || 26 | 26 | 26 | 26 | X |
| $176+n_{13}+4$ | X || 52 || 26 | 26 | 26 | 26 | 26 |
| $176+n_{13}+5$ | 52 || X || 26 | 26 | 26 | 26 | 26 |

FIG. 43
Table 23

| RAS code | #1 | #2 | #3 | #4 | #5 | #6 | #7 | #8 | #9 |
|---|---|---|---|---|---|---|---|---|---|
| $176+n_{14}$ | X | 26 | 26 | 26 | 26 | 52 || 52 ||
| $176+n_{14}+1$ | 26 | X | 26 | 26 | 26 | 52 || 52 ||
| $176+n_{14}+2$ | 26 | 26 | X | 26 | 26 | 52 || 52 ||
| $176+n_{14}+3$ | 26 | 26 | 26 | X | 26 | 52 || 52 ||
| $176+n_{14}+4$ | 26 | 26 | 26 | 26 | 26 | X || 52 ||
| $176+n_{14}+5$ | 26 | 26 | 26 | 26 | 26 | 52 || X ||

FIG. 49

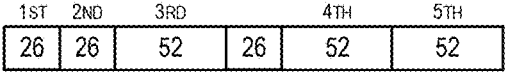

RU allocation pattern (4902):

| 1ST | 2ND | 3RD | 4TH | 5TH |
|---|---|---|---|---|
| 26 | 26 | 52 | 26 | 52 | 52 |

Table 24 : interpretation of RUA values for RU allocation pattern 4902

| RUA Value | Indication | RUA Value | Indication |
|---|---|---|---|
| 0 | No unassigned RUs | 4 | $4^{th}$ (52 tone) RU unassigned |
| 1 | $1^{st}$ (26 tone) RU unassigned | 5 | $5^{th}$ (52 tone) RU unassigned |
| 2 | $2^{nd}$ (26 tone) RU unassigned | 6 | reserved |
| 3 | $3^{rd}$ (52 tone) RU unassigned | 7 | reserved |

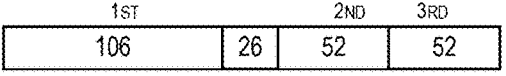

RU allocation pattern (4904):

| 1ST | 2ND | 3RD |
|---|---|---|
| 106 | 26 | 52 | 52 |

Table 25: interpretation of RUA values for RU allocation pattern 4904

| RUA Value | Indication | RUA Value | Indication |
|---|---|---|---|
| 0 | No unassigned RUs | 4 | reserved |
| 1 | $1^{st}$ (106 tone) RU unassigned | 5 | reserved |
| 2 | $2^{nd}$ (52 tone) RU unassigned | 6 | reserved |
| 3 | $3^{rd}$ (52 tone) RU unassigned | 7 | reserved |

FIG. 50

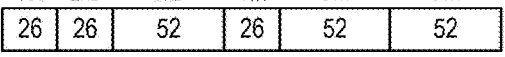

RU allocation pattern (5002):

| 1ST | 2ND | 3RD | 4TH | 5TH | 6TH |
|---|---|---|---|---|---|
| 26 | 26 | 52 | 26 | 52 | 52 |

Table 26 : interpretation of RUA values for RU allocation pattern 5002

| RUA Value | Indication | RUA Value | Indication |
|---|---|---|---|
| 0 | No unassigned RUs | 4 | $4^{th}$ (26 tone center) RU unassigned |
| 1 | $1^{st}$ (26 tone) RU unassigned | 5 | $5^{th}$ (52 tone) RU unassigned |
| 2 | $2^{nd}$ (26 tone) RU unassigned | 6 | $6^{th}$ (52 tone) RU unassigned |
| 3 | $3^{rd}$ (52 tone) RU unassigned | 7 | reserved |

BANDWIDTH ALLOCATION SIGNALLING

CROSS-REFERENCE TO RELATED APPLICATION

This application claims the benefit of U.S. Provisional Patent Application No. 62/187,774, filed Jul. 1, 2015, U.S. Provisional Patent Application No. 62/190,635, filed Jul. 9, 2015, U.S. Provisional Patent Application No. 62/214,878, filed Sep. 4, 2015, U.S. Provisional Patent Application No. 62/217,916, filed Sep. 13, 2015, U.S. Provisional Patent Application No. 62/243,575, filed Oct. 19, 2015, and U.S. Provisional Patent Application No. 62/247,123, filed Oct. 27, 2015.

BACKGROUND

1. Technical Field

The technology described herein relates generally to wireless networking. More particularly, the technology relates to communicating using a High Efficiency (HE) Wireless Local Area Network (WLAN) Signal B (HE-SIG-B) field.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

An HE WLAN supports Down-Link (DL) and Up-Link (UL) Multi-User (MU) transmissions such as MU Orthogonal Frequency Division Multiple Access (MU OFDMA) transmissions and Multi-User Multi-Input-Multi-Output (MU MIMO) transmissions.

Each of MU OFDMA frames transmitted by the stations may include a first portion transmitted across an entire bandwidth of a wireless channel and one or more second portions transmitted to respective stations using respective portions of the bandwidth of the wireless channel. The respective second portions of the MU OFDMA frames are each transmitted using respective bandwidths (that is, respective subchannels) allocated exclusively to each second portion. The information on which bandwidths or subchannels are allocated to which stations in the second portion of the frame may be communicated to the stations using an HE Signal-B (HE-SIG-B) field included in the first portion of the frame.

When a large number of stations are participating in an MU OFDMA operation, the communication of the bandwidth allocation information in the HE-SIG-B field may increase the amount of overhead in the frame, which would decrease the performance of the WLAN.

In some OFDMA frames, some bandwidths or subchannels in the second portion of the frame may not be allocated to a station. Instead of transmitting dummy information in the unallocated subchannels, a transmitting station may not transmit at all in the unallocated subchannels. This may allow more power to be used to transmit the allocated subchannels without exceeding a limit on a total transmission power used to transmit the frame. Embodiments of the transmitting station may indicate which subchannels are unallocated in the HE-SIG-B field.

SUMMARY

In an embodiment, a method implemented by an Access Point (AP) for performing a Multi-User (MU) transmission comprises i) determining, by the AP, an allocation of Resource Units (RUs) of a first bandwidth of an MU frame, including determining that a first RU of the MU frame is not allocated to a station in the MU transmission, ii) determining, by the AP, a value of a first RU Allocation Subfield according to the allocation of the RUs of the MU frame, the value of the first RU Allocation Subfield indicating that the first RU is not allocated, and iii) generating, by the AP, a first High Efficiency Signal B (HE-SIG-B) field. Generating the first HE-SIG-B field comprises providing the first RU Allocation Subfield in a common info field of the HE-SIG-B field. The method further comprises generating, by the AP, the MU frame. Generating the MU frame includes providing the first HE-SIG-B field in the MU frame. The method further comprises transmitting, by the AP, the MU frame over a wireless channel.

In an embodiment, the MU frame is a 80 MHz frame, the first bandwidth is 2 MHz, and the first RU is a middle 26 tones in between a first set of 484 tones of the MU frame and a second set of 484 tones of the MU frame.

In an embodiment, the first RU Allocation Subfield includes a single bit to indicate that the first RU is not allocated to a station in the MU transmission, the first HE-SIG-B is included in a first 20 MHz of the MU frame, the first bandwidth is outside the first 20 MHz, and the first RU Allocation Subfield further indicates an allocation of RUs within the first 20 MHz.

In an embodiment, the method further comprises determining, by the AP, an allocation of RUs of a second 20 MHz of the MU frame, and determining, by the AP, a value of a second RU Allocation Subfield according to the allocation of the RUs of the second 20 MHz and the single bit to indicate that the first RU is not allocated to a station in the MU transmission. Generating the MU frame includes providing, in the second 20 MHz, a second HE-SIG-B field. The second HE-SIG-B field includes the second RU Allocation Subfield.

In an embodiment, the first bandwidth is 20 MHz, the first HE-SIG-B field is provided in the first bandwidth of the MU frame, and the method further comprises determining, by the AP, an allocation of RUs of a second bandwidth of the MU frame. The second bandwidth is 20 MHz. The method further comprises determining, by the AP, a value of a second RU Allocation Subfield according to the allocation of the RUs of the second bandwidth. Generating the MU frame includes providing, in the second bandwidth, a second HE-SIG-B field. The second HE-SIG-B field includes the second RU Allocation Subfield.

In an embodiment, the method further comprises determining, by the AP, that a second RU of the second bandwidth is not allocated to a station in the MU transmission. The value of the second RU Allocation Subfield indicates that the second RU is not allocated.

In an embodiment, generating the first HE-SIG-B field further comprises providing a plurality of user-specific subfields in the first HE-SIG-B field. The first RU Allocation Subfield provides an indication of a number of user-specific subfields in the first HE-SIG-B field.

In an embodiment, the first bandwidth is 20 MHz, the first RU is a middle 2 MHz in the first bandwidth, the first HE-SIG-B field is provided in the first bandwidth of the MU frame, and values of one or more bits in the first RU Allocation Subfield, located in the HE-SIG-B field, indicate that the first bandwidth is unassigned.

In an embodiment, a method implemented by an Access Point (AP) for performing a Multi-User (MU) transmission comprises i) transmitting, by the AP, an indication of a first length to a station over a wireless channel, ii) determining, by the AP, a plurality of first identifiers, the first identifiers having respective lengths equal to the first length, iii) generating, by the AP, a High Efficiency Signal B (HE-SIG-B) field including one or more of the first identifiers, and iv) transmitting, by the AP, the HE-SIG-B field to the station over the wireless channel after transmitting the first length.

In an embodiment, the method further comprises determining, by the AP, a plurality of second identifiers respectively corresponding to stations scheduled to participate in one or more MU communications. The second identifiers have respective second lengths greater than the first length. The method further comprises determining, by the AP, the first length using the plurality of second identifiers.

In an embodiment, the method further comprises determining, by the AP, the plurality of first identifiers using the plurality of second identifiers.

In an embodiment, the method further comprises determining, by the AP, the first identifiers of the plurality of first identifiers by respectively applying an a priori known rule to respective corresponding second identifiers of the plurality of second identifiers.

In an embodiment, the first identifiers of the plurality of first identifiers are respectively different from the other first identifiers of the plurality of first identifiers.

In an embodiment, each first identifier of the plurality of first identifiers corresponds to a station scheduled to participate in one or more MU communications.

In an embodiment, a method implemented by an Access Point (AP) for performing a Multi-User (MU) transmission comprises i) determining, by the AP, an allocation of Resource Units (RUs) of a first bandwidth of an MU frame, ii) receiving, by the AP, a received frame from a station over a wireless channel, and iii) generating, by the AP, a Multi-User Acknowledgement (MU-ACK) frame in response to the received frame. Generating the MU-ACK frame comprises providing an indication of the allocation of RUs of the first bandwidth of the MU frame in the MU-ACK frame. The method further comprises transmitting, by the AP, the MU-ACK frame to the station over the wireless channel.

In an embodiment, the received frame from the station is a Power Save Poll (PS-Poll) frame.

In an embodiment, the method further comprises transmitting, by the AP, a trigger frame to the station over the wireless channel after transmitting the MU-ACK frame, and receiving, by the AP, the MU frame. The MU frame is a response to the trigger frame.

In an embodiment, the method further comprises providing, by the AP, a reference to the trigger frame in the MU-ACK frame.

In an embodiment, the method further comprises providing, by the AP, an indication of a transmission time of the trigger frame in the MU-ACK frame.

In an embodiment, the method further comprises transmitting, by the AP, the MU frame over the wireless channel. In an embodiment, the method further comprises providing, by the AP, an indication of a transmission time of the MU frame in the MU-ACK frame.

BRIEF DESCRIPTION OF THE DRAWINGS

FIG. 6 illustrates an HE PPDU according to an embodiment.

FIG. 7 shows properties of fields of the HE PPDU frame of FIG. 6 according to an embodiment.

FIG. 10B illustrates RU definitions in an 80 MHz bandwidth, according to an embodiment.

FIG. 13 shows an illustrative allocation of bandwidths within a 20 MHz bandwidth.

FIG. 14 illustrates a sequential construction of a bit string indicating the bandwidth allocation of FIG. 13.

FIG. 15A shows a tree illustrating the variable-length encoding scheme of FIGS. 11-14, according to an embodiment.

FIG. 15B illustrates a process for a hierarchical encoding of a bandwidth allocation, according to an embodiment.

FIG. 18 illustrates usage-based prefix codes for an 8 MHz half of a 20 MHz bandwidth, according to an illustrative embodiment.

FIG. 19 illustrates usage-based prefix codes for an 8 MHz half of a 20 MHz bandwidth, according to another illustrative embodiment.

FIG. 20 illustrates usage-based prefix codes for an 8 MHz half of a 20 MHz bandwidth, according to yet another illustrative embodiment.

FIG. 21 illustrates a coding for a usage-based coding prefixes for a 20 MHz half of a 40 MHz bandwidth, according to an illustrative embodiment.

FIG. 22 illustrates PPDU-specific Variable Length Association IDs (VLAIDs) for first and second PPDUs, according to an embodiment.

FIG. 30 illustrates RAS values for encoding bandwidth allocations have a first pattern and having one unallocated Resource Unit (RU), according to an embodiment.

FIG. 31 illustrates RAS values for encoding bandwidth allocations have a second pattern and having one unallocated RU, according to an embodiment.

FIG. 32 illustrates RAS values for encoding bandwidth allocations have a third pattern and having one unallocated RU, according to an embodiment.

FIG. 33 illustrates RAS values for encoding bandwidth allocations have a fourth pattern and having one unallocated RU, according to an embodiment.

FIG. 34 illustrates RAS values for encoding bandwidth allocations have a fifth pattern and having one unallocated RU, according to an embodiment.

FIG. 35 illustrates RAS values for encoding bandwidth allocations have a sixth pattern and having one unallocated RU, according to an embodiment.

FIG. 36 illustrates RAS values for encoding bandwidth allocations have a seventh pattern and having one unallocated RU, according to an embodiment.

FIG. 37 illustrates RAS values for encoding bandwidth allocations have an eighth pattern and having one unallocated RU, according to an embodiment.

FIG. 38 illustrates RAS values for encoding bandwidth allocations have a ninth pattern and having one unallocated RU, according to an embodiment.

FIG. 39 illustrates RAS values for encoding bandwidth allocations have a tenth pattern and having one unallocated RU, according to an embodiment.

FIG. 40 illustrates RAS values for encoding bandwidth allocations have an eleventh pattern and having one unallocated RU, according to an embodiment.

FIG. 41 illustrates RAS values for encoding bandwidth allocations have a twelfth pattern and having one unallocated RU, according to an embodiment.

FIG. 42 illustrates RAS values for encoding bandwidth allocations have a thirteenth pattern and having one unallocated RU, according to an embodiment.

FIG. 43 illustrates RAS values for encoding bandwidth allocations have a fourteenth pattern and having one unallocated RU, according to an embodiment.

FIG. 49 provides two examples of interpretation of values of an RU Allocation sub-field for each of two RU allocation patterns, according to an embodiment.

FIG. 50 provides an example of an interpretation of a value of an RU Allocation sub-field for an RU allocation pattern, according to another embodiment.

DETAILED DESCRIPTION

Figure 1:
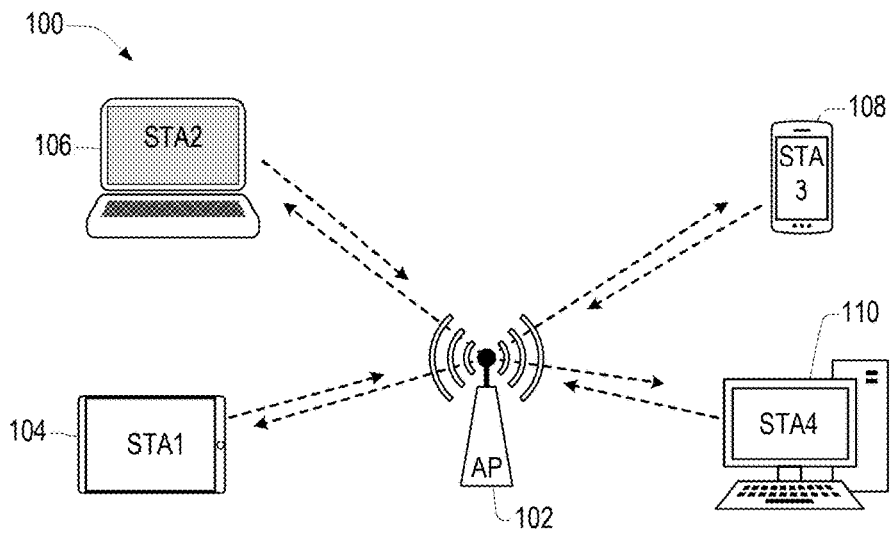
FIG. 1 illustrates a wireless network according to an embodiment.

The technology described herein relates generally to wireless networking. More particularly, the technology relates to simultaneous communications between stations in a wireless network using one or more of Multi-User (MU) Multi-Input-Multi-Output (MIMO) and MU Orthogonal Frequency Division Multiple Access (OFDMA) technologies.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports MU-MIMO, two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

Figure 2:
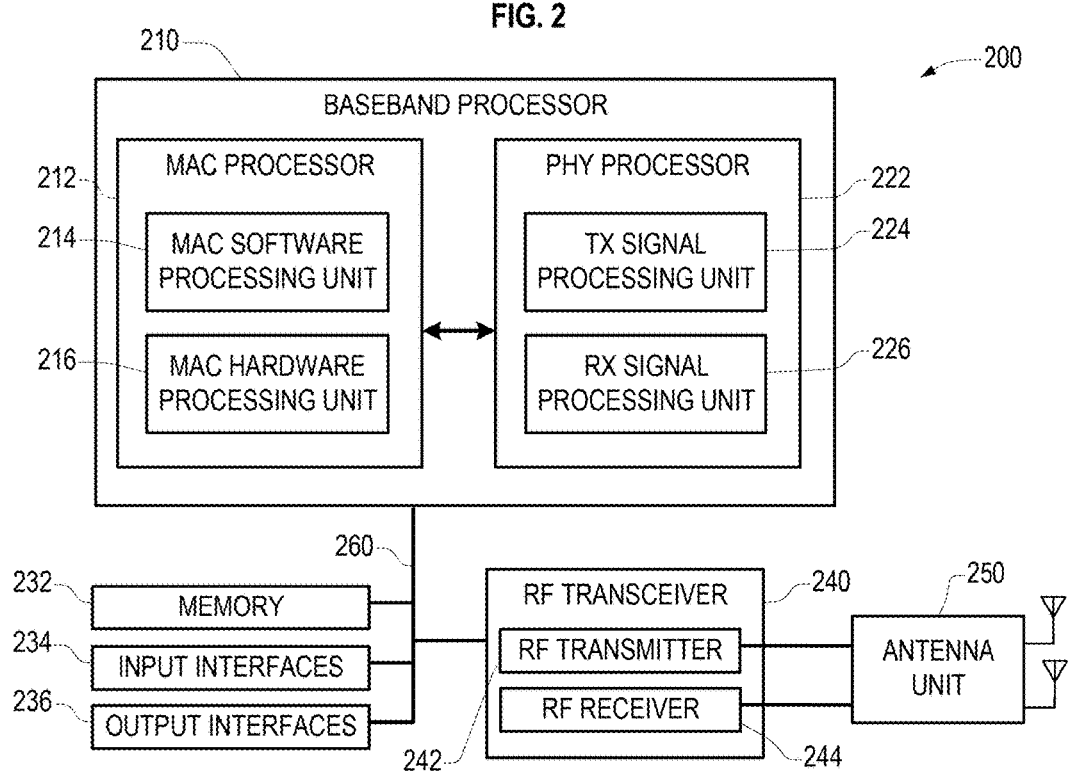
FIG. 2 is a schematic diagram of a wireless device according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
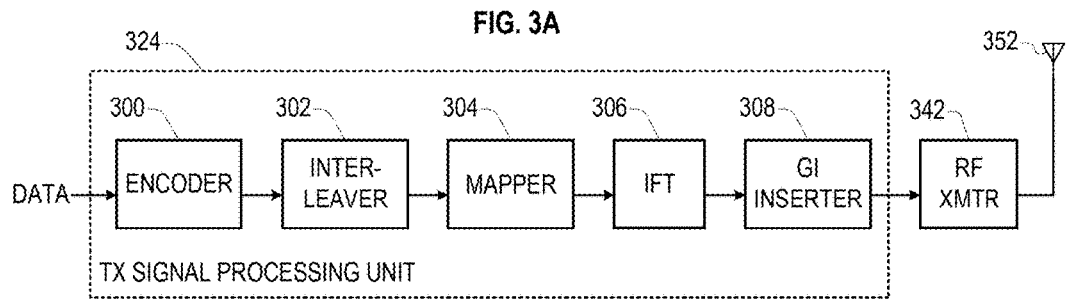
FIG. 3A illustrates components of a wireless device configured to transmit data according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
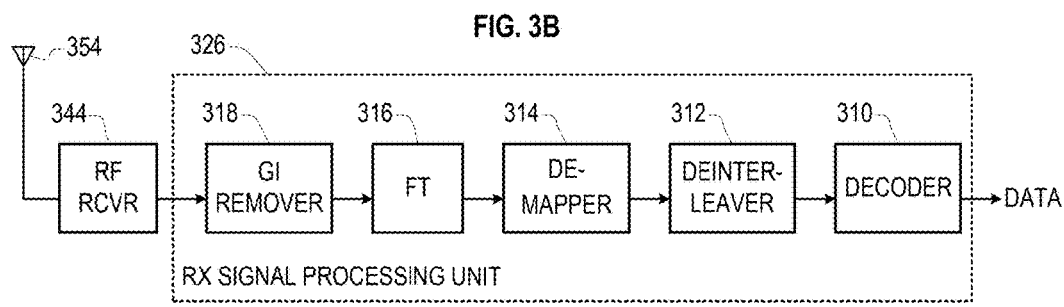
FIG. 3B illustrates components of a wireless device configured to receive data according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
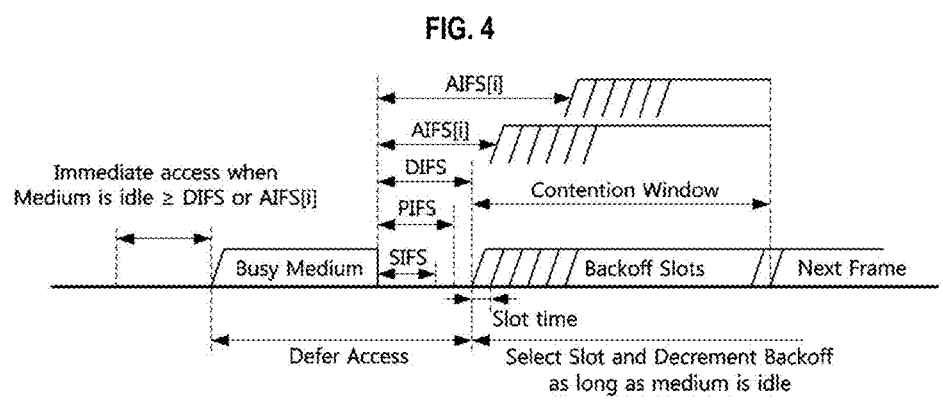
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
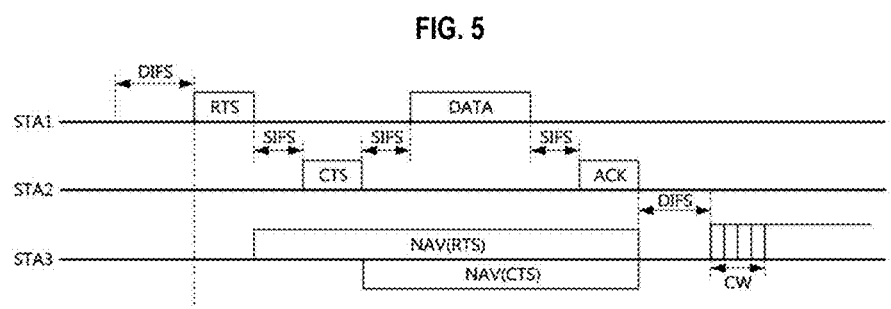
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Convergence Protocol (PLCP) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

A PHY entity may define PPDUs that are individually addressed using an Association Identifier (AID) or Partial AID and may also define PPDUs that are group addressed based on Group ID (GID).

A PHY entity may provide support for 20 MHz, 40 MHz, 80 MHz and 160 MHz contiguous channel widths and support for a 80+80 MHz non-contiguous channel width. Each channel includes a plurality of subcarriers, which may also be referred to as tones. Data subcarriers within the channels may be modulated using binary phase shift keying (BPSK), quadrature phase shift keying (QPSK), 16-quadrature amplitude modulation (16-QAM), 64-QAM and 256-QAM. Forward error correction (FEC) coding (such as convolutional or Low Density Parity Check (LDPC) coding) may be used with coding rates of 1/2, 2/3, 3/4 and 5/6.

A PHY entity may define fields denoted as Legacy Signal (L-SIG), Signal A (SIG-A), and Signal B (SIG-B) within which some necessary information about PLCP Service Data Unit (PSDU) attributes are communicated. For example, a High Efficiency (HE) PHY entity may define L-SIG, HE-SIG-A, and HE-SIG-B fields. In an embodiment, the symbols in these fields are encoded with the most robust MCS (and therefore least efficient) of the PHY entity.

To prevent excessive consumption of WLAN resource by overhead, the L-SIG, SGI-A, and SIG-B fields have a limited number of bits and it is advantageous to encode them in the most compact form possible. In a receiving STA, the symbols of these fields are decoded first in order to obtain vital information about the PSDU attributes and some MAC attributes.

In the IEEE Std 802.11ac, SIG-A and SIG-B fields are called VHT SIG-A and VHT SIG-B fields. Hereinafter, IEEE Std 802.11ax SIG-A and SIG-B fields may be respectively referred to as HE-SIG-A and HE-SIG-B fields, or simply as SIG-A and SIG-B fields.

FIG. 6 illustrates an HE PPDU 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) field 602, a Legacy (i.e. a Non-High Throughput (Non-HT)) Long Training Field (L-LTF) 604, a Legacy Signal (L-SIG) field 606, and a Repeated L-SIG field (RL-SIG) 608, which together comprise a legacy preamble. The L-STF 604 of a non-trigger-based PPDU has a periodicity of 0.8 µs with 10 periods.

The HE PPDU frame 600 also includes an HE-SIG-A field 610, an optional HE-SIG-B field 612, an HE-STF 614, an HE-LTF 616, and an HE-Data field 618.

The legacy preamble, the HE-SIG-A field 610, and the HE-SIG-B field 612 when present, comprise a first part of the HE PPDU frame 600. In an embodiment, the first part of the HE PPDU frame 600 is decoded using a 64-element Discrete Fourier Transform (DFT), having a basic subcarrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration including a Guard Interval (GI) of 4 µs. A number of the HE-SIG-A symbols 620 in the HE-SIG-A field 610 is indicated by $N_{HESIGA}$ and is either 2 or 4.

The HE-SIG-B field 612 is included in Down-Link (DL) Multi-User (MU) PPDUs. The HE-SIG-B field 612 includes a plurality of OFDM HE-SIG-B symbols 622 each having a duration including a Guard Interval (GI) of 4 µs. In embodiments, Single User (SU) PPDUs, Up-Link (UL) MU PPDUs, or both do not include the HE-SIG-B field 612. A number of the HE-SIG-B symbols 622 in the HE-SIG-B field 612 is indicated by $N_{HESIGB}$ and is variable.

An HE-STF 614 of a non-trigger-based PPDU has a periodicity of 0.8 µs with 5 periods. A non-trigger-based PPDU is a PPDU that is not sent in response to a trigger frame. An HE-STF 614 of a trigger-based PPDU has a periodicity of 1.6 µs with 5 periods. A trigger-based PPDU is an UL PPDU sent in response to a trigger frame.

The HE-LTF 616 includes one or more OFDM HE-LTF symbols 626 each having a duration of 12.8 µs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 us excluding the GI, and then removing the second half of the OFDM symbol in a time domain. A number of the HE-LTF symbols 626 in the HE-LTF field 616 is indicated by $N_{HELTF}$, and is equal to 1, 2, 4, 6, or 8.

The HE-Data field 618 includes one or more OFDM HE-Data symbols 628 each having a duration of 12.8 us plus a Guard Interval (GI). A number of the HE-Data symbols 628 in the HE-Data field 618 is indicated by $N_{DATA}$ and is variable.

FIG. 7 shows a Table 1 indicating additional properties of the fields of the HE PPDU frame 600 of FIG. 6, according to an embodiment.

The descriptions below, for sake of completeness and brevity, refer to OFDMA-based 802.11 technology. Unless otherwise indicated, a station refers to a non-AP HE STA, and an AP refers to an HE AP.

Figure 8:
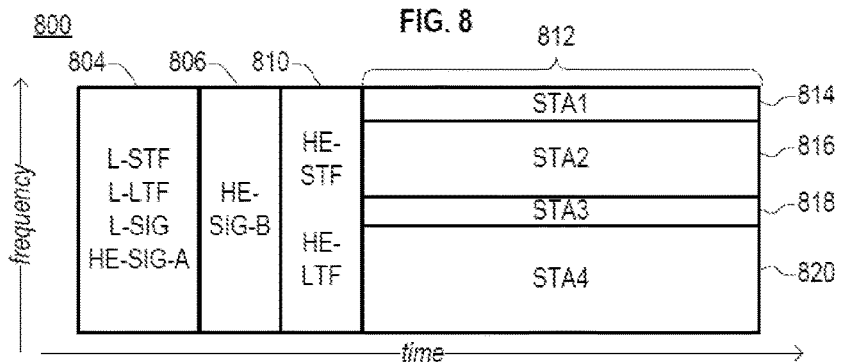
FIG. 8 illustrates a DL MU OFDMA PPDU being transmitted to a set of stations, according to an embodiment.

FIG. 8 illustrates transmission of a DL MU OFDMA PPDU 800 to a set of stations, according to an embodiment. The set of stations includes first, second, third, and fourth stations STA1, STA2, STA3, and STA4. The concepts described herein with respect to DL OFDMA frame 800 also apply to UL OFDMA frames unless specifically stated otherwise. The bandwidth of the DL OFDMA frame 800 may be 20, 40, 80, 160, or 80+80 MHz.

In FIG. 8, a horizontal dimension is a time dimension or number of OFDM symbols, and a vertical dimension is a frequency dimension, or a number of tones or subcarriers. For a given Fourier Transform (FT) size, the number of tones is a fixed value; however, depending on the subcarrier spacing, two OFDM symbols with, for example, respective FT sizes of 64 and 256 may require the same bandwidth to transmit.

Hereinafter, the term sub-band refers to a set of contiguous subcarriers that as a whole are assigned for a payload whose expected destination is a single station, or a set of stations. A set of sub-bands or a set of subcarriers may also be referred to as a Resource Unit (RU). A sub-band is represented in FIG. 8 as a horizontal partition of the DL OFDMA PPDU 800 where a set of contiguous tones for a contiguous set of OFDM symbols are designated for a given payload whose expected destination is a station or a set of stations. The bandwidth assigned to payloads of the stations STA1 to STA4 depend on the respective payload sizes, on a MCSs and numbers of spatial streams that the AP determines for the respective sub-band transmissions, and on the overall considerations that the AP needs to address in order to align the length or duration of various PSDU sub-bands.

The DL OFDMA PPDU 800 includes a first portion 804 including an L-STF, an L-LTF, and an L-SIG field based on IEEE Std 802.11n and 802.11ac. The symbols in these fields serve to make the DL OFDMA PPDU 800 compatible with legacy designs and products.

The L-STF, L-LTF, and L-SIG symbols of the first portion 804 are modulated using a Fourier Transform (FT) size of 64 on a 20 MHz channel and are duplicated within each 20 MHz channel of the DL OFDMA PPDU 800 when the DL OFDMA PPDU 800 has a bandwidth wider than 20 MHz.

The first portion 804 also includes an HE-SIG-A field. The symbols of the HE-SIG-A field may carry necessary information regarding each PSDU and regarding the RF, PHY, and MAC properties of the DL OFDMA PPDU 800.

The DL OFDMA PPDU 800 includes an HE-SIG-B field 806. The symbols of the HE-SIG-B field 806 may carry necessary information regarding each PSDU and regarding the RF, PHY, and MAC properties of the DL OFDMA PPDU 800. In an embodiment, the HE-SIG-B field 806 may not always be present in all DL OFDM PPDUs and is not present in UL OFDMA PPDUs.

In an embodiment, the HE SIG-A field of the first portion 804 and HE-SIG-B field 806 are modulated using an FT size of 64. In another embodiment, the HE SIG-A field of the first portion 804 and HE-SIG-B field 806 are modulated using an FT size of 256. In another embodiment, the HE SIG-A field of the first portion 804 are modulated using an FT size of 64 and the HE-SIG-B field 806 are modulated using an FT size of 256.

The DL OFDMA PPDU 800 includes HE-STF and HE-LTF symbols in a second portion 810. The HE-STF and HE-LTF symbols are used to perform necessary RF and PHY processing for each PSDU in the DL OFDMA PPDU 800, for the whole DL OFDMA PPDU 800, or both. Depending on whether the HE-STF and HE-LTF symbols in the second portion 810 are beamformed or not, there might be two or more sets of such symbols.

The DL OFDMA PPDU 800 includes a Multi-User (MU) payload region 812. The MU payload region 812 includes first, second, third, and fourth unicast PSDUs 814, 816, 818, and 820 intended for the first, second, third, and fourth stations STA1, STA2, STA3, and STA4, respectively. Each unicast PSDU 814, 816, 818, and 820 contains a respective payload that is destined to the respective stations STA1, STA2, STA3, and STA4 plus necessary MAC padding and PHY padding. The unicast PSDU 814, 816, 818, and 820 are sub-band PSDUs.

A bandwidth of the MU payload region 812 is divided into one or more Resource Units (RUs), and each of the PSDUs 814, 816, 818, and 820 are allocated one or more of the RUs. In an embodiment, an RU is allocated to no more than one PSDU.

The unicast PSDUs 814, 816, 818, and 820 are destined to respective stations that are associated with the AP. The presence and length of unicast PSDUs 814, 816, 818, and 820 in respective one or more sub-bands and the respective stations that are the recipients of the unicast PSDUs 814, 816, 818, and 820 may be indicated by the HE SIG-A field, the HE-SIG-B field, or both.

In an embodiment, the DL OFDMA PPDU 800 may include a full-band transmission region (not shown) for unicast or broadcast/multicast full-band PSDU(s). The full-band transmission region may be an optional region in a DL OFDMA PPDU 800 and may have a variable length. The full-band transmission region includes one or more sequential symbols that each covers the whole bandwidth of the DL OFDMA PPDU 800 and that occur before the start of a MU payload region 812. The full-band transmission region may not be present in an UL OFDMA PPDU.

When the full-band transmission region is present in the DL OFDMA PPDU 800, there may be a set of HE-STF and/or HE-LTF symbols that immediately precede the full-band PSDUs included in the full-band transmission region (not shown), where the set of HE-STF and/or HE-LTF symbols are not beamformed. The one or more full-band PSDUs in the full-band transmission region 808 could be carried with FT size=64 or FT size=256 according to a design choice to have the full-band PSDUs in the full-band transmission region 808 carried with FT size=64 as the HE-SIG-A field is or carried with FT size=256 as the MU payload region 812 is.

One or more of a Broadcast full-band PSDU, a Multicast full-band PSDU, and a unicast full-band PSDUs may be located in the full-band transmission region and destined to all, some, or one, respectively, of the stations that are associated with the AP. The presence and length of the full-band PSDUs may be indicated in the HE SIG-A field, the HE-SIG-B field, or both.

Each PSDU in the DL OFDMA PPDU 800, whether full-band or sub-band, contains a payload that is destined to a station, or to several stations, plus the necessary MAC padding and PHY padding.

Figure 9:
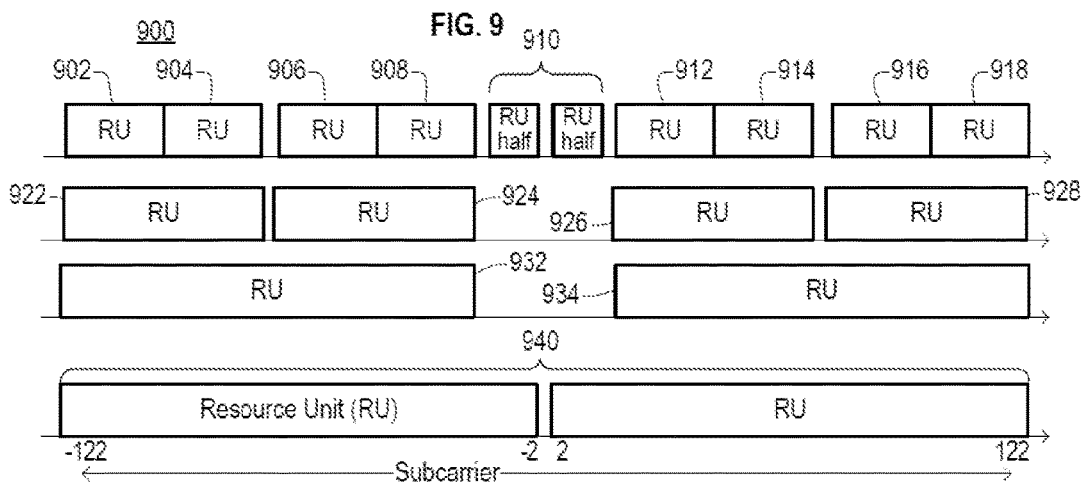
FIG. 9 illustrates Resource Unit (RU) definitions in a 20 MHz bandwidth, according to an embodiment.

FIG. 9 illustrates Resource Unit (RU) definitions in a 20 MHz bandwidth 900 according to an embodiment. Within the 20 MHz bandwidth 900 are defined:

first to ninth 26-subcarrier RUs 902, 904, 906, 908, 910, 912, 914, 916, and 918, each occupying approximately 2 MHz of the bandwidth, first to fourth 52-subcarrier RUs 922, 924, 926 and 928, each occupying approximately 4 MHz of the bandwidth, first and second 106-subcarrier RUs 932 and 934, each occupying approximately 8 MHz of the bandwidth, and a 242-subcarrier RU 940 occupying 40 MHz of the bandwidth.

Figure 10A:
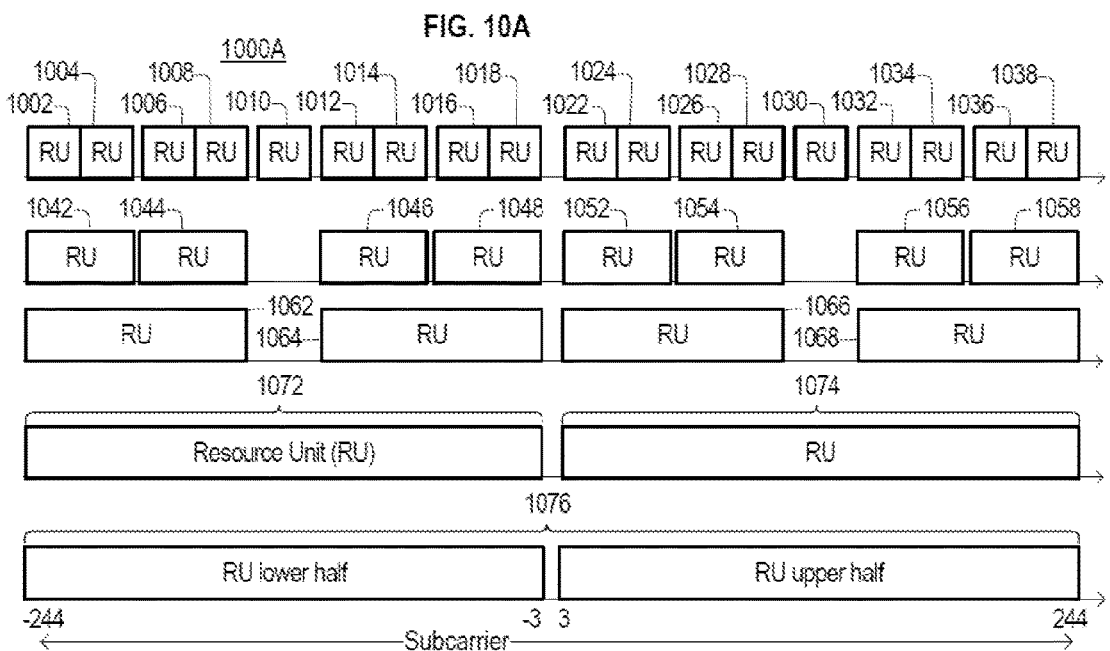
FIG. 10A illustrates RU definitions in a 40 MHz bandwidth, according to an embodiment.

FIG. 10A illustrates RU definitions in a 40 MHz bandwidth 1000A according to an embodiment. Within the 40 MHz bandwidth 1000A are defined:

first to eighteenth 26-subcarrier RUs 1002, 1004, 1006, 1008, 1010, 1012, 1014, 1016, 1018, 1022, 1024, 1026, 1028, 1030, 1032, 1034, 1036, and 1038, each occupying approximately 2 MHz of the bandwidth, first to eighth 52-subcarrier RUs 1042, 1044, 1046, 1048, 1052, 1054, 1056, and 1058, each occupying approximately 4 MHz of the bandwidth, first to fourth 106-subcarrier RUs 1062, 1064, 1066, and 1068, each occupying approximately 8 MHz of the bandwidth, first and second 242-subcarrier RUs 1072 and 1074, each occupying 20 MHz of the bandwidth, and a 484-subcarrier RU 1076 occupying 40 MHz of the bandwidth.

FIG. 10B illustrates RU definitions in an 80 MHz bandwidth 1000B according to an embodiment. Within the 80 MHz bandwidth 1000B are defined:

first to eighteenth 26-subcarrier RUs 1002a, 1004a, 1006a, 1008a, 1010a, 1012a, 1014a, 1016a, 1018a, 1022a, 1024a, 1026a, 1028a, 1030a, 1032a, 1034a, 1036a, and 1038a, each occupying approximately 2 MHz of the bandwidth of a left (lower) 40 MHz of the 80 MHz bandwidth 1000B, a nineteenth 26-subcarrier RU 1080 occupying a center 2 MHz bandwidth of the 80 MHz bandwidth 1000B, twentieth to thirty-seventh 26-subcarrier RUs 1002b, 1004b, 1006b, 1008b, 1010b, 1012b, 1014b, 1016b, 1018b, 1022b, 1024b, 1026b, 1028b, 1030b, 1032b, 1034b, 1036b, and 1038b, each occupying approximately 2 MHz of the bandwidth of a right (upper) 40 MHz of the 80 MHz bandwidth 1000B, first to eighth 52-subcarrier RUs 1042a, 1044a, 1046a, 1048a, 1052a, 1054a, 1056a, and 1058a, each occupying approximately 4 MHz of the bandwidth of the left 40 MHZ, ninth to sixteenth 52-subcarrier RUs 1042b, 1044b, 1046b, 1048b, 1052b, 1054b, 1056b, and 1058b, each occupying approximately 4 MHz of the bandwidth of the right 40 MHZ, first to fourth 106-subcarrier RUs 1062a, 1064a, 1066a, and 1068a, each occupying approximately 8 MHz of the bandwidth of the left 40 MHZ, fifth to eighth 106-subcarrier RUs 1062b, 1064b, 1066b, and 1068b, each occupying approximately 8 MHz of the bandwidth of the right 40 MHZ, first and second 242-subcarrier RUs 1072a and 1074a, each occupying 20 MHz of the bandwidth of the left 40 MHZ, third and fourth 242-subcarrier RUs 1072b and 1074b, each occupying 20 MHz of the bandwidth of the right 40 MHZ, first and second 484-subcarrier RUs 1078a and 1078b occupying the left 40 MHz and the right 40 MHz, respectively, and a 996-subcarrier RU 1082 occupying 80 MHz of the bandwidth.

For the RUs of FIGS. 9, 10A, and 10B, a bandwidth being used to provide a 26- or 52-subcarrier RU in a PPDU may not be used to provide another RU in the PPDU. For example, if a 2 MHz bandwidth corresponding to first 26-subcarrier RU 902 is used to provide the first 26-subcarrier RU 902 in a 20 MHz PPDU, then the first 52-subcarrier RU 922, the first 106-subcarrier RU 932, and the 242-subcarrier RU 940 are not provided within the 20 MHz PPDU.

When beamforming is used to transmit a PPDU, a bandwidth being used to provide a 106-, 242, 484, or 996-subcarrier RU in the PPDU may not be used to provide another RU in the same beam but can be used to provide different RUs in different beams. When beamforming is not used, a bandwidth being used to provide the 106-, 242, 484, or 996-subcarrier RU in the PPDU may not be used to provide another RU.

A bandwidth allocation to stations (that is, an allocation of respective RUs to the stations) for a DL MU PPDU may be communicated in a SIG-B field. The SIG-B may have dynamic length in IEEE Std 802.11ax. When there are a large number of stations participating in a single MU session, the length of the SIG-B field may become very large. In embodiments, the length of the SIG-B field is reduced by compressing the allocation information included in the SIG-B field.

Embodiments disclosed herein include methods of compressing the allocation information. Embodiments include variable-length compression techniques that reduce the length of the SIG-B field compared to using uncompressed allocation information.

FIG. 11A is a flow chart of a process 1100 for a hierarchical encoding of a bandwidth allocation, according to an embodiment. The process 1100 produces a variable length sequence of bits (i.e., a bit string) that conveys which RUs of a 20 MHz bandwidth are allocated to respective stations. In an embodiment, the variable-length bit-stream is incorporated into a SIG-B field (such as an HE-SIG-B field) of a PPDU to be transmitted.

At S1102, the process 1100 clears the bit string by setting the length of the bit string to zero.

At S1104, the process 1100 appends to the bit string a first bit indicating whether a center 2 MHz (26-subcarrier) RU is allocated to a station. When the center RU is allocated to a station, the first bit has a first value (here, a 1). When the center RU is not allocated to a station, the first bit has a second value (here, a zero). The process 1100 is performed for the PPDUs with bandwidth that have a middle RU in their structure, such as 20 MHz PPDUs and 80 MHz PPDUs and 80+80 MHz PPDUs. For 40 MHz PPDUs, where there does not exist a middle 26-tone RU the process of 1100 is not performed.

At S1106, the process 1100 appends to the bit string a second bit indicating whether a first 8 MHz bandwidth of the 20 MHz bandwidth includes at least one RU that is allocated to a station. In an embodiment, the first 8 MHz bandwidth is a lower 8 MHz bandwidth of the 20 MHz bandwidth. When the first 8 MHz bandwidth includes at least one RU that is allocated to a station, the second bit has the first value. When the first 8 MHz bandwidth does not include at least one RU allocated to a station, the second bit has the second value.

At S1108, the process 1100 appends to the bit string a third bit indicating whether a second 8 MHz bandwidth of the 20 MHz bandwidth includes at least one RU that is allocated to a station. In an embodiment, the second 8 MHz bandwidth is an upper 8 MHz bandwidth of the 20 MHz bandwidth. When the second 8 MHz bandwidth includes at least one RU that is allocated to a station, the third bit has the first value. When the second 8 MHz bandwidth does not include at least one RU allocated to a station, the third bit has the second value.

At S1110, the process 1100 initializes a loop counter N for sequencing through the first and second 8 MHz bandwidths.

At S1112, the process 1100 determines whether a bit of the bit string corresponding to the $N^{th}$ 8 MHz bandwidth (such as one of the bits set in S1106 and S1108) is set to the first value (here, 1). When the bit is set to the first value, indicating that at least one RU of the $N^{th}$ 8 MHz bandwidth is allocated to a station, the process 1100 proceeds to S1120 to encode allocation information for the $N^{th}$ 8 MHz bandwidth in the next two bits of the bit string. Otherwise, at S1112 the process 1100 proceeds to S1114.

At S1114, the process 1100 increments the loop counter N.

At S1116, the process 1100 determines whether the loop counter N has a value less than or equal to two. When the loop counter N has a value less than or equal to two, the loop is not complete and the process 1100 proceeds back to S1112. Otherwise, the process 1100 proceeds to S1130 to encode additional allocation information.

At S1120, the process 1100 determines whether all of the RUs in the $N^{th}$ 8 MHz bandwidth are allocated to a same station. When all of the RUs in the $N^{th}$ 8 MHz bandwidth are allocated to the same station, the process 1100 proceeds to S1122. Otherwise, at S1120 the process 1100 proceeds to S1126.

At S1122, the process 1100 appends two bits each having the second value (here, 0) to the bit string, which indicates that all of the RUs in the $N^{th}$ 8 MHz bandwidth are allocated to the same station. For example, when the $N^{th}$ 8 MHz bandwidth includes a 106-subchannel RU allocated to a station, the process 1100 appends two bits each having the second value to the bit string. The process 1100 then proceeds to S1114.

At S1126, the process 1100 appends to the bit string a bit indicating whether a first 4 MHz bandwidth of the $N^{th}$ 8 MHz bandwidth includes at least one RU allocated to a station. In an embodiment, the first 4 MHz bandwidth is a lower 4 MHz bandwidth of the $N^{th}$ 8 MHz bandwidth. When at least one RU of the first 4 MHz bandwidth of the $N^{th}$ 8 MHz bandwidth is allocated to a station, the bit has the first value. When none of the RUs of the first 4 MHz bandwidth of the $N^{th}$ 8 MHz bandwidth are allocated to a station, the bit has the second value.

At S1128, the process 1100 appends to the bit string a bit indicating whether a second 4 MHz bandwidth of the $N^{th}$ 8 MHz bandwidth includes at least one RU allocated to a station. In an embodiment, the second 4 MHz bandwidth is an upper 4 MHz bandwidth of the $N^{th}$ 8 MHz bandwidth. When at least one RU of the second 4 MHz bandwidth of the $N^{th}$ 8 MHz bandwidth is allocated to a station, the bit has the first value. When none of the RUs of the second 4 MHz bandwidth of the $N^{th}$ 8 MHz bandwidth are allocated to a station, the bit has the second value. The process 1100 then proceeds to S1114.

At S1130, the process 1100 begins appending additional allocation information to the bit string, as needed, by initializing the loop counter N for sequencing through the first to fourth 4 MHz bandwidths.

At S1132, the process 1100 determines whether a bit of the bit string corresponding to the $N^{th}$ 4 MHz bandwidth is set to the first value (here, 1). When the bit is set to the first value, indicating that at least one RU of the $N^{th}$ 4 MHz bandwidth is allocated to a station, the process 1100 proceeds to S1120 to encode allocation information for the $N^{th}$ 4 MHz bandwidth in the next two bits of the bit string. Otherwise, at S1132 the process 1100 proceeds to S1134.

At S1134, the process 1100 increments the loop counter N.

At S1136, the process 1100 determines whether the loop counter N has a value less than or equal to four. When the loop counter N has a value less or equal to four, the loop is not complete and the process 1100 proceeds back to S1132. Otherwise, the process 1100 ends. The bit string produced by the process 1100 may then be incorporated into a SIG-B field of a PPDU (such as an HE-SIG-B field) and transmitted over a channel.

At S1140, the process 1100 determines whether all of the RUs in the $N^{th}$ 4 MHz bandwidth are allocated to a same station. When all of the RUs in the $N^{th}$ 4 MHz bandwidth are allocated to the same station, the process 1100 proceeds to S1142. Otherwise, at S1140 the process 1100 proceeds to S1146.

At S1142, the process 1100 appends two bits each having the second value (here, 0) to the bit string, which indicates that all of the RUs in the $N^{th}$ 4 MHz bandwidth are allocated to the same station. For example, when the $N^{th}$ 4 MHz bandwidth includes a 52-subchannel RU allocated to a station, the process 1100 appends two bits each having the second value to the bit string. The process 1100 then proceeds to S1134.

At S1146, the process 1100 appends to the bit string a bit indicating whether a first 2 MHz bandwidth of the $N^{th}$ 4 MHz bandwidth includes at least one RU allocated to a station. In an embodiment, the first 2 MHz bandwidth is a lower 2 MHz bandwidth of the $N^{th}$ 4 MHz bandwidth. When an RU of the first 2 MHz bandwidth of the $N^{th}$ 4 MHz bandwidth is allocated to a station, the bit has the first value. When the RU of the first 2 MHz bandwidth of the $N^{th}$ 8 MHz bandwidth is not allocated to a station, the bit has the second value.

At S1148, the process 1100 appends to the bit string a bit indicating whether a second 2 MHz bandwidth of the $N^{th}$ 4 MHz bandwidth includes at least one RU allocated to a station. In an embodiment, the second 2 MHz bandwidth is an upper 2 MHz bandwidth of the $N^{th}$ 4 MHz bandwidth. When an RU of the second 2 MHz bandwidth of the $N^{th}$ 4 MHz bandwidth is allocated to a station, the bit has the first value. When the RU of the second 2 MHz bandwidth of the $N^{th}$ 4 MHz bandwidth is not allocated to a station, the bit has the second value. The process 1100 then proceeds to S1134.

The length of the bit string produced by the process 1100 is variable and depends on the number of stations, the respective bandwidths allocated to the stations, and the locations of the respective bandwidths.

Figure 11:
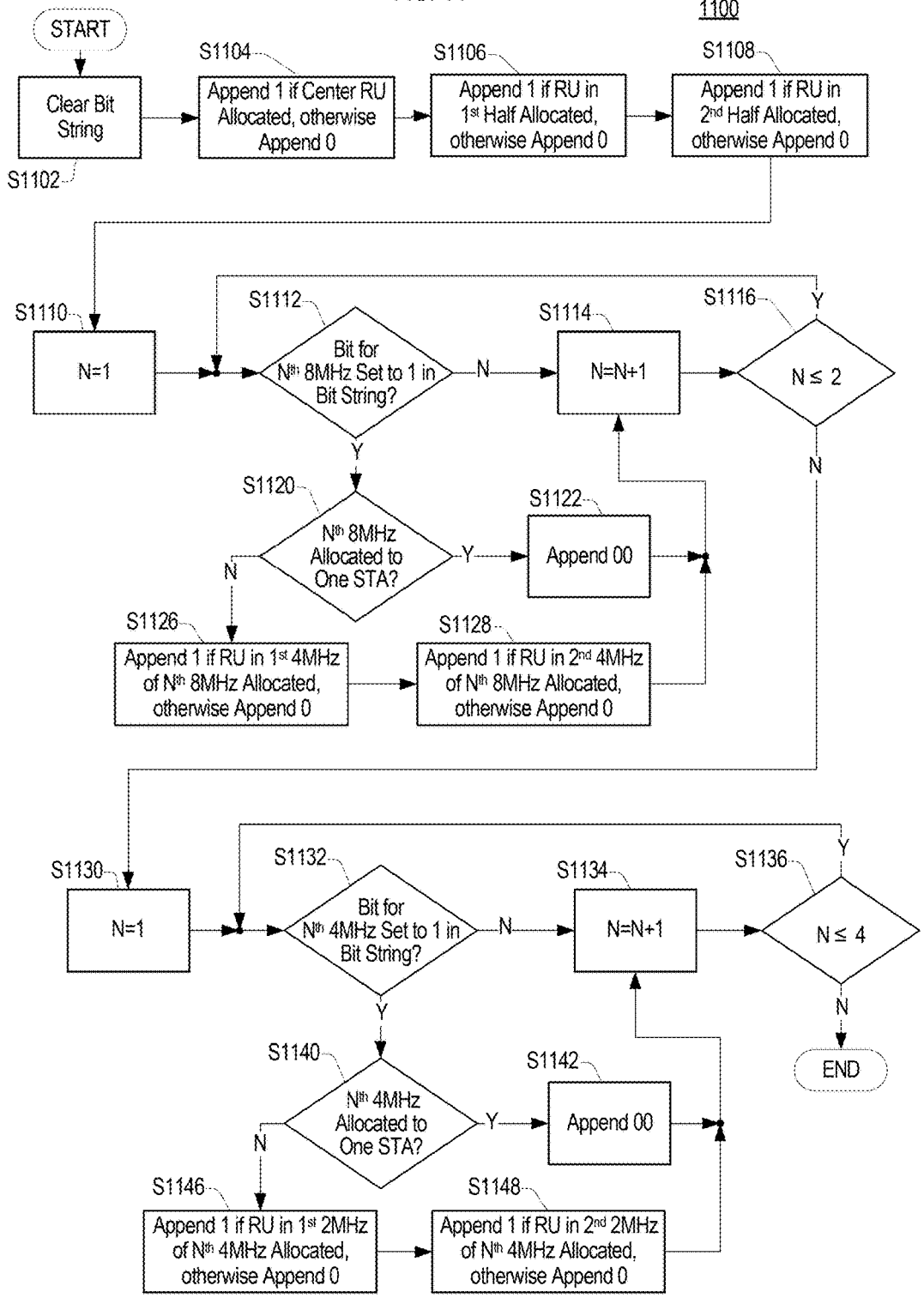
FIG. 11 illustrates a process for a hierarchical encoding of a bandwidth allocation, according to an embodiment.

The process 1100 illustrated in FIG. 11 encodes allocation information for a 20 MHz bandwidth at a granularity of 2 MHz, but embodiments are not limited thereto.

For example, in an embodiment, the process 1100 may be adapted to encode allocation information for a 40 MHz bandwidth at a granularity of 2 MHz by performing, in sequence: i) S1102, ii) S1104 to S1108 once for each of upper and lower 20 MHz bandwidths of the 40 MHz bandwidth, iii) S1110 to S1128 once for each of the 20 MHz bandwidths, and iv) S1130 to S1148 once for each of the 20 MHz bandwidths.

In another embodiment, the process 1100 may be adapted to encode allocation information for a 40 MHz bandwidth at a granularity of 2 MHz by first performing S1102 and then performing S1102 to S1148 once for each of upper and lower 20 MHz bandwidths of the 40 MHz bandwidth.

FIG. 15B, described below, illustrates an adaptation of the process 1100, which may be used to encode allocation information for any of a 20, 40, 80 or 160 MHz bandwidth according to an embodiment.

Figure 12:
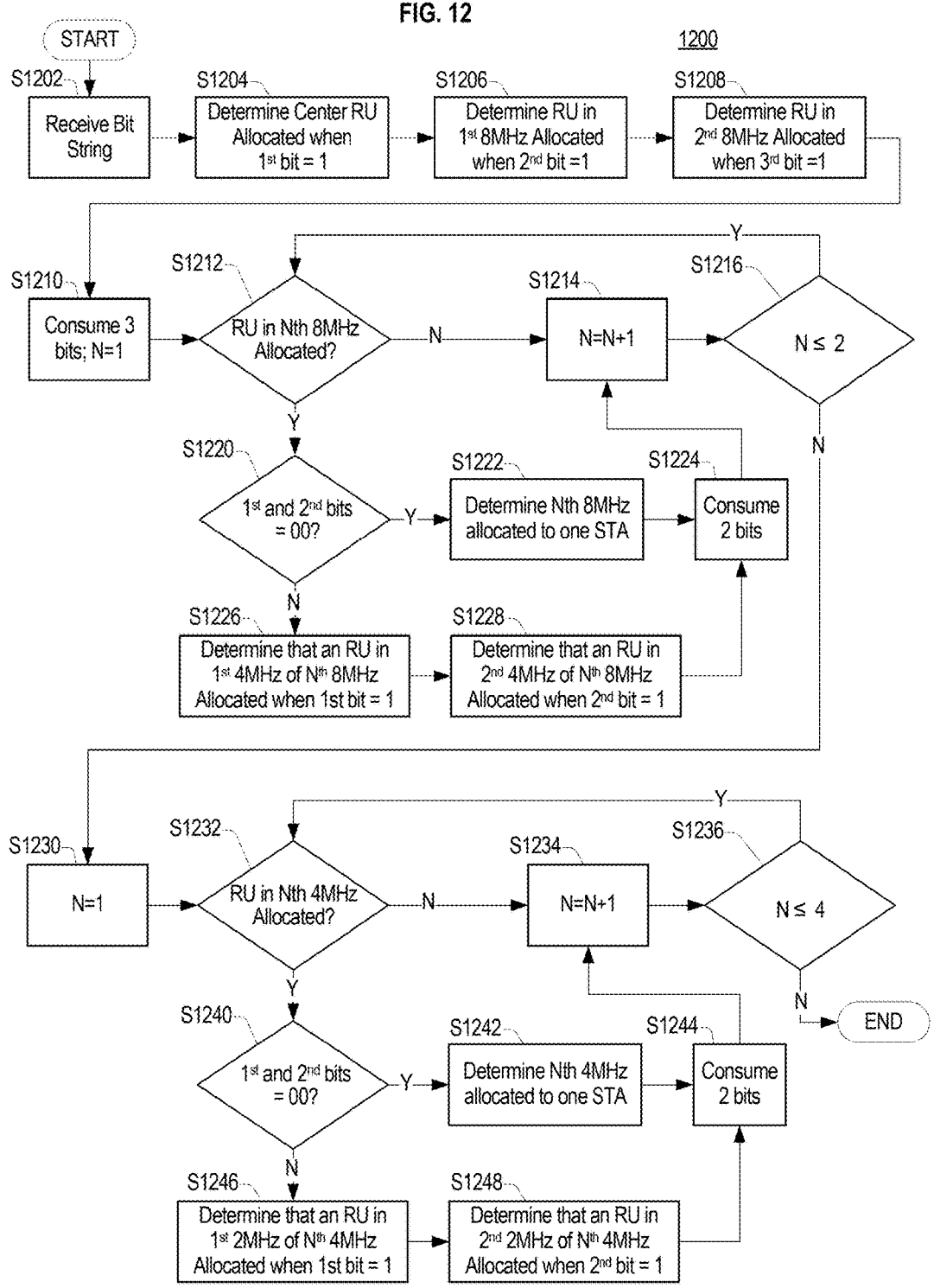
FIG. 12 illustrates a process for determining bandwidth allocation information by hierarchically decoding a variable length bit string, according to an embodiment.

FIG. 12 is a flow chart of a process 1200 for determining bandwidth allocation information by hierarchically decoding a variable length bit string indicating the bandwidth allocation, according to an embodiment. The process 1200 determines bandwidth allocation information of a 20 MHz bandwidth, but embodiments are not limited thereto. In an embodiment, the bit string is a bit string produced by the process 1100 of FIG. 11. In an embodiment, the bit string is a bit string included in a SIG-B field (such as an HE-SIG-B field) of a received PPDU or a copy of such a bit string.

At S1202, the process 1200 receives a bit string having a length at least equal to the maximum possible length of the encoded bandwidth allocation. The bit string may have been received as part of a SIG-B field (such as an HE-SIG-B field) of a PPDU received over a channel, or may be a copy of such a bitstring.

At S1204, the process 1200 determines, using a first bit (i.e., bit 1) of the bit string, whether a center 2 MHz bandwidth (that is, a center RU) of the 20 MHz bandwidth has been allocated to a station. When the first bit has a first value (here, 1), the process 1200 determines that the center RU has been allocated to a station. When the first bit has a second value (here, 0), the process 1200 determines that the center RU has not been allocated to a station. The process 1200 performs the operations of S1204 for the PPDUs with bandwidth that have a middle 26-subchannel RU in their structure, such as 20 MHz PPDUs and 80 MHz PPDUs and 80+80 MHz PPDUs. For 40 MHz PPDUs, where there does not exist a middle 26-subchannel RU, the process 1200 does not perform the operations of S1204.

At S1206, the process 1200 determines, using a second bit (i.e., bit 2) of the bit string, whether a first 8 MHz bandwidth of the 20 MHz bandwidth has at least one RU allocated to a station. When the second bit has the first value, process 1200 determines that the first 8 MHz bandwidth of the 20 MHz bandwidth has at least one RU allocated to a station. When the second bit has the second value, process 1200 determines that the first 8 MHz bandwidth of the 20 MHz bandwidth has no RUs allocated to a station.

At S1208, the process 1200 determines, using a third bit (i.e., bit 3) of the bit string, whether a second 8 MHz bandwidth of the 20 MHz bandwidth has at least one RU allocated to a station. When the third bit has the first value, process 1200 determines that the second 8 MHz bandwidth of the 20 MHz bandwidth has at least one RU allocated to a station. When the third bit has the second value, process 1200 determines that the second 8 MHz bandwidth of the 20 MHz bandwidth has no RUs allocated to a station.

At S1210, the process 1200 consumes the first three bits of the bit string (bits 1 to 3, used in S1204 to S1208) so that a $4^{th}$ bit of the bit string becomes the first bit of the bit string, a $5^{th}$ bit becomes the second bit, and so on. Also, at S1210 the process 1200 sets a loop counter N to 1 in preparation for decoding allocation information for 8 MHz bandwidths.

At S1212, the process 1200 determines whether, in S1206 or S1208, the $N^{th}$ 8 MHz bandwidth was determined to have at least one RU allocated to a station. When the $N^{th}$ 8 MHz bandwidth was determined to have at least one RU allocated to a station, the process 1200 proceeds to S1220 to decode the current first two bits (bits 1 and 2) of the bit string. Otherwise, at S1212 the process 1200 proceeds to S1214.

At S1214, the process 1200 increments the loop counter N.

At S1216, the process 1200 determines whether the loop counter N has a value less than or equal to two. When the loop counter N has a value less or equal to two, the loop is not complete and the process 1200 proceeds back to S1212. Otherwise, the process 1200 proceeds to S1230 to decode any additional allocation information in the bit string.

At S1220, the process 1200 determines whether the first and second bits of the bit string (i.e., bits 1 and 2) both have the second value (here, 0). When the first and second bits both have the second value, the process 1200 proceeds to S1222. Otherwise, at S1220 the process 1200 proceeds to S1226.

At S1222, the process 1200 determines that because the first and second bits both had the second value, the entirety of an $N^{th}$ 8 MHz bandwidth has been allocated to a single station.

At S1224, the process 1200 consumes the first and second bits of the bit string (used in either S1222 or in S1226 and S1228), so that the $3^{rd}$ bit of the bit string becomes the first bit of the bit string, the $4^{th}$ bit becomes the second bit, and so on.

At S1226, when the first bit of the bit string has the first value, the process 1200 determines that at least one RU of a first 4 MHz bandwidth of the $N^{th}$ 8 MHz bandwidth has been allocated to a station. When the first bit of the bit string has the second value, the process 1200 determines that none of the RUs of the first 4 MHz bandwidth of the $N^{th}$ 8 MHz bandwidth have been allocated to a station. In an embodiment, the first 4 MHz bandwidth is a lower 4 MHz bandwidth of the $N^{th}$ 8 MHz bandwidth.

At S1228, when the second bit of the bit string has the first value, the process 1200 determines that at least one RU of a second 4 MHz bandwidth of the $N^{th}$ 8 MHz bandwidth has been allocated to a station. When the first bit of the bit string has the second value, the process 1200 determines that none of the RUs of the second 4 MHz bandwidth of the $N^{th}$ 8 MHz bandwidth have been allocated to a station. In an embodiment, the second 4 MHz bandwidth is an upper 4 MHz bandwidth of the $N^{th}$ 8 MHz bandwidth. The process 1200 then proceeds to S1224.

At S1230, the process 1200 sets the loop counter N to 1, in preparation for decoding allocation information for 4 MHz bandwidths.

At S1232, the process 1200 determines whether, in S1226 or S1228, an $N^{th}$ 4 MHz bandwidth was determined to have at least one RU allocated to a station. When the $N^{th}$ 4 MHz bandwidth was determined to have at least one RU allocated to a station, the process 1200 proceeds to S1240 to decode the current first two bits (bits 1 and 2) of the bit string. Otherwise, at S1232 the process 1200 proceeds to S1234.

At S1234, the process 1200 increments the loop counter N.

At S1236, the process 1200 determines whether the loop counter N has a value less than or equal to four. When the loop counter N has a value less or equal to four, the loop is not complete and the process 1200 proceeds back to S1232. Otherwise, at S1236 the process 1200 ends.

In an embodiment, when the process 1200 ends, unconsumed bits of the bit string may be returned to the process that invoked process 1200 for other processing. In another embodiment, the bit string operated on by process 1200 is a copy of a received bit string and the unconsumed of the bit string are discarded without being processed.

At S1240, the process 1200 determines whether the first and second bits of the bit string (i.e., bits 1 and 2) both have the second value (here, 0). When the first and second bits both have the second value, the process 1200 proceeds to S1242. Otherwise, at S1240 the process 1200 proceeds to S1246.

At S1242, the process 1200 determines that because the first and second bits both had the second value, the entirety of an $N^{th}$ 4 MHz bandwidth has been allocated to a single station.

At S1244, the process 1200 consumes the first and second bits of the bit string (used in either S1242 or in S1246 and S1248), so that the $3^{rd}$ bit of the bit string becomes the first bit of the bit string, the $4^{th}$ bit becomes the second bit, and so on.

At S1246, when the first bit of the bit string has the first value, the process 1200 determines that at least one RU of a first 2 MHz bandwidth of the $N^{th}$ 4 MHz bandwidth has been allocated to a station. When the first bit of the bit string has the second value, the process 1200 determines that none of the RUs of the first 2 MHz bandwidth of the $N^{th}$ 4 MHz bandwidth have been allocated to a station. In an embodiment, the first 2 MHz bandwidth is a lower 2 MHz bandwidth of the $N^{th}$ 4 MHz bandwidth.

At S1248, when the second bit of the bit string has the first value, the process 1200 determines that at least one RU of a second 2 MHz bandwidth of the $N^{th}$ 4 MHz bandwidth has been allocated to a station. When the first bit of the bit string has the second value, the process 1200 determines that none of the RUs of the second 2 MHz bandwidth of the $N^{th}$ 4 MHz bandwidth have been allocated to a station. In an embodiment, the second 2 MHz bandwidth is an upper 2 MHz bandwidth of the $N^{th}$ 4 MHz bandwidth. The process 1200 then proceeds to S1244.

The process 1200 illustrated in FIG. 12 decodes allocation information for a 20 MHz bandwidth at a granularity of 2 MHz, but embodiments are not limited thereto. A person of ordinary skill in the art in light of the teachings and disclosures herein would understand how to adapt the process 1200 to other bandwidths and other granularities.

Figure 15C:
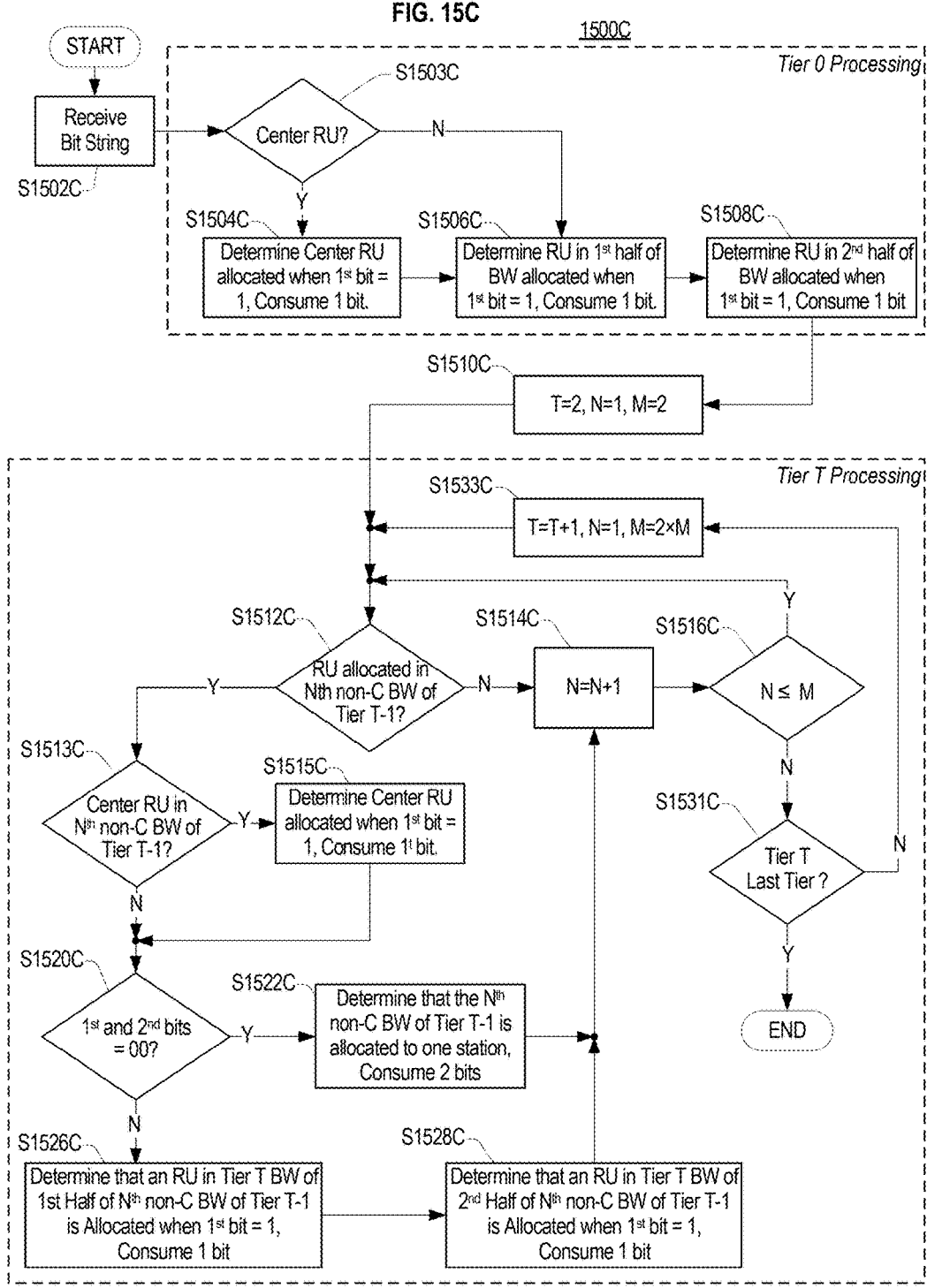
FIG. 15C illustrates a process for determining bandwidth allocation information by hierarchically decoding a variable length bit string, according to an embodiment.

FIG. 15C, described below, illustrate an example adaptation of the process 1200 which may be used to decode allocation information for any of a 20, 40, 80 or 160 MHz bandwidth according to an embodiment.

FIG. 13 shows an illustrative allocation of bandwidths 1300 within a 20 MHz bandwidth. FIG. 14 includes a Table 2 illustrating a sequential construction, using the process 1100 of FIG. 11, of a bit string indicating the bandwidth allocation shown in FIG. 13.

In the example of FIG. 13, all RUs in an entire lower 8 MHz of the 20 MHz bandwidth (here, a 106-subcarrier RU 1302) are allocated to a second station STA2. A middle RU 1304 included in a middle 2 MHz of the 20 MHz bandwidth is allocated to a first station STA1. A 26-subcarrier RU 1306 of a lower 2 MHz bandwidth of a lower 4 MHz bandwidth of the upper 8 MHz bandwidth of the 20 MHz bandwidth is allocated to a third station STA3. No station is allocated to an unallocated RU 1308 in an upper lower 2 MHz bandwidth of the lower 4 MHz bandwidth of the upper 8 MHz bandwidth. A 52-subcarrier RU 1310 of the upper 4 MHz bandwidth of the upper 8 MHz bandwidth is allocated to a fourth station STA4.

In FIG. 14, the bit string is initially empty.

Because the middle RU included in the middle 2 MHz is allocated to a station, at S1104 the process 1100 appends a 1 to the bit string.

Subsequently, because at least one RU in the lower 8 MHz is allocated to a station, at S1106 the process 1100 appends another 1 to the bit string.

Subsequently, because at least one RU in the upper 8 MHz is allocated to a station, at S1108 the process 1100 appends another 1 to the bit string.

Subsequently, the process 1100 appends additional information about the allocations within the 8 MHz bandwidths. For each 8 MHz bandwidth for which a 1 was previously appended to the bit string, two more bits will be appended to the bit string.

Because all of the RUs in the lower 8 MHz are allocated to a same station, at S1122 the process 1100 appends two 0's to the bit string.

Subsequently, because all the RUs of the upper 8 MHz bandwidth are not allocated to a same station, the process 1100 at S1126 appends a 1 to the bit string to indicate that a lower 4 MHz bandwidth of the upper 8 MHz has at least on RU allocated to a station, and at S1128 appends another 1 to the bit string to indicate that an upper 4 MHz bandwidth of the upper 8 MHz has at least on RU allocated to a station.

Subsequently, the process 1100 appends additional information about the allocations within the 4 MHz bandwidths. For each 4 MHz bandwidth for which a 1 was previously appended to the bit string, two more bits will be appended to the bit string.

No additional bits are appended to the bit string for the 4 MHz bandwidths of the lower 8 MHz bandwidth because 0's were appended to the bit string for those 4 MHz bandwidths (indicating that all of the RUs in those 4 MHz bandwidths are allocated to a same station.).

Because all the RUs of the lower 4 MHz bandwidth of the upper 8 MHz bandwidth are not allocated to a same station, the process 1100 at S1146 appends a 1 to the bit string to indicate that a lower 2 MHz bandwidth of the lower 4 MHz bandwidth has an RU allocated to a station, and at S1128 appends a 0 to the bit string to indicate no RUs are allocated to a station in an upper 2 MHz bandwidth of the lower 4 MHz bandwidth.

Subsequently, because all of the RUs in the upper 4 MHz bandwidth of the upper 8 MHz bandwidth are allocated to a same station, at S1142 the process 1100 appends two 0's to the bit string.

FIG. 15 shows a tree 1500 illustrating the variable-length encoding scheme of FIGS. 11-14, according to an embodiment. The tree 1500 expresses bandwidth allocation of a 20 MHz bandwidth, but embodiments are not limited thereto. The tree 1500 includes annotations corresponding to the example bandwidth allocation provided in FIG. 13.

Edges in the tree 1500 are shown in three tiers (Tier 0, Tier 1, and Tier 2), each successive tier corresponding to a potential division of the bandwidth into bandwidths corresponding to smaller RUs.

The tree 1500 includes a root 20 MHz node 1502 corresponding to the entirety of the 20 MHz bandwidth. The tree further includes first and second 8 MHz nodes 1504 and 1508 corresponding to lower and upper 8 MHz bandwidths of the 20 MHz bandwidth, respectively. The tree 1500 also includes middle 2 MHz node 1506 corresponding to a middle 2 MHz bandwidth of the 20 MHz bandwidth, which is also considered the fifth 2 MHz node 1506 because of its position with respect to the other 2 MHz nodes in the tree 1500. The 8 MHz nodes 1504 and 1508 and the fifth 2 MHz node 1506 are child nodes of the root 20 MHz node 1502.

The tree 1500 further includes first and second 4 MHz nodes 1512 and 1514 corresponding to lower and upper 4 MHz bandwidths of the lower 8 MHz bandwidth, respectively. The first and second 4 MHz nodes 1512 and 1514 are therefore child nodes of the first 8 MHz node 1504. The tree 1500 further includes third and fourth 4 MHz nodes 1516 and 1518 corresponding to lower and upper 4 MHz bandwidths of the upper 8 MHz bandwidth, respectively. The third and fourth 4 MHz nodes 1516 and 1518 are therefore child nodes of the second 8 MHz node 1508.

The tree 1500 further includes first to fourth 2 MHz nodes 1522 to 1528. The first and second 2 MHz nodes 1522 and 1524 respectively correspond to lower and upper 2 MHz bandwidths of the lower 4 MHz bandwidth of the lower 8 MHz bandwidth and are therefore child nodes of the first 4 MHz node 1512. The third and fourth 2 MHz nodes 1526 and 1528 respectively correspond to lower and upper 2 MHz bandwidths of the upper 4 MHz bandwidth of the lower 8 MHz bandwidth and are therefore child nodes of the second 4 MHz node 1514.

The tree 1500 further includes sixth to ninth 2 MHz nodes 1532 to 1538. The sixth and seventh 2 MHz nodes 1532 and 1534 respectively correspond to lower and upper 2 MHz bandwidths of the lower 4 MHz bandwidth of the upper 8 MHz bandwidth and are therefore child nodes of the third 4 MHz node 1516. The third and fourth 2 MHz nodes 1536 and 1538 respectively correspond to lower and upper 2 MHz bandwidths of the upper 4 MHz bandwidth of the upper 8 MHz bandwidth and are therefore child nodes of the fourth 4 MHz node 1518.

The arcs connecting a parent node to its child nodes are labeled according to bandwidth allocations of the child nodes. For the root 20 MHz node 1502, the arc connecting to a child node is labeled with a 1 when at least one of the RUs within a bandwidth that the node corresponds to is allocated to a station. The arc connecting to the child node is labeled with a 0 when none of the RUs within the bandwidth that the node corresponds to are allocated to a station.

For the non-root nodes which have two child nodes (nodes 1504, 1508, and 1512 to 1518), arcs are left unlabeled when the arc to the node from its parent is unlabeled or labeled with a 0. When the arcs to the child nodes are not left unlabeled and all of the RUs within both of the child nodes are allocated to the same station, both arcs to the child nodes of the node are labeled with a 0. When the arcs to the child nodes are not left unlabeled and all of the RUs within both of the child nodes are not allocated to the same station, each arc to a child node is labeled with a 1 when at least one of the RUs within a bandwidth that the node corresponds to is allocated to a station, and labeled with a 0 when none of the RUs within the bandwidth that the node corresponds to are allocated to a station.

Accordingly, for the illustrative bandwidth allocation of FIG. 14, the arcs from the root 20 MHz node to 8 MHz nodes 1504 and 1508 and 2 MHz node 1506 are respectively labeled with a 1, indicating that the bandwidths corresponding to each of nodes 1504, 1508, and 1506 includes at least one RU allocated to a station.

Arcs from the 8 MHz node 1504 to the 4 MHz nodes 1512 and 1514 are respectively labeled with a 0, indicating that all of the RUs in the bandwidths corresponding to the 4 MHz nodes 1512 and 1514 are allocated to a same station. Arcs from the 8 MHz node 1508 to the 4 MHz nodes 1516 and 1518 are respectively labeled with a 1, indicating that the bandwidths corresponding to each of the nodes 1516 and 1518 include at least one RU allocated to a station.

Arcs from the 4 MHz nodes 1512 and 1514 to their child nodes are respectively unlabeled because the respective arcs from the parent of the 4 MHz nodes 1512 and 1514 are labeled with a 0.

Arcs from the 4 MHz node 1516 to the 2 MHz nodes 1532 and 1534 are respectively labeled with a 1 and a 0, indicating that at least one RUs in the bandwidth corresponding to the sixth 2 MHz node 1532 is allocated to a station and that no RUs in the bandwidth corresponding to the seventh 2 MHz node 1532 are allocated to a station. Arcs from the 4 MHz node 1518 to the 2 MHz nodes 1536 and 1538 are respectively labeled with 0's, indicating that all the RUs included the respective bandwidths of the nodes 1536 and 1538 are allocated to a same station.

As can be seen in FIG. 15, a variable-length bit string indicating the allocation information can be constructed by a breadth first reading of the labels of the arcs of the tree 1500.

FIG. 15B is a flow chart of a process 1500B for a hierarchical encoding of a bandwidth allocation, according to an embodiment. The process 1500B produces a variable length sequence of bits (i.e., a bit string) that conveys which RUs of a channel bandwidth (for example, a 20, 40, 80 or 160 MHz bandwidth) are allocated to respective stations. In an embodiment, the variable-length bit-stream is incorporated into a SIG-B field (such as an HE-SIG-B field) of a PPDU to be transmitted.

The process 1500B is a generalization of the process 1100 of FIG. 11. The process 1500B operates by first performing an initial series of operations in S1502B to S1508B for a tier 0 of nodes in the tree 1500. The process 1500B then recursively performs the operations in S1511B to S1531B for each successive tier of nodes in the tree 1500.

At S1502B, the process 1500B clears the bit string by setting the length of the bit string to zero.

At S1503B, the process 1500B determines whether Tier 1 includes a center BW corresponding to a center RU, that is, whether the channel bandwidth includes a center RU. When Tier 1 includes a center RU, the process 1500B proceeds to S1504B. Otherwise, at S1503B the process 1500B proceeds to S1506B. In an embodiment, channel bandwidths that include a center RU may be 20 MHz channel bandwidths and 80 MHz channel bandwidths.

At S1504B, the process 1500B appends to the bit string a first bit indicating whether the center (2 MHz, 26-subcarrier) RU of the channel bandwidth is allocated to a station. When the center RU is allocated to a station, the first bit has a first value (here, a 1). When the center RU is not allocated to a station, the first bit has a second value (here, a 0).

At S1506B, the process 1500B appends to the bit string a second bit indicating whether a first half of the channel bandwidth, exclusive of a center RU if any, includes at least one RU that is allocated to a station. In an embodiment, the first half of the channel bandwidth is a lower half of the channel bandwidth. When the first half of the channel bandwidth includes at least one RU that is allocated to a station, the second bit has the first value. When the first half of the channel bandwidth does not include at least one RU allocated to a station, the second bit has the second value.

At S1508B, the process 1500B appends to the bit string a third bit indicating whether a second half of the channel bandwidth includes at least one RU that is allocated to a station. In an embodiment, the second half of the channel bandwidth is an upper half of the channel bandwidth. When the second half of the channel bandwidth includes at least one RU that is allocated to a station, the third bit has the first value. When the second half of the channel bandwidth does not include at least one RU allocated to a station, the third bit has the second value.

At S1510B, the process 1500B initializes a loop counter N for sequencing through the non-center RUs of Tier 1, initializes a tier indicator T to 2 to indicate Tier 2, and initializes an iteration limit M to the number of non-center (non-C) bandwidths in Tier 1, that is, to 2.

At S1512B, the process 1500B determines whether a bit of the bit string corresponding to the Nth non-Center bandwidth (BW) of Tier T−1 (such as one of the bits set in one of S1506C, S1508C, S1526C, and S1528C) is set to the first value (here, 1). When the bit is set to the first value, indicating that at least one RU in the bandwidth of the Nth non-Center BW of Tier T−1 is allocated to a station, the process 1500B proceeds to S1513B to encode allocation information for bandwidths within the Nth non-Center BW of Tier T−1 in the next two or three bits of the bit string. Otherwise, at S1512B the process 1500B proceeds to S1514B.

At S1514B, the process 1500B increments the loop counter N and proceeds to S1516B.

At S1516B, the process 1500B determines whether the loop counter N has a value less than or equal to the iteration limit M. When the loop counter N has a value less than or equal to the iteration limit M, the processing of Tier T is not complete and the process 1500B proceeds back to S1512B. Otherwise, at S1516B the process 1500B proceeds to S1531B.

At S1513B, the process 1500B determines whether the $N^{th}$ non-Center BW of Tier T−1 includes a center RU. When the $N^{th}$ non-Center BW of Tier T−1 includes a center RU, the process 1500B proceeds to S1515B. Otherwise, at S1503B the process 1500B proceeds to S1520B. In an embodiment, whether the $N^{th}$ non-Center BW of Tier T−1 includes a center RU is determined using the bandwidth of the $N^{th}$ non-Center BW of Tier T−1.

For example, in the 40 MHz bandwidth 1000A shown in FIG. 10, the fifth 26-subcarrier RU is a center RU of the first half of the 40 MHz bandwidth 1000A, which corresponds to the $1^{st}$ non-center BW of Tier 1 of a tree representing allocations in the 40 MHz bandwidth 1000A. The fourteenth 26-subcarrier RU is a center RU of the second half of the 40 MHz bandwidth 1000A, which corresponds to the $2^{nd}$ non-center BW of Tier 1 of the tree.

At S1515B, the process 1500B appends to the bit string a bit indicating whether the center RU of the $N^{th}$ non-Center BW of Tier T−1 is allocated to a station. When the center RU is allocated to a station, the first bit has a first value (here, a 1). When the center RU is not allocated to a station, the first bit has a second value (here, a 0).

At S1520B, the process 1500B determines whether all of the RUs in the $N^{th}$ non-Center BW of Tier T−1 are allocated to a same station. When all of the RUs in the $N^{th}$ non-Center BW of Tier T−1 are allocated to the same station, the process 1500B proceeds to S1522B. Otherwise, at S1520B the process 1500B proceeds to S1526B.

At S1522B, the process 1500B appends two bits each having the second value (here, 0) to the bit string, which indicates that all of the RUs in the $N^{th}$ non-Center BW of Tier T−1 are allocated to the same station. For example, when the $N^{th}$ non-Center BW of Tier T−1 corresponds to a 106-subchannel RU allocated to a single station, the process 1500B appends two bits each having the second value to the bit string. The process 1500B then proceeds to S1514B.

At S1526B, the process 1500B appends to the bit string a bit indicating whether a first half of the bandwidth of the $N^{th}$ non-Center BW of Tier T−1, exclusive of a center RU if there is one, includes at least one RU allocated to a station. The first half of the bandwidth of the $N^{th}$ non-Center BW of Tier T−1 corresponds to a non-center BW of Tier T. When at least one RU of the first half of the bandwidth is allocated to a station, the bit has the first value. When none of the RUs of the first half of the bandwidth are allocated to a station, the bit has the second value.

At S1528B, the process 1500B appends to the bit string a bit indicating whether a second half of the bandwidth of the $N^{th}$ non-Center BW of Tier T−1 includes at least one RU allocated to a station. The second half of the bandwidth of the $N^{th}$ non-Center BW of Tier T−1 corresponds to another non-center BW of Tier T. When at least one RU of the second half of the bandwidth is allocated to a station, the bit has the first value. When none of the RUs of the second half of the bandwidth are allocated to a station, the bit has the second value. The process 1500B then proceeds to S1514B.

In an embodiment, the first half of the bandwidth is a lower half of the bandwidth of the $N^{th}$ non-Center BW of Tier T−1, excluding a center RU of the $N^{th}$ non-Center BW of Tier T−1 if there is one, and the second half of the bandwidth is an upper half of the bandwidth of the $N^{th}$ non-Center BW of Tier T−1, excluding the center RU if there is one.

At S1531B, the process 1500B determines the Tier T is the last tier of the bandwidth allocation tree; that is, the tier composed of bandwidths each corresponding to the smallest RU supported within the channel bandwidth. In an embodiment, the last tier is composed entirely of 2 MHz bandwidths corresponding to 26-subcarrier RUs. When the Tier T is not the last tier, the process 1500B proceeds to S1533B. Otherwise, at S1531B the process ends.

At S1533B, the process 1500B increments the tier indicator T by 1, initializes the loop counter N to 1, and sets the iteration limit M to indicate the number of non-center bandwidths in the next tier to be processed. In an embodiment, each tier has twice the number of non-center bandwidths as the previous tier, and the iteration limit M is therefore multiplied by two. The process 1500C then proceeds to S1512B.

FIG. 15C is a flow chart of a process 1500C for a hierarchical decoding of a bandwidth allocation, according to an embodiment. The process 1500C decodes a variable length sequence of bits (i.e., a bit string) that conveys which RUs of a channel bandwidth (for example, a 20, 40, 80 or 160 MHz bandwidth) are allocated to respective stations. The bit string may be a bit string generated using the process 1500B of FIG. 15B. In an embodiment, the variable-length bit-stream is incorporated into a SIG-B field (such as an HE-SIG-B field) of a PPDU to be transmitted.

The process 1500C is a generalization of the process 1200 of FIG. 12. The process 1500C operates by first performing an initial series of operations in S1502C to S1508C for a tier 0 of nodes in the tree 1500. The process 1500C then recursively performs the operations in S1511C to S1531C for each successive tier of nodes in the tree 1500.

At S1502C, the process 1500C receives a bit string.

At S1503C, the process 1500C determines whether Tier 1 includes a center BW corresponding to a center RU, that is, whether the channel bandwidth includes a center RU. When Tier 1 includes a center RU, the process 1500C proceeds to S1504C. Otherwise, at S1503C the process 1500C proceeds to S1506C. In an embodiment, channel bandwidths that include a center RU may be 20 MHz channel bandwidths and 80 MHz channel bandwidths.

At S1504C, the process 1500C determines that a center (2 MHz, 26-subcarrier) RU of the channel bandwidth is allocated to a station when a first bit of the bit string has a first value (here, a 1), and determines that the center RU of the channel bandwidth is not allocated to a station when the first bit has a second value (here, a 0). The process 1500C then consumes one bit from the beginning of the bit string, so that the $2^{nd}$, $3^{rd}$, $4^{th}$, ... $n^{th}$ bits of the bit string respectively become the $1^{st}$, $2^{nd}$, $3^{rd}$, ... $n-1^{th}$ bits of the bit string.

At S1506C, the process 1500C determines that a first half of the channel bandwidth includes at least one RU that is allocated to a station when the first bit of the bit string has the first value, and determines that the first half of the channel bandwidth has no RUs allocated to a station when the first bit has the second value. In an embodiment, the first half of the channel bandwidth is a lower half of the channel bandwidth. The process 1500C then consumes one bit from the beginning of the bit string.

At S1508C, the process 1500C determines that a second half of the channel bandwidth includes at least one RU that is allocated to a station when the first bit of the bit string has the first value, and determines that the second half of the channel bandwidth has no RUs allocated to a station when the first bit has the second value. In an embodiment, the second half of the channel bandwidth is an upper half of the channel bandwidth. The process 1500C then consumes one bit from the beginning of the bit string.

At S1510C, the process 1500C initializes a loop counter N for sequencing through the non-center RUs of Tier 1, initializes a tier indicator T to 2 to indicate the second tier Tier 2, and initializes an iteration limit M to the number of non-center (non-C) bandwidths in Tier 1, that is, to 2.

At S1512C, the process 1500C determines whether the Nth non-Center bandwidth (BW) of Tier T−1 had previously been determined to include at least one RU allocated to a station (such as may have been determined in one of S1506C, S1508C, S1526C, and S1528C). When the Nth non-Center BW of Tier T−1 had previously been determined to include at least one RU allocated to a station, the process 1500C proceeds to S1520C to decode allocation information for bandwidths within the $N^{th}$ non-Center BW of Tier T−1. Otherwise, at S1512C the process 1500C proceeds to S1514C.

At S1514C, the process 1500C increments the loop counter N and proceeds to S1516C.

At S1516C, the process 1500C determines whether the loop counter N has a value less than or equal to the iteration limit M. When the loop counter N has a value less than or equal to the iteration limit M, the processing of Tier T is not complete and the process 1500C proceeds back to S1512C. Otherwise, at S1516C the process 1500C proceeds to S1531C.

At S1513C, the process 1500C determines whether the $N^{th}$ non-Center BW of Tier T−1 includes a center RU. When the $N^{th}$ non-Center BW of Tier T−1 includes a center RU, the process 1500C proceeds to S1515C. Otherwise, at S1503C the process 1500C proceeds to S1520C. In an embodiment, whether the $N^{th}$ non-Center BW of Tier T−1 includes a center RU is determined using the bandwidth of the $N^{th}$ non-Center BW of Tier T−1.

For example, in the 40 MHz bandwidth 1000A shown in FIG. 10, the fifth 26-subcarrier RU is a center RU of the first half of the 40 MHz bandwidth 1000A, which corresponds to the $1^{st}$ non-center BW of Tier 1 of a tree representing allocations in the 40 MHz bandwidth 1000A. The fourteenth 26-subcarrier RU is a center RU of the second half of the 40 MHz bandwidth 1000A, which corresponds to the $2^{nd}$ non-center BW of Tier 1 of the tree.

At S1515C, the process 1500C determines that the center RU of the $N^{th}$ non-Center BW of Tier T−1 is allocated to a station when the first bit of the bit string has the first value, and determines that the center RU is not allocated to a station when the $1^{st}$ bit has the second value. The process 1500C then consumes one bit from the beginning of the bit string.

At S1520C, the process 1500C determines that all of the RUs in the $N^{th}$ non-Center BW of Tier T−1 are allocated to a same station by determining whether the first two bits of the bit string are both the second value. When the first two bits of the bit string are both the second value, the process 1500C proceeds to S1522C. Otherwise, at S1520C the process 1500C proceeds to S1526C.

At S1522C, the process 1500C determines that all of the RUs in the $N^{th}$ non-Center BW of Tier T−1 are allocated to a same station. The process 1500C then consumes two bits from the beginning of the bit string and then proceeds to S1514C.

At S1526C, the process 1500C determines that the first half of the bandwidth of the $N^{th}$ non-Center BW of Tier T−1, exclusive of a center RU if there is one, includes at least one RU allocated to a station when the first bit of bit string has the first value, and determines that no RU in the first half of the bandwidth of the $N^{th}$ non-Center BW of Tier T−1 is allocated to a station when the $1^{st}$ bit has the second value. The first half of the bandwidth of the $N^{th}$ non-Center BW of Tier T−1 corresponds to a non-center BW of Tier T. The process 1500C then consumes one bit from the beginning of the bit string.

At S1526C, the process 1500C determines that the second half of the bandwidth of the $N^{th}$ non-Center BW of Tier T−1, exclusive of a center RU if there is one, includes at least one RU allocated to a station when the first bit of bit string has the first value, and determines that no RU in the second half of the bandwidth of the $N^{th}$ non-Center BW of Tier T−1 is allocated to a station when the $1^{st}$ bit has the second value. The first half of the bandwidth of the $N^{th}$ non-Center BW of Tier T−1 corresponds to another non-center BW of Tier T. The process 1500C then consumes one bit from the beginning of the bit string and proceeds to S1514C.

In an embodiment, the first half of the bandwidth is a lower half of the bandwidth of the $N^{th}$ non-Center BW of Tier T−1, excluding a center RU of the $N^{th}$ non-Center BW of Tier T−1 if there is one, and the second half of the bandwidth is an upper half of the bandwidth of the $N^{th}$ non-Center BW of Tier T−1, excluding the center RU if there is one.

At S1531C, the process 1500C determines whether the Tier T is the last tier of the bandwidth allocation tree; that is, the tier composed of bandwidths each corresponding to the smallest RU supported within the channel bandwidth. In an embodiment, the last tier is composed entirely of 2 MHz bandwidths corresponding to 26-subcarrier RUs. When the Tier T is not the last tier, the process 1500C proceeds to S1533. Otherwise, at S1531C the process ends.

At S1533C, the process 1500C increments the tier indicator T by 1, initializes the loop counter N to 1, and sets the iteration limit M to indicate the number of non-center bandwidths in the next tier to be processed. In an embodiment, each tier has twice the number of non-center bandwidths as the previous tier, and the iteration limit M is therefore multiplied by two. The process 1500C then proceeds to S1512C.

An alternative fixed-length coding/compression technique enumerates all the possible cases of allocation or deallocation of every sub-band and then assign a binary representation to each case. For instance, for the left 8 MHz portion of FIG. 9, enumerating all the possibilities shows that there are 25 cases of allocation/deallocation of the 2 MHz/4 MHz/8 MHz sub-bands, hence a 5-bit representation enumerates all the 25 cases. For the right 8 MHz portion of Figure another 5-bit representation is needed, hence in total a 10-bit representation would suffice to enumerate all the allocation/deallocation of sub-bands in the left and right 8 MHz portions in FIG. 9.

Figures 16, 17:
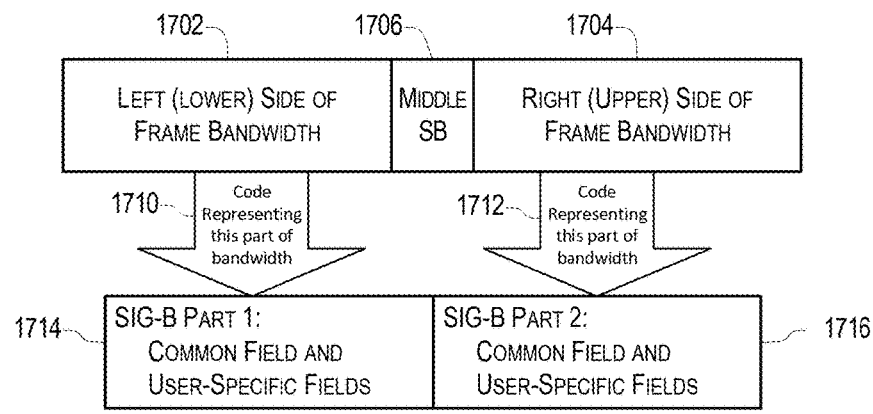
FIG. 16 shows a comparison of a benchmark fixed-length coding technique to a hierarchical variable-length technique according to an embodiment.
FIG. 17 illustrates a partitioning of bandwidth allocation information into parts of an HE-SIG-B field according to an embodiment.

FIG. 16 includes a Table 3 comparing the alternative fixed-length coding/compression technique to a hierarchical variable length scheme according to an embodiment, such as the embodiment illustrated in FIGS. 11-15. Table 3 shows an average number of bits needed for each scheme for a given bandwidth and a given number of stations (STAs). For example, in a 20 MHz bandwidth PPDU directed to 2 stations, encoding the left and right 8 MHz of the bandwidths (i.e. 16 MHz of the bandwidth) requires 10 bits when the benchmark fixed-length coding/compression technique is used, but only requires, on average, 8.87 bits when the hierarchical variable length scheme according to an embodiment is used. However, in a 20 MHz bandwidth PPDU directed to 4 stations, encoding the left and right 8 MHz of the bandwidths requires 10 bits when the benchmark fixed-length coding/compression technique is used, but requires, on average, 12.59 bits when the hierarchical variable length scheme according to an embodiment is used.

In another embodiment, frequency of usage information for each bandwidth allocation case is used to perform usage-based encoding of the bandwidth allocation information. Probability-based coding uses shorter codes for more probable cases. One example of probability-based coding is Huffman coding. Usage-based coding is similar to probability-based coding, except that usage-based encoding uses shorter codes to indicate bandwidth allocation cases that are used more often or that are more practical. In an embodiment, a prefix-based coding (that is, coding that uses a prefix code) is used in which more likely RU allocations are indicated with shorter prefixes that are assembled into variable-length codes.

A prefix code is a code system in which every code word has an initial segment (a prefix) that is unique relative to the other code words. A receiver of a message encoded using a prefix code can decode the message unambiguously, by repeatedly finding and removing sequences that form valid code words.

The code words may vary in length. Furthermore, the initial segment of each code word may vary in length and may indicate a remaining length of the code word. For example, a prefix code may include code words of the form, expressed as bit strings, of 0xxx, 10xxxx, and 11xxxxx, where 'x' can be either a 0 or a 1. In such a prefix code, an initial segment of '0' indicates that the remaining length of the code word is 3 bits, an initial segment of '10' indicates that the remaining length of the code word is 4 bits, and an initial segment of '11' indicates that the remaining length of the code word is 5 bits.

An embodiment of a usage-based encoding is prefix-based, indicates one or more most practically-used sub-channel allocation with a shortest prefix, and indicates less practically-used sub-channel allocations with longer prefixes. The most practically-used sub-channel allocation could include: (a) a sub-channel allocation that has all the sub-channels allocated to respective stations and in which no sub-channel is left un-assigned, (b) a sub-channel allocation that has the fewest station assignments depending on the bandwidth of the frame, but generally in order of 3-8 stations having assignments. For instance, for a 20 MHz OFDMA frame assignments of 2-5 STAs may be considered a more practically-used sub-channel allocation.

In an embodiment, the most practically-used sub-channel allocations are a design choice of the implementer and may vary from one AP manufacturer to another.

FIGS. 18, 19, and 20 illustrate first, second, and third usage-based prefix codes for an 8 MHz half of a 20 MHz bandwidth, according to respective first, second, and third illustrative embodiment. In an embodiment, the 20 MHz bandwidth has the RUs shown for the 20 MHz bandwidth 900 of FIG. 9.

Referring to FIG. 9, it can be seen that the RUs of the left side of the bandwidth 900 and the RUs of the right side of the bandwidth 900 have identical structure, and as a result the coding for each side can be done separately using identical processes. In an embodiment, because the middle RU 910 has a unique position, a separate indication of whether the middle RU 910 is allocated is provided, and the indication for the middle RU 910 is not be combined with the coding for the RUs of the left or right sides.

Considering the above, in the illustrative embodiments the coding of each the left and right sides of a 20 MHz bandwidth is performed as indicated below. In the following examples, a number 2 indicates a 2 MHz allocation, a number 4 indicates a 4 MHz allocation, and a number 8 indicates an 8 MHz allocation, and X indicates no allocation for any STA (i.e. an empty (2, 4, or 8 MHz) RU). While the illustrative embodiments show particular code words being associated with particular bandwidth allocations, embodiments are not limited thereto, and in some embodiments the assignment of bandwidth allocations to code words is a design choice.

In the 20 MHz bandwidth of FIG. 9, the following 26 allocation cases are possible for each of the left and right sides:

No un-assigned RU: 5 cases (2222, 224, 422, 44, and 8).
One un-assigned 2 MHz RU: 8 cases (222X, 22X2, 2X22, X222, X24, 2X4, 42X, and 4X2).
One un-assigned 4 MHz RU: 4 cases (22X, X22, X4, and 4X),
One un-assigned 8 MHz RU: 1 cases (X),
Two un-assigned 2 MHz RUs: 4 cases (2XX2, 2X2X, X2X2, and X22X), and
Three un-assigned 2 MHz RUs: 4 cases (2XXX, X2XX, XX2X, and XXX2).

In the first embodiment shown in FIG. 18, three-bit code words of format '0bb', where '0' is the prefix and 'bb' is one of 00, 01, 10, and 11, are used to encode four most practically-used RU allocation cases. Five-bit code words of format '10ccc', where '10' is the prefix and 'ccc' is one of 000, 001, 010 . . . 110, and 111, are used to encode the eight next more practically-used RU allocation cases. Six-bit code words of format '11dddd', where '11' is the prefix and 'dddd' is one of 0000, 0001, 0010 . . . 1110, and 1111, are used to encode 14 least practically-used RU allocation cases.

FIG. 18 shows the coding for one side of the 20 MHZ bandwidth according to the first illustrative embodiment, wherein the following practically-used encoding are given to the respective bandwidth allocation cases:

Designate allocation cases 224, 422, 44, 8 as the four most practically-used RU allocation cases and encode using pattern 0bb as 000, 001, 010, and 011, respectively.
Designate allocation cases 2222, X4, 4X, X, X24, 2X4, 42X, and 4X2 as the eight next (i.e. the more) practically-used RU allocation cases and encode using pattern 10ccc as 10000, 10001, 10010, 10011, 10100, 10101, 10110, and 10111, respectively.
Designate allocation cases 22X, X22, 222X, 22X2, 2X22, X222, 2XX2, 2X2X, X2X2, X22X, 2XXX, X2XX, XX2X, and XXX2 as the least practically-used RU allocation cases and encode using pattern 11dddd as 110000, 110001, 110010, 110011, 110100, 110101, 110110, 110111, 111000, 111001, 111010, 111011, 111100, and 111101, respectively.

Accordingly, in an embodiment using the codings of FIG. 18 to encode the illustrative bandwidth allocation 1300 shown in FIG. 13, the resulting bit string would be 9 bits long and have a value of 101110101. The bandwidth allocation 1300 has a middle 2 MHz bandwidth allocated to a first station STA1, a left side allocation pattern of 8, and a right side allocation pattern of 2X4. In the resulting bit string, the first bit (1) indicates that the middle 2 MHz is allocated, the next three bits (011) indicate that the all 8 MHz of the left side are allocated to a station. The last 5 bits (10101) indicate that a left-most 2 MHz bandwidth of the right side is allocated to a station, a right-most 4 MHz bandwidth of the right side is allocated to a station, and a remaining 2 MHz bandwidth of the right side is unallocated.

In the second embodiment shown in FIG. 19, four-bit code words of format '0bbb', where 'bbb' is one of 000, 001, 010, 011, 100, 101, 110, and 111, are used to encode eight most practically-used RU allocation cases. Five-bit code words of format '10ccc', where 'ccc' is one of 000, 001, 010, 011, 100, 101, 110, and 111, are used to encode the eight next more practically-used RU allocation cases. Six-bit code words of format '11dddd', where ddd' is one of 0000, 0001, 0010 . . . 1110, and 1111, are used to encode 10 least practically-used RU allocation cases.

Accordingly, in an embodiment using the codings of FIG. 19 to encode the illustrative bandwidth allocation 1300 shown in FIG. 13, the resulting bit string would be 10 bits long and have a value of 1010010101. In the bit string, the first bit (1) indicates that the middle 2 MHz is allocated, the next four bits (0100) indicate that the all 8 MHz of the left side are allocated to a station. The last 5 bits (10101) indicate that a left-most 2 MHz bandwidth of the right side is allocated to a station, a right-most 4 MHz bandwidth of the right side is allocated to a station, and a remaining 2 MHz bandwidth of the right side is unallocated.

In the third embodiment shown in FIG. 20, four-bit code words of format '0bbb', where 'bbb' is one of 000, 001, 010, 011, 100, 101, 110, and 111, are used to encode eight most practically-used RU allocation cases. Six-bit prefix code words of format '1eeeee', where 'eeeee' is one of 00000, 00001, 00010 . . . 11110, and 11111, are used to encode 18 least practically-used RU allocation cases.

Accordingly, in an embodiment using the codings of FIG. 20 to encode the illustrative bandwidth allocation 1300 shown in FIG. 13, the resulting bit string would be 11 bits long and have a value of 10100100001. In the bit string, the first bit (1) indicates that the middle 2 MHz is allocated and the next four bits (0100) indicate that the all 8 MHz of the left side are allocated to a station. The last 6 bits (100001) indicate that a left-most 2 MHz bandwidth of the right side is allocated to a station, a right-most 4 MHz bandwidth of the right side is allocated to a station, and a remaining 2 MHz bandwidth of the right side is unallocated.

FIG. 21 illustrates a coding for a usage-based coding prefixes for a 20 MHz half of a 40 MHz bandwidth, according to an illustrative embodiment. In an embodiment, the 40 MHz bandwidth has the RUs shown for the 40 MHz bandwidth 1000 of FIG. 10.

Referring to FIG. 10, it can be seen that the RUs of the left side of the 40 MHz bandwidth 1000 and the RUs of the right side of the 40 MHz bandwidth 1000 have identical structure, and as a result the coding for each side can be done separately using identical processes. In addition, the left and right sides each have the same structure as the 20 MHz bandwidth 900 of FIG. 9.

In the following examples, number 2 indicates a 2 MHz allocation, number 4 indicates a 4 MHz allocation, and number 8 indicates an 8 MHz allocation, T indicates a Twenty (20) MHz assignment, and X indicates no allocation for any STA (i.e. an empty RU).

Each of the sides of the 40 MHz bandwidth 1000 may have a large number of possible bandwidth allocation patterns, even without considering the middle 2 MHz bandwidth of each side. In an embodiment, bandwidth allocation patterns that are never used by the AP do not have respective code words assigned to them. For example, in an embodiment, when the AP on occasions uses bandwidth allocations of 222222X2 and 2X222222, but never uses bandwidth allocations of 222222X2, 2222X222, 22X22222, 222X2222, 22222X22, and X2222222, the AP does not allocate respective code words to the bandwidth allocations of 222222X2, 2222X222, 22X22222, 222X2222, 22222X22, and X2222222.

The table shown in FIG. 21 shows codings that do not express the allocation state of the middle 2 MHz bandwidth of each side of the 40 MHz bandwidth. The middle 2 MHz bandwidth of each side are allocated may be indicated by respective bits in a bit string that indicates the allocated bandwidths of the 40 MHz bandwidth, or may be considered as an always assigned RU.

Usage-based prefix-based codings for bandwidth allocations of 80 MHz and 160 MHz bandwidths may be similarly created.

Code words for a usage-based prefix code for communicating bandwidth allocations (that is, sub-band assignments) may be determined using the rules described below. The embodiments described below use prefixes having particular patterns of 0's and 1's, but embodiments are not limited thereto. For example, in other embodiments, each '0' in the prefixes described below is instead a '1', and each '1' in the prefixes described below is instead a '0', so that a prefix of '0' is instead a '1', a prefix of '10' is instead '01', and so on.

In some embodiments, bandwidth allocations for one half a 20 MHz OFDMA frame where at most 2 STAs have assignments within the half of the 20 MHz and all the RUs are assigned to a STA are represented with code words of the format '0b' (where '0' is the prefix and 'b' indicates a 1-bit code). In an embodiment, bandwidth allocations patterns indicated using code words of the format '0b' are 8 and 44.

In some embodiments, bandwidth allocations for one half a 20 MHz OFDMA frame where at most 2 STAs have assignments within the half of the 20 MHz are represented with code words of the format '0bb' (where 0 is the prefix and b indicates a 2-bit code). In an embodiment, bandwidth allocations patterns indicated using code words of the format '0bb' are 8, 44, 4X and X4.

In some embodiments, bandwidth allocations for one half a 20 MHz OFDMA frame where either all sub-bands are assigned or at most one RU with bandwidth larger than 2 MHz is left un-assigned are represented with code words of the format '0bbb' (where 0 is the prefix and bbb indicates a 3-bit code). In an embodiment, bandwidth allocations patterns indicated using code words of the format '0bbb' are 8, 44, 4X, X4, X, 2222, 224 and 422.

In some embodiments, bandwidth allocations for one half a 40 MHz OFDMA frame where all sub-bands are assigned to stations are represented with code words of the format '0bbb' (where 0 is the prefix and bbb indicates a 3-bit code). In an embodiment, bandwidth allocations patterns indicated using code words of the format '0bb' include T, 88, 844, 448, where 'T' indicates that the entire half (i.e., a 20 MHz RU) of the 40 MHz OFDMA frame is allocated to a station.

In some embodiments, bandwidth allocations for one half a 20 MHz OFDMA, 40 MHz OFDMA, 80 MHz OFDMA, or 160 MHz OFDMA frame where all sub-bands of the half of the frame are assigned to stations are represented using a plurality of code word each including a 1-bit prefix (such as '0') and a shortest code. The shortest code is a code having a number of bits equal to the least number of bits capable of indicating all of the possible all-sub-bands-assigned bandwidth allocations that the AP is configured to generate.

In some embodiments, bandwidth allocations for one half a 20 MHz OFDMA, 40 MHz OFDMA, 80 MHz OFDMA, or 160 MHz OFDMA frame where all the sub-bands of the half of the frame are respectively assigned to one of at most two STAs are represented using a plurality of code word each including a 1-bit prefix (such as '0') and a shortest code. The shortest code is a code having a number of bits equal to the least number of bits capable of indicating all of the possible bandwidth allocations wherein all the sub-bands are respectively assigned to one of at most two STAs that the AP is configured to generate.

In some embodiments, bandwidth allocations for one half a 20 MHz OFDMA, 40 MHz OFDMA, 80 MHz OFDMA, or 160 MHz OFDMA frame where all the sub-bands of the half of the frame are respectively assigned to one of at most three STAs are represented using a plurality of code word each including a 1-bit prefix (such as '0') and a shortest code. The shortest code is a code having a number of bits equal to the least number of bits capable of indicating all of the possible bandwidth allocations wherein all the sub-bands are respectively assigned to one of at most three STAs that the AP is configured to generate.

In some embodiments, bandwidth allocations for one half a 20 MHz OFDMA, 40 MHz OFDMA, 80 MHz OFDMA, or 160 MHz OFDMA frame where all the sub-bands of the half of the frame are respectively assigned to one of at most four STAs are represented using a plurality of code word each including a 1-bit prefix (such as '0') and a shortest code. The shortest code is a code having a number of bits equal to the least number of bits capable of indicating all of the possible bandwidth allocations wherein all the sub-bands are respectively assigned to one of at most four STAs that the AP is configured to generate.

In some embodiments, bandwidth allocations for one half a 20 MHz OFDMA frame where all the sub-bands of the half of the frame are assigned to stations and the bandwidths of the assigned RUs are not less than 4 MHz are represented using a plurality of code word each including a 1-bit prefix (such as '0') and a shortest code. The shortest code is a code having a number of bits equal to the least number of bits capable of indicating all such bandwidth allocations that the AP is configured to generate. For example, when the AP is configured to generate bandwidth allocations of 44 and 8, the shortest code may have 1 bit.

In some embodiments, bandwidth allocations for one half a 40 MHz OFDMA frame where all the sub-bands of the half of the frame are assigned to stations and the bandwidths of the assigned RUs are not less than 8 MHz are represented using a plurality of code word each including a 1-bit prefix (such as '0') and a shortest code. The shortest code is a code having a number of bits equal to the least number of bits capable of indicating all such bandwidth allocations that the AP is configured to generate.

In some embodiments, bandwidth allocations for one half of an 80 MHz or 160 MHz OFDMA frame where all the sub-bands of the half frame are assigned to stations and the bandwidths of the assigned RUs are not less than 20 MHz are represented using a plurality of code word each including a 1-bit prefix (such as '0') and a shortest code. The shortest code is a code having a number of bits equal to the least number of bits capable of indicating all such bandwidth allocations that the AP is configured to generate.

In above rules, for ease of referencing, RUs with bandwidths of 20 MHz are referenced, while in practice, due to guard band and DC band assignments, the bandwidth of said RUs are slightly less than 20 MHz. Similarly, for ease of referencing, RUs with bandwidths of 8 MHz are referenced, while in practice the bandwidths of said RUs are slightly less than 8 MHz. For ease of referencing, RUs with bandwidth of 4 MHz are referenced, while in practice the bandwidths of said RUs are slightly less than 4 MHz. For ease of referencing, RUs with bandwidth of 2 MHz are referenced, while in practice the bandwidth of the said RUs are slightly less than 2 MHz.

A prefix-based compression method for coding of OFDMA sub-channel allocation according to embodiments uses the shortest binary representations for the most practically-used sub-channel allocations, and uses longer binary representations for less practically-used sub-channel allocations. Embodiments offer good compression ratios compared to benchmark indexing techniques. Since the coding method of the embodiments is prefix-based it is self-decodable; i.e. the length of a codeword need not be indicated ahead of time.

In an embodiment, either a fixed-length encoding, a usage based encoding, or a flexible variable-length encoding is used to indicate bandwidth allocations depending on 1) the bandwidth of the DL OFDMA frame, 2) the obtained codeword size for the given number of STAs that the frame is prepared for, or 3) both. In one such embodiment, the AP uses a 1-bit field, denoted as SubbandCodingMethod, in the HE-SIG-A field or the HE-SIG-B field to indicate which coding method is used. For example, the SubbandCodingMethod field may be set to 1 to indicate that a first coding method (e.g. a flexible-length coding) is being used, and set to 0 to indicate that a second coding method (e.g. a fixed-length coding) is being used. In some embodiments, SubbandCodingMethod might have a multiple-bit representation and may indicate which of a plurality of coding methods is being used.

In some embodiments, the coded sequenced as explained above (whether a fixed-length coding sequence or flexible-length coding sequence, also referred to as common-field) is partitioned in two or more parts such that each part is self-decodable. Then each partition is placed in a separate part of the HE-SIG-B field structure.

For example, in an embodiment wherein the HE-SIG-B field has two parts, each part carrying different resource unit (RU) or sub-band scheduling, each part may also carry different bandwidth allocation signaling information. A fixed or flexible coded sequence as described above is partitioned properly in two parts, and each part of the fixed or flexible coded sequence is carried in one of the two parts of the HE-SIG-B fields. There are various embodiments for performing the partitioning of the fixed or flexible coded sequence.

FIG. 17 illustrates a partitioning of bandwidth allocation information into parts of an HE-SIG-B field according to an embodiment. The fixed or flexible coded sequence 1712 that describes the right side 1704 of the frame bandwidth is placed in a second part 1716 of the HE-SIG-B field and the fixed or flexible coded sequence 1710 that describes the left side 1702 of the frame bandwidth is placed in the first part 1714 of the HE-SIG-B field.

The user-specific information related to an assigned sub-band or RU appears in the same HE-SIG-B part as the flexible or fixed coded sequence that describes the respective sub-band, as shown in the figure. In some embodiments, the flexible or fixed coded sequence is duplicated in its entirety in both parts of the HE-SIG-B field, in which case the user-specific fields are evenly placed in the first part 1714 and the second part 1716, otherwise the split is performed such that the first part 1714 has one more user-specific field than the second part 1716.

In an embodiment, an allocation indication for the middle sub-band or RU 1706 which exists for 20 MHz and 80 MHz bandwidths is represented by a single bit that can be placed in the first part, the second part, or both parts of the HE-SIG-B field. In an embodiment, the allocation indication for the middle sub-band or RU 1706 is placed in the first part 1714 of HE-SIG-B field along with the coded sequence 1710 that represents the left side 1702 of the spectrum (and all the user-specific information related to the described sub-bands or RUs appear in this part if SIG-B). In another embodiment, the allocation indication for the middle sub-band or RU 1706 is placed in the second part 1716 of HE-SIG-B field along with the coded sequence 1712 that represents the right side 1704 of the spectrum (and all the user-specific information related to the described sub-bands or RUs appear in this part if SIG-B).

In some embodiments, the partitioning of the common field (flexible/fixed coded sequence) and per-user specific fields of HE SIG-B is performed such that the eventual length of two parts of the flexible/fixed coded sequence have about the same length, under the assumption that each partition is fully self-decodable.

In some embodiments, the user-specific fields appear in the same part of the HE-SIG-B field as the associated common-field that indicates the presence of it. For instance, when the common-field of the first part of the HE-SIG-B field indicates a set of sub-bands with payloads, then the user-specific fields related to those sub-bands appear in the first part of the HE-SIG-B field in the order that is indicated by the common-field of the first part of the SIG-B.

In other embodiments, the user-specific fields are arranged and aggregated in a predetermined known order and their association with the common-fields (or the flexible or fixed coded sequence) from the first and second part of the HE-SIG-B field is established based on the predetermined aggregation rule. For example, in an embodiment, the user-specific fields that form the first part of the HE-SIG-B field appear first and then the user-specific fields that form the second part of the HE-SIG-B field appear next and the whole set of the user-specific fields is associated with the common-fields from the first and second parts of the HE-SIG-B field, where the association indicates that which user-specific field is associated with the first sub-band or RU that is indicated in the common-fields.

In some embodiments, the partitioning of the flexible or fixed coded sequence is such that the eventual length of two parts of the flexible/fixed coded sequence have about the same length, under the assumption that when the two partitions are aggregated in a predetermined known order they would be self-decodable. The aggregation of the partitions put the two partitions side-by-side in a predetermined known order. In some embodiments, the flexible or fixed coded sequence is duplicated in its entirety in both parts of the HE-SIG-B field.

In some embodiments, the user-specific fields from the two parts of the HE-SIG-B field are arranged and aggregated in a predetermined known order and their association with the common-field (or the flexible or fixed coded sequence) is established based on the predetermined aggregation rule.

For example, in an embodiment, the user-specific fields that form the first part of the HE-SIG-B field appear first and the user-specific fields that form the second part of the HE-SIG-B field appear next. The whole set of the user-specific fields are associated with the common-field (or the flexible or fixed coded sequence), where the association indicates which user-specific field is associated with the first sub-band or RU that is indicated in the common-field (or the flexible or fixed coded sequence).

In another embodiment, the user-specific fields form the second part of the HE-SIG-B field appear first and then the user-specific fields form the first part of the HE-SIG-B field appear next and the whole set of the user-specific fields now get associated with the common-field (or the flexible/fixed coded sequence).

In this disclosure, the term "flexible or fixed coded sequence" refers to a sequence that uniquely identifies the sub-band partitioning of the PPDU bandwidth among the addressed STAs in the PPDU. The information in the flexible or fixed coded sequence may also be referred to as the common part of SIG-B, sub-band scheduling, or RU scheduling, among others.

Embodiment of compression techniques are herein presented and compared. Embodiments use a variable-length compression technique to shorten the length of HE-SIG-B field and offers good compression ratios compared to benchmark indexing techniques. The compression ratios are measured in terms of average length of the codes. Embodiments include codes that are self-decodable, and for which the length of a codeword need not be indicated in advance of the decoding of the codes.

In an embodiment, an HE-SIG-B field has a dynamic length in systems operating according to the IEEE Std 802.11ax. The identification of stations that are addressed in a DL MU frame and individual assignments of bandwidths to respective stations is communicated in the HE-SIG-B fields. When there are a large number of stations participating in a single MU session, the length of the HE-SIG-B field may become large. Shortening the length of the HE-SIG-B field may be advantageous.

In one embodiment a variable-length short AID representation is used in HE SIG-B of a DL MU frame; this technique offers large saving for HE SIG-B.

In other embodiments, early indications of DL MU or UL MU frame exchanges are announced in a Beacon frame or in the response to PS-Poll frames. These techniques offer power saving advantages as well as overhead reduction.

In a DL MU frame according to an embodiment, an HE-SIG-B field carries a list of stations that have payloads in the DL MU frame. In an IEEE Std 802.11ac DL MU MIMO structure, a group-identification (GID) is used to address at most 4 STAs that may have payloads in the DL MU frame.

However, for DL OFDMA according to the IEEE Std 802.11ax, there could more than 4 stations with payloads in a single DL OFDMA PPDU. For example, there could be up to 9 stations having payloads in a 20 MHz PPDU, 18 stations having payloads in a 20 MHz PPDU, and 38 stations having payloads in a 20 MHz PPDU. If each station is identified by its respective AID or PAID, such identification would cause the HE SIG-B field to be lengthy. Considering that the HE SIG-B field is sent using Modulation and Coding Scheme 0

(MCS0), which is the least efficient MCS, such identification could increase the overhead required to perform OFDMA do as to potentially reduce or eliminate the benefits of OFDMA. Such overhead depends on the number of STAs being addressed in each DL MU frame and does not depend on the payload size.

To address this issue, embodiments use a short identification for each station. Identifications in use in previous IEEE 802.11 standards include an Association Identifier (AID) of 11 to 12 bits and a Partial AID (PAID) of 9 bits. The AID and PAID are sufficient to identify a station amongst all stations currently associated with an AP of a BSS.

However, an AID or PAID uses more bits than necessary to distinguish among stations that are being addressed within a DL OFDMA frame. Each station is uniquely identified by its AID or MAC address inside the corresponding DL payload. However, such identifications are too lengthy to be of practical use in the HE-SIG-B field.

In an embodiment, a short identification whose length is variable, herein denoted as variable-length AID (VLAID), is used to identify a station amongst the stations having a payload in the DL OFDMA frame.

A VLAID of a station is chosen based a priori known rule, for example, by selecting a number of least significant bits of an AID of the station, a number of most significant bits of the AID of the station, or a combination thereof.

The length of VLAID, in bits, is determined by the AP transmitting a DL MU PPDU for that particular DL MU PPDU. The AP chooses a length for the VLAID so that all the stations that are addressed within the DL MU PPDU are identified uniquely, that is, so that no collision of identification happens among the stations addressed within the DL MU PPDU. In an embodiment, the AP signals the length determined for the VLAID, as used in an HE-SIG-B field of the DL MU PPDU, in field denoted as VLAID-Length that is present in an HE-SIG-A field or the HE-SIG-B field of the DL MU PPDU. In an embodiment, a length of the VLAID-Length field is no more than 4 bits. In an embodiment, an AP chooses the length of VLAID from a predetermined set, e.g. the set {12-bit, 9-bit, 6-bit, and 4-bit}, in which case the field of VLAID-Length can be represented by two bits, when the set is predetermined or announced by the AP in a management frame such as an Association Response or in a Beacon frame. In an embodiment, an AP chooses the length of VLAID from the predetermined set {12-bit, 6-bit}, in which case the field of VLAID-Length can be represented by one bit, when the set is predetermined or announced by the AP in a management frame such as an Association Response or in a Beacon frame. In an embodiment, an AP may change the value of VLAID length during its operation if the number of stations associated with the AP changes significantly.

FIG. 22 illustrates VLAIDs according to an embodiment. In the example illustrated in FIG. 22, an AP is associated with 20 stations, STA1 to STA20, each station having a unique 12-bit AID.

In the embodiment shown, the AP determines, for a PPDU, a VLAID for each station identified in the PPDU using a number of least significant bits (LSBs, that is, the right-most bits) of the AID, the number having the smallest value sufficient to produce unique respective VLAIDs for the stations in the PPDU. However, embodiments are not limited thereto, and in other embodiments, most significant bits (MSBs) or any other sequence of bits identified by a predetermined rule may be used to produce the VLAIDs.

When the AP identifies first to tenth stations STA1 to STA10 that are targets of a first DL MU PPDU PPDU1, the AP verifies all the AIDs of the 10 STAs. The AP determines that when five LSBs of the respective AIDs of the ten stations STA1 to STA10 are used as the respective VLAIDs, then each of the ten stations STA1 to STA10 would have a VLAID different from any other of the ten stations STA1 to STA10. Thus, the stations STA1 to STA10 identified in the first DL MU PPDU PPDU1 are uniquely identified within the first DL MU PPDU PPDU1 by their 5-bit VLAIDS.

Then AP then sets the value of a VLAID-Length field for the first DL MU PPDU PPDU1 to five, indicating that the station VLAIDs in the HE-SIG-B field of the first DL MU PPDU PPDU1 have respective lengths of five bits. Within the HE-SIG-B field of first DL MU PPDU PPDU1, the AP uses five bits to identify each station.

In a subsequent second DL MU PPDU PPDU2, the AP identifies first, third, sixth, eighth, eleventh, fourteenth, and seventeenth stations STA1, STA3, STA6, STA8, STA11, STA14, and STA17 that are targets of the second DL MU PPDU PPDU2, the AP then verifies the AIDs of the stations STA1, STA3, STA6, STA8, STA11, STA14, and STA17. The AP determines that when three LSBs of the respective AIDs of the stations STA1, STA3, STA6, STA8, STA11, STA14, and STA17 are used as the respective VLAIDs, then each of the stations STA1, STA3, STA6, STA8, STA11, STA14, and STA17 would have a VLAID different from any other of the stations STA1, STA3, STA6, STA8, STA11, STA14, and STA17. Thus, the stations STA1, STA3, STA6, STA8, STA11, STA14, and STA17 targeted by the second DL MU PPDU PPDU2 are uniquely identified within the second DL MU PPDU PPDU2 by their 3-bit VLAIDS.

Then AP then sets the value of a VLAID-Length field for the second DL MU PPDU PPDU2 to three, indicating that the station VLAIDs in the HE-SIG-B field of the second DL MU PPDU PPDU2 have respective lengths of three bits. Within the HE-SIG-B field of the second DL MU PPDU PPDU2, the AP uses three bits to identify each station.

The AP chooses a VLAID length so that no identification collisions occur within a DL MU PPDU (i.e. each station that has a payload in the DL MU PPDU is uniquely identified by its VLAID). In an embodiment, the AP also takes steps to reduce a number of unintended STAs (i.e., stations that do not have payloads in the DL MU PPDU but which will receive the DL MU PPDU) that happen to have the same VLAID as the intended STAs. For example, although 3 bits uniquely identified the intended stations of the second DL MU PPDU PPDU2 in FIG. 22, in an embodiment, the AP may use a VLAID having one more bit than the minimum necessary number of bits (here, 4 bits) in order to reduce identification collisions between the intended stations and unintended stations.

In other embodiments, when receiving a DL MU PPDU with a VLAID-Length specified in an HE-SIG field and wherein respective VLAIDs are used in the HE-SIG-B field of the DL MU PPDU to identify the stations, when a station finds a VLAID corresponding to its AID, the station attempts to decode the payload in the sub-bands associated with the corresponding VLAID.

In other embodiments, a station that has encounters a VLAID corresponding to its AID in the HE-SIG-B field of the DL MU PPDU attempts to decode the payload in the sub-bands associated with the corresponding VLAID only when a Traffic Indication Map (TIM) in a previously received Beacon frame indicates that the station has a DL payload queued for delivery to the station at the AP.

In an embodiment, for a DL MU OFDMA PPDU, an AP transmitting the DL MU OFDMA PPDU allocates bandwidth (that is, Resource Units (RUs)) to each of a plurality of participating stations. The AP notifies the participating stations of the bandwidth allocation by indicating the bandwidth allocation in an HE-SIG-B field of the DL MU OFDMA PPDU.

Figure 23:
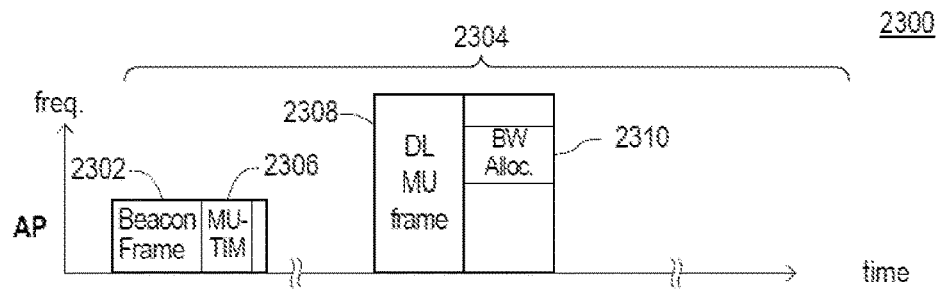
FIG. 23 illustrates a process in which an AP indicates one or more bandwidth allocations in a Beacon frame, according to an embodiment.

FIG. 23 illustrates a process 2300 in which an AP indicates one or more bandwidth allocations in a Beacon frame 2302 transmitted by the AP, according to an embodiment. In this embodiment, a Traffic Indication Map (TIM) in the Beacon frame indicates one or more stations that are going to receive respective payloads from the AP during a Beacon interval 2304. When a station of the one or more stations will receive a respective payload in a subsequent DL MU frame 2308, the AP provides, in the Beacon frame, an indication that the station will be a participating station in the subsequent DL MU frame 2308 and an indication of a bandwidth allocation 2310 for the station in the subsequent DL MU frame 2308. In an embodiment, when a station of the one or more stations will receive its respective payload in a frame other than a DL MU frame 2308, the AP does not provide an indication in the Beacon frame 2302 of the bandwidth allocation for the station.

To provide the allocation indication in the Beacon frame 2302, in an embodiment a Multi User TIM (MU-TIM) 2306 element is included in the Beacon frame 2302. The information included in the MU-TIM element 2306 includes one or more of an indication of which stations will receive payloads in the DL MU frame (i.e., the participating stations) and respective bandwidth allocations for the participating stations.

Figure 24:
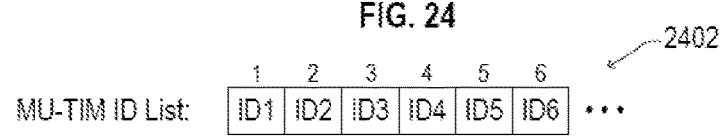
FIG. 24 illustrates a list of identifiers of a Multi-User Traffic Indication Map (MU-TIM) according to an embodiment.

In an embodiment, the indication of the participating stations in the MU-TIM 2306 includes a list of identifiers 2402. The identifiers in the list of identifiers 2402 are respectively associated with the participating stations in the corresponding DL MU session, such as the list of identifiers 2402 shown in FIG. 24. The identifiers ID1, ID2, ID3, and so on in the list of identifiers 2402 are any of an Association ID (AID), a Partial AID, or a Variable Length AID (VLAID).

In an embodiment, the order of the participating stations in the identifier list is used as to identify a participating station identification within an HE DL MU frame. For example, suppose a Beacon frame sent by the AP lists 12 stations in the MU-TIM, identified by respective AIDs. Subsequently, the AP would use the order that the AID of a participating station appeared in the MU-TIM as an identifier of that a participating station in any DL MU frame sent within the Beacon interval that follows that Beacon frame. For example, if a participating station's AID appeared as the third identifier ID3 in the list of identifiers 2302 of the MU-TIM 2306 within the Beacon frame 2302, the AP identifies that participating station with identification having a value of 3 in any DL MU frame sent within that Beacon interval 2304.

In an embodiment, the indication of which stations will receive payloads in a subsequent DL MU frame is provided in the MU-TIM 2306 using a list of AIDs, a list of PAIDs, or a list of VLAIDs.

In an embodiment, the indication of which stations will receive payloads in a subsequent DL MU frame is provided in the MU-TIM element using a bitmap. In an embodiment shown in FIG. 25A, the bitmap is a sub-bitmap 2504 of the TIM 2502 having a length in bits equal to the number of bits in the TIM 2502 that have a value of 1, wherein the $n^{th}$ bit of the sub-bitmap indicates whether the station corresponding to the $n^{th}$ bit of the TIM having a value of 1 will receive a payload in the DL MU frame. For example, when the $18^{th}$ bit of the TIM (corresponding to a station with an AID equal to 18) is the third bit in the TIM that has a value of 1, the third bit of the sub-bitmap indicates whether a payload for the station having the AID equal to 18 has a payload in the DL MU frame.

Figure 25A:
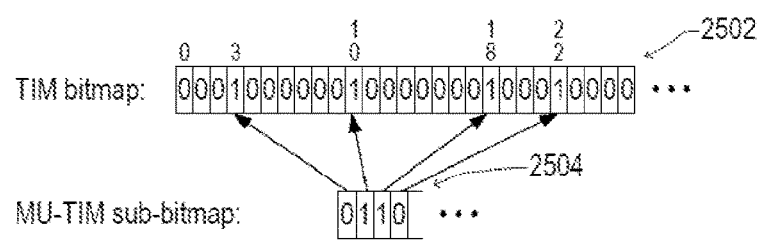
FIG. 25A illustrates a bitmap of a Multi-User Traffic Indication Map (MU-TIM) according to an embodiment.

Thus, in the example of FIG. 25A, the TIM 2502 indicates that stations having AIDs of 3, 10, 18, and 22 have payloads scheduled for download. The MU-TIM 2504 indicates that the second station having a payload scheduled (having an AID of 10) and the third station having a payload scheduled (having an AID of 18) are scheduled to receive their respective payloads in a DL MU frame. In an embodiment, the stations having AIDs of 3 and 22 are scheduled, in the example, to receive their respective payloads in non-MU DL frames.

Figure 25B:
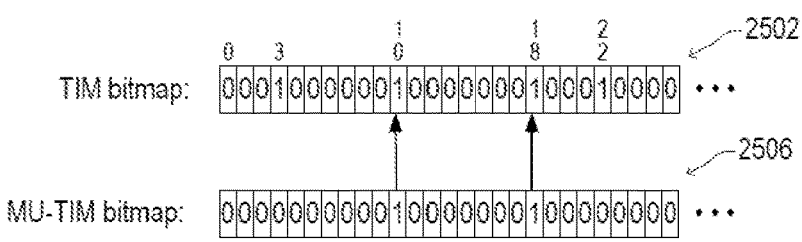
FIG. 25B illustrates a bitmap of a Multi-User Traffic Indication Map (MU-TIM) according to another embodiment.

In an embodiment shown in FIG. 25B, the MU-TIM identifies participating stations using an MU bitmap 2506 having a bit for each stations that may be associated with the AP. In the MU bitmap 2506, an $N^{th}$ bit of the bitmap indicates whether a station having an AID equal to N is scheduled to receive a payload in a DL MU frame. The Beacon frame 2302 may also include a TIM 2502 indicating all stations scheduled to receive payloads during the beacon interval 2304. When the MU bitmap 2506 indicates that a station is not scheduled to receive a payload in a DL MU frame and the TIM 2502 indicates that the station is scheduled to receive a payload, the station is scheduled to receive the payload in a non-MU DL frame.

For example, FIG. 25B shows the TIM 2502 indicating that stations having AIDs of 3, 10, 18, and 22 have payloads scheduled for download, and the MU-TIM 2506 indicating that the stations having AIDs of 10 and 18 are scheduled to receive their respective payloads in a DL MU frame. In an embodiment, the stations having AIDs of 3 and 22 are scheduled, in the example, to receive their respective payloads in non-MU DL frames.

In an embodiment, the bandwidth allocations for the participating stations may be indicated in the MU-TIM using a bandwidth identifier or sub-band identifier.

In an embodiment, the bandwidth allocations for the participating stations may be indicated in the MU-TIM using a bandwidth bitmap or a sub-band bitmap/

In an embodiment, the bandwidth allocations for the participating stations may be indicated in the MU-TIM using a bandwidth coding or a sub-band coding.

In an embodiment, the MU-TIM include information for one or more DL MU sessions. In another embodiment, the MU-TIM include information for only one DL MU session.

In an embodiment, an MU-TIM may be a TIM with extra information to indicate to the stations what sort of control response is expected after they transmit PS-Poll frame, i.e. whether the STA should expect to receive an ACK, a payload such as a data frame, or a more detailed acknowledgment response that carries additional information such as the time to the upcoming SU or MU PPDU that carries a payload for the STA and potentially with the RU attributes that carries the payload for the STA.

Figure 26:
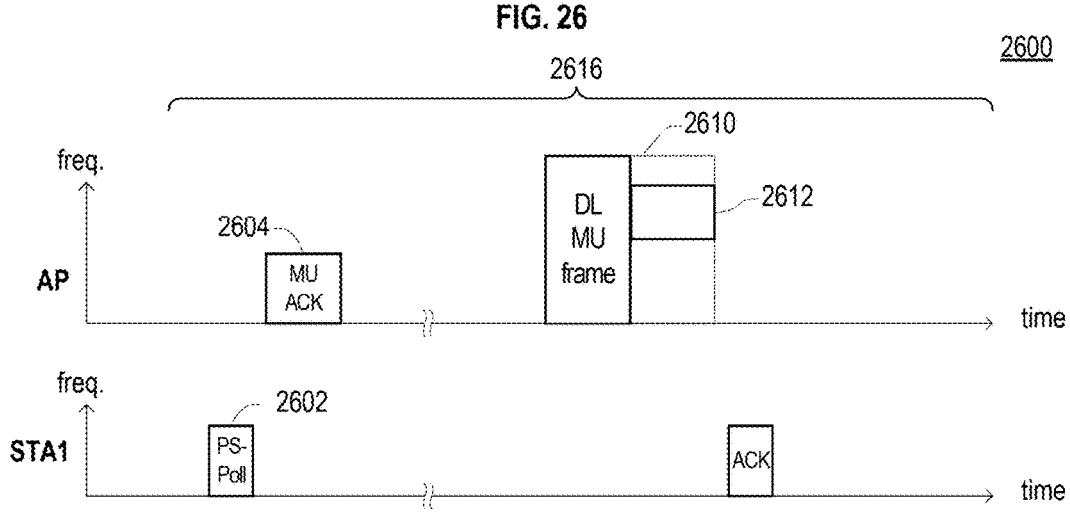
FIG. 26 illustrates a process wherein an AP sends bandwidth allocation information in a response to a Power Save Poll (PS-Poll) frame, according to an embodiment.

FIG. 26 illustrates a process 2600 wherein an AP sends bandwidth allocation information in a response to a Power Save Poll (PS-Poll) frame 2602, according to an embodiment. The AP indicates a bandwidth allocations in a Multi-User Acknowledgment frame (MU-ACK) 2604 transmitted as a response to the PS-Poll frame 2602. When a station STA1 sends the PS-Poll frame 2602 to the AP (to indicate to the AP that the station STA1 is awake) and the AP has a payload for the station STA1 that will be sent in a DL MU frame 2610 (or in a SU PPDU), the AP sends the MU-ACK frame 2604 to the station STA1.

In an embodiment, when the AP will send the payload to the station in the DL MU frame 2610, the AP further includes bandwidth allocation information to the station in the MU-ACK frame 2604 and a time reference to the upcoming frame 2610. The bandwidth allocation information indicates the bandwidth in one or more DL MU frames that has been allocated to the station.

At a subsequent time in the same Beacon interval, the AP sends the DL payload to the station in a DL MU frame 2610. The AP transmits the payload within a bandwidth 2612 as indicated in the MU-ACK frame 2604.

In an embodiment, for the DL MU case, when AP has payloads for a station and intends to send the payload within one or more DL MU frames, the AP sends a new control response frame MU-ACK as a response to a PS-Poll frames sent by the station.

Figure 27:
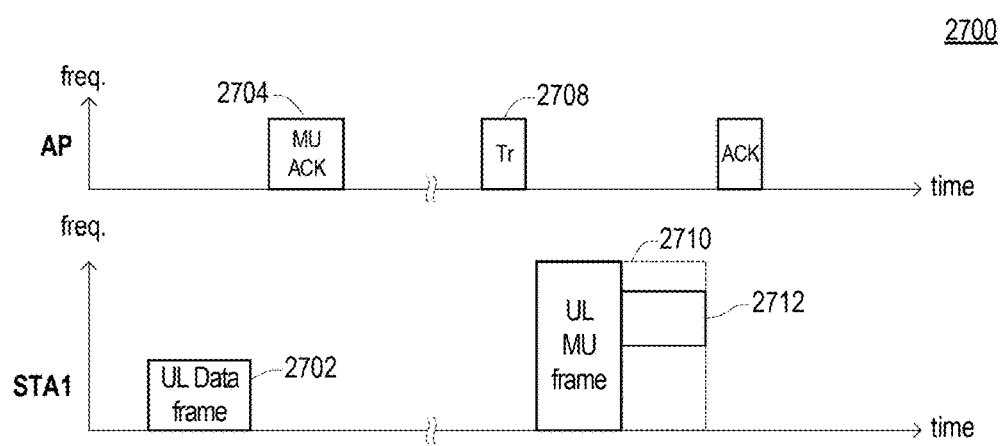
FIG. 27 illustrates a process wherein an AP uses a Multi-user Acknowledgement (MU-ACK) frame to communicate bandwidth allocation information, according to an embodiment.

FIG. 27 illustrates a process 2700 wherein an AP uses an MU-ACK frame 2704 to communicate bandwidth allocation information for an UL MU frame 2710, according to an embodiment. When a station STA1 has a payload for upload to the AP, an MU-ACK frame 2704 includes a reference to a Trigger frame 2708 that the AP subsequently sends and includes the bandwidth allocation or sub-band identification information for the UL MU frame 2710 that the station STA1 will send as a response to the Trigger frame 2708. The bandwidth allocation or sub-band identification corresponds to the bandwidths or sub-bands 2712 that the station STA1 is to use to transmit the payload in response to the Trigger frame 2708 with the above-mentioned reference. The Trigger frame reference in the MU-ACK frame 2704 may indicate an approximate time reference of the transmission of the Trigger frame 2708.

In embodiments, the AP transmits the MU-ACK frame 2704 to acknowledge frames other than a PS-Poll frame. In particular, in an embodiment the AP sends the MU-ACK frame 2704 to acknowledge one or more data frames 2702 while scheduling a subsequent UL MU transmission. For example, in an embodiment, the AP sends the MU-ACK frame 2704 instead of regular ACK to a station in order to (a) acknowledge the reception of the one or more data frames 2702 sent by the station, and (b) request the station to participate in an upcoming UL MU frame 2710.

When the AP requests the station to participate in the upcoming UL MU frame 2712, the AP provides a time reference and RU indication to the upcoming UL MU frame 2710 and provides, in the MU-ACK frame 2704, other information such as bandwidth allocation or sub-band identification to be used in the upcoming UL MU frame 2710. When the station STA1 participates in the transmission of the UL MU frame 2710, the station uses a bandwidth 2712 indicated in the MU-ACK frame 2704 to deliver the payload to the AP.

In an embodiment, an AP uses an MU-ACK frame 2704 instead of a Block Acknowledgement (BA) frame, in a similar manner as when the MU-ACK frame 2704 is used instead of an ACK.

In an embodiment, when an AP has used an MU-TIM indication in a previous Beacon frame to provide information about an upcoming DL MU frame, the AP sends an MU-ACK frame as a response to a station's PS-Poll frame to indicate to the station that a payload for the station is going to be in the upcoming DL MU frame (with a time reference to the frame and possibly the associated RU indication) or SU frame (with a time reference to the frame).

In an embodiment, when a station is an MU-enabled station or the station has indicated its readiness to participate in MU frames, the AP sends an MU-ACK frame as a response to a PS-Poll frame to indicate to the station that a payload for the station will be in an upcoming DL MU frame (with a time reference to the frame and possibly the associated RU indication) or SU frame (with a time reference to the frame). The station may indicate its readiness to participate in MU frames by setting a flag or via an information element.

In an embodiment, an AP uses an MU-ACK frame instead of an ACK or BA when the AP has instructed the station (through some other means) to expect an MU-ACK frame as the response to the next frame exchange.

Embodiments use a variable-length AID representation in an HE-SIG-B field of a DL MU frame to identify stations to reduce the length of the HE-SIG-B field.

Embodiments provide, using a Beacon frame, a response to a PS-Poll frame, or a response to another kind of UL frame, early indications of information pertaining to subsequent DL MU frame or UL MU frame exchanges in order to provide power savings and reduce transmission overhead.

In an embodiment, the bandwidth or resource-unit (RU) allocation for a DL MU PPDU is indicated in HE-SIG-B field, and when a large number of stations participate in a single MU session, the length of HE-SIG-B field can be very large. Therefore, it is important to compress the length of sub-channel allocation coding as much as possible.

Particularly, the structure of an HE-SIG-B field known in the art does not consider unassigned RUs. However, in an embodiment, an AP transmits a DL MU frame with some of the RUs unassigned due to, for example, a size of one or more payloads of the DL MU frame being small. The benefit of leaving an RU unassigned compared to filling the unassigned RU with dummy data is that when an RU is left unassigned, the power that would have been used to transmit that unassigned RU can be used to transmit the assigned RUs, hence providing a stronger signal to the stations receiving the assigned RUs.

Also, when a SIG-B field cannot indicate an unassigned RU, an AP fills the corresponding user-specific-info of the HE-SIG-B field with dummy data, which increases a length of the HE-SIG-B field unnecessarily.

Embodiments include processes for efficiently indicating, within an HE-SIG-B field of a frame, one or more unassigned RUs. Embodiments thereby avoid increasing the length of the HE-SIG-B field unnecessarily. In an embodiment, a station receiving the frame uses the unassigned RU indication to determine a number of user-specific sub-fields in the HE-SIG-B field and to decode the user-specific sub-fields.

In an embodiment, the AP uses otherwise unused states of the common-field of the HE-SIG-B field to indicate the most common cases in which an unassigned RU is present.

In another embodiment, the AP uses two reserved bits in Single User (SU) user-specific-info to indicate whether and how many unassigned RU exists after the current RU.

In another embodiment, the AP uses a structure for the content of the user-specific-info of the first unassigned RU in order to indicate any possible remaining unassigned RUs, hence avoiding having multiple user-specific-info for indicating multiple unassigned RUs.

In a structure for OFDMA proposed for the IEEE Std 802.11ax, each sub-band or a resource-unit (RU) may include one of 26, 52, 106, 242, 484, 996, and 2×996 tones. MU-MIMO, wherein from one to eight users simultaneously communicate using respective spatial streams in a same sub-band or RU, is allowed over a sub-band or RU if the number of tones in the sub-band or RU is greater than or equal to 106 tones. In other words, MU-MIMO and OFDMA is allowed for all RUs except those having a size of 26 or 52 tones.

Figures 28, 29:
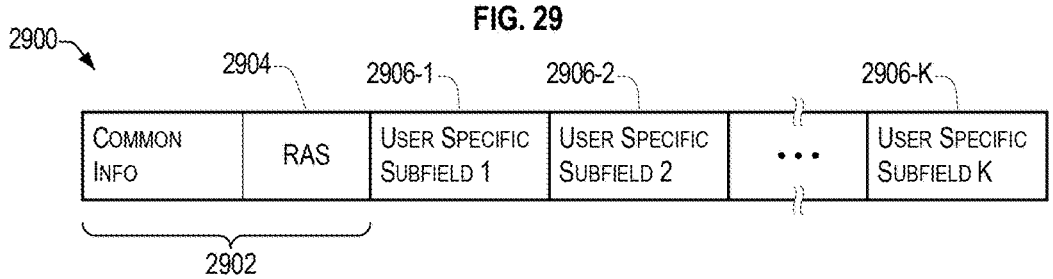
FIG. 28 shows an encoding of a Resource Allocation Set (RAS) sub-field of an of an HE-SIG-B field of a DL MU PPDU, according to an embodiment.
FIG. 29 illustrates an HE-SIG-B field according to an embodiment.

FIG. 28 shows an encoding of a Resource Allocation Set (RAS) sub-field of an of an HE-SIG-B field of a DL MU PPDU, according to an embodiment. Shaded RUs are RUs capable of MU-MIMO operation. Considering all combinations of RUs and of numbers of MU-MIMO users, for a 20 MHz PPDU, the number of possible combinations of RUs and number of user would be about 175 cases. 8 bits is sufficient to identify which of the 175 cases is present in an OFDMA frame.

The RAS sub-field indicates the RAS, the RAS being a pattern of RU arrangement in a frequency domain and a number of users for which payloads are carried in each allocated RU that is capable of MIMO-MU communications. In an embodiment, eight bits are used to indicate the RAS, and a common portion of the HE-SIG-B field carries the RAS sub-field.

For example, in the embodiment of FIG. 28, a resource assignment of 26 tone RUs to each of first to ninth stations is shown by (26, 26, 26, 26, 26, 26, 26, 26, 26) and is indicated by RAS=0. A resource assignment of a first 106 tone RU to a first station, a 26 tone RU to a third station, and a second 106 tone RUs to a third station, wherein each of the 106 tone RUs is not used for MU-MIMO operation, is shown as (106, 26, 106) and is indicated by RAS=16. When one or both of the 106 tone RUs are used for MU-MIMO, the RAS is set to one of the other values (64 in all, corresponding to 1 to 8 possible MU-MIMO streams for each of the 106 tone RUs) associated with the pattern (106, 26, 106). A resource assignment of a 242 tone RU to a station is indicated by setting the RAS to one of 144 to 151 according to a respective number of MU-MIMO streams of one to eight.

Although FIG. 28 shows particular values of the RAS being associated with particular patterns of RU arrangement and numbers of MU-MIMO streams, the codes shown are merely illustrative, and embodiments are not limited thereto.

In an embodiment, the RAS sub-field also indicates a number of user allocation sub-fields that follow the common portion of the HE-SIG-B field. The number of user allocation sub-fields corresponds to the number of RUs in a given instance of allocation. Since the middle sub-band with 26 tones (that is, the center 26-tone RU) is around the DC tones, its status of assignment is usually implied and assumed, and therefore for notational purposes whether the center 26-tone RU in the middle of the 20 MHz sub-channel is assigned is not explicitly indicated.

FIG. 29 illustrates an HE-SIG-B field 2900 according to an embodiment. The HE-SIG-B field 2900 includes a common info field 2902 and first to $K^{th}$ user-specific sub-fields 2906-1 to 2906-K. The common info field 2902 includes an RAS sub-field 2904. In an embodiment, the RAS sub-field 2904 is the same as the common info field 2902.

Following the RAS sub-field 2904, the user-specific sub-fields 2906-1 to 2906-K respectively include a station identification (such as an AID, a PAID, or a VLAID) indicating a station associated with an RU along with information that the associated station will need to decode data in the PPDU. The parsing of the content of the user-specific sub-fields 2906-1 to 2906-K differs depending on whether the corresponding RU is being used for an SU or an MU-MIMO communication. The size of the user-specific sub-fields 2906-1 to 2906-K is different for the RUs being used for SU communications compared to the RUs being used for MU-MIMO communications, because more bits are needed for the RUs being used for MU-MIMO communications.

In the HE-SIG-B field encoding according to an embodiment, all the RUs are assigned to at least one station, that is, that there are no unassigned RUs. However, in an embodiment, for some implementation or operational reasons, the AP from time to time does not assign a payload to one or more RUs.

In such cases, there are advantages to the AP leaving the unassigned RUs empty (that is, to transmitting no energy in the time period and bandwidth associated with each unassigned RU). For example, the AP may use the power that would have been used to transmit the unassigned RUs to instead boost the power of the assigned RUs, thus providing the stations with a higher chance of successful reception of their respective payloads.

In designs having no indication of unassigned RUs, the AP has to fill the user-specific sub-field of the unassigned RUs with dummy information, causing the HE SIG-B to be longer than necessary. The increase in length become larger when there are more unassigned RUs.

Embodiments include processes for indicating the presence of unassigned RUs, which processes reduce or eliminate the need for user-specific sub-fields with dummy information.

As mentioned above, in an embodiment, an RAS of eight bits is used in a 20 MHz sub-channel, as shown in FIG. 28. With 8 bits for the RAS, there are many values of the RAS left unused in FIG. 28 that may be assigned to the likely cases where an RU is left unassigned. For example, in the example shown in FIG. 28, there are 80 unused values of the RAS (values 176 to 255).

For example, consider the RAS for the pattern (26, 26, 26, 26, 26, 26, 26, 26) which indicates that each RU with 26 tones has a payload for a station, i.e. all the RUs are assigned and there is no unassigned RU. This notation refers to the RAS that starts with an RU with 26 tones and that has successive RUs each having tones.

When the RU allocation pattern is (26, 26,26, 26, 26,26, 26, 26) and one RU is unassigned, there are eight possible cases: (X, 26, 26, 26, 26, 26, 26, 26), (26, X, 26, 26, 26, 26, 26, 26), (26, 26, X, 26, 26, 26, 26, 26), (26, 26, 26, X, 26, 26, 26, 26), (26, 26, 26, 26, X, 26, 26, 26), (26, 26, 26, 26, 26, X, 26, 26), (26, 26, 26, 26, 26, 26, X, 26), and (26, 26, 26, 26, 26, 26, 26, X). Here, X indicates an unassigned RU. There could be 48 cases where two non-adjacent RUs are unassigned such as: (X, 26, X, 26, 26, 26, 26, 26), (X, 26, 26, X, 26, 26, 26, 26), (X, 26, 26, 26, X, 26, 26, 26), and so on.

When the RU allocation pattern is (52, 52, 52, 52), there are 4 cases where one RU is unused: (X, 52, 52, 52), (52, X, 52, 52), (52, 52, X, 52), (52, 52, 52,X), and 3 cases where two non-adjacent RUs are unassigned: (X,52,X,52), (X,52, 52,X), (52,X,52,X).

For all RU allocation patterns, there are 137 cases with one unassigned RU, and an even greater number with one or more unassigned RUs. In an embodiment using eight bits to index all RASs, while there are many unassigned states out of the 256 states possible to indicate with 8-bits, they are not enough to address all the cases with one unassigned RU, much less the cases with one or more unassigned RUs. Therefore, in some embodiments, the most practical and likely cases from all the one unassigned-RU cases are assigned to unused values of the RAS and indicated in the RAS sub-field of the common-info sub-field.

In some embodiments, the RAS cases that have less than a NSTA number of stations (for example, NSTA=6) are considered more practical. In this embodiment, some of the RAS states are assigned to the one unassigned-RU cases of such RAS cases. For instance, assume the cases where number of stations is less than seven, then the number of one unassigned RU arrangements of these cases is almost 90 and possible to be indexed by the remaining states.

In the following expressions of a RAS, for example, (26, 26, 52, 106), the middle sub-band with 26 tones (that is, the center 26-tone RU) of the 20 MHz bandwidth is not indicated in the following notations and its assignment status is known for the reasons given above. In the expressions, 26 indicates an RU with 26 tones, 52 indicates an RU with 52 tones, 106 indicates an RU with 106 tones, 242 indicates an RU with 242 tones, and 484 indicates an RU with 484 tones. An X indicates an unassigned RU in reference to the previously mentioned RAS case with fully assigned RUs.

In FIGS. 30 to 43, RAS values are shown for RAS patterns having one or more unassigned RUs, but embodiments are not limited to the values shown. Furthermore, in some embodiments, values shown that are contiguous in the illustrated embodiments are not actually contiguous.

In some embodiments, as shown in FIG. 30, some of the total 256 values that are assigned for RAS (in the RAS sub-field of an HE SIG-B field of a DL MU frame) are assigned to the cases of the pattern RAS=(52, 52, 106) wherein there is one unassigned RU. The value of $n_1$ is a design choice and may be any number greater than 0 such that $176+n_1+2$ is less than or equal to 255.

In some embodiments, as shown in FIG. 31, some states out of the total 256 states that are assigned for RAS are assigned to the cases of the pattern RAS=(52, 26, 26, 106) wherein there is one unassigned RU. The value of $n_2$ is a design choice and may be any number greater than 0 such that $176+n_2+3$ is less than or equal to 255.

In some embodiments, as shown in FIG. 32, some states out of the total 256 states that are assigned for RAS are assigned to the cases of the pattern RAS=(26, 26, 52, 106) wherein there is one unassigned RU. The value of $n_3$ is a design choice and may be any number greater than 0 such that $176+n_3+3$ is less than or equal to 255.

In some embodiments, as shown in FIG. 33, some states out of the total 256 states that are assigned for RAS are assigned to the cases of the pattern RAS=(26, 26, 26, 26, 106) wherein there is one unassigned RU. The value of $n_4$ is a design choice and may be any number greater than 0 such that $176+n_4+4$ is less than or equal to 255.

In some embodiments, as shown in FIG. 34, some of the total 256 values that are assigned for RAS (in the RAS sub-field of an HE SIG-B field of a DL MU frame) are assigned to the cases of the pattern RAS=(106, 52 52) wherein there is one unassigned RU. The value of $n_5$ is a design choice and may be any number greater than 0 such that $176+n_5+2$ is less than or equal to 255.

In some embodiments, as shown in FIG. 35, some of the total 256 values that are assigned for RAS are assigned to the cases of the pattern RAS=(106, 52, 26, 26) wherein there is one unassigned RU. The value of $n_6$ is a design choice and may be any number greater than 0 such that $176+n_6+3$ is less than or equal to 255.

In some embodiments, as shown in FIG. 36, some of the total 256 values that are assigned for RAS are assigned to the cases of the pattern RAS=(106, 26, 26, 52) wherein there is one unassigned RU. The value of $T_h$ is a design choice and may be any number greater than 0 such that $176+n_7+3$ is less than or equal to 255.

In some embodiments, as shown in FIG. 37, some of the total 256 values that are assigned for RAS are assigned to the cases of the pattern RAS=(106, 26, 26, 26, 26) wherein there is one unassigned RU. The value of $n_8$ is a design choice and may be any number greater than 0 such that $176+n_8+4$ is less than or equal to 255.

In some embodiments, as shown in FIG. 38, some of the total 256 values that are assigned for RAS are assigned to the cases of the pattern RAS=(26, 26, 52, 52, 52) wherein there is one unassigned RU. The value of $n_9$ is a design choice and may be any number greater than 0 such that $176+n_9+4$ is less than or equal to 255.

In some embodiments, as shown in FIG. 39, some of the total 256 values that are assigned for RAS are assigned to the cases of the pattern RAS=(52, 26, 26, 52, 52) wherein there is one unassigned RU. The value of $n_{10}$ is a design choice and may be any number greater than 0 such that $176+n_{10}+4$ is less than or equal to 255.

In some embodiments, as shown in FIG. 40, some of the total 256 values that are assigned for RAS are assigned to the cases of the pattern RAS=(52, 52, 26, 26, 52) wherein there is one unassigned RU. The value of $n_{11}$ is a design choice and may be any number greater than 0 such that $176+n_{11}+4$ is less than or equal to 255.

In some embodiments, as shown in FIG. 41, some of the total 256 values that are assigned for RAS are assigned to the cases of the pattern RAS=(52, 52, 52, 26, 26) wherein there is one unassigned RU. The value of $n_{12}$ is a design choice and may be any number greater than 0 such that $176+n_{12}+4$ is less than or equal to 255.

In some embodiments, as shown in FIG. 42, some of the total 256 values that are assigned for RAS are assigned to the cases of the pattern RAS=(52, 52, 26, 26, 26, 26) wherein there is one unassigned RU. The value of $n_{13}$ is a design choice and may be any number greater than 0 such that $176+n_{13}+5$ is less than or equal to 255.

In some embodiments, as shown in FIG. 43, some of the total 256 values that are assigned for RAS are assigned to the cases of the pattern RAS=(26, 26, 26, 26, 52, 52) wherein there is one unassigned RU. The value of $n_{14}$ is a design choice and may be any number greater than 0 such that $176+n_{14}+5$ is less than or equal to 255.

In other embodiments similar to those shown in FIGS. 30-44, some of the total 256 values that are assigned for RAS are assigned to one or more of the cases of RAS=(26, 26,52,26,26,52) with one unassigned RU, RAS=(52,26,26, 26,26,52) with one unassigned RU, and RAS=(26,26,52,52, 26,26) with one unassigned RU.

Two or more of the embodiments shown in FIGS. 30 to 43 and the like may be combined with the embodiment of FIG. 28 to produce an encoding for the RAS, provided that: 1) a total number of assigned RAS codes is less than or equal to 255, and 2) no RAS code is assigned to more than one RU allocation pattern.

In some embodiments, some of the total 256 values that are assigned for RAS are assigned to the cases of an RAS having a total number of stations within the RAS less than a predetermined number of stations NSTA and having one unassigned RU.

In some embodiments, some of the total 256 values that are assigned for RAS are assigned to the cases of an RAS that: 1) have a the total number of stations within the RAS less that a predetermined number of stations NSTA, 2) have a plurality of unassigned RUs, and 3) wherein the unassigned RUs are not adjacent to each other (are non-contiguous).

Figure 44:
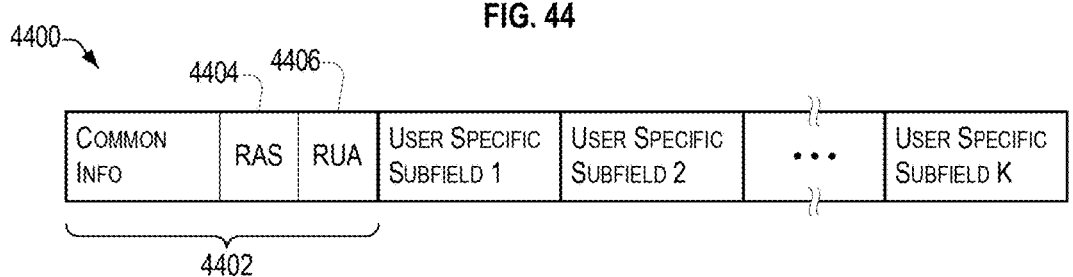
FIG. 44 shows an HE-SIG-B field according to an embodiment.

FIG. 44 shows an HE-SIG-B field 4400 according to an embodiment. The HE-SIG-B field 4400 includes a common info field 4402. The common info field 4402 includes a Resource Allocation Set (RAS) subfield 4404 and an RU Assignment (RUA) sub-field 4406. The RAS sub-field 4404 may be encoded as shown in FIG. 28. The RUA sub-field 4406 indicates which RUs are assigned and which ones are unassigned.

In an embodiments, the RUA sub-field 4406 includes an eight-bit bitmap that indicates whether RUs are assigned or unassigned. The eight-bit bitmap does not indicate whether a center RU of a 20 MHz bandwidth is assigned since the center RU is implicitly assigned.

In embodiment, each $n^{th}$ bit of the eight-bit bitmap indicates whether a corresponding $n^{th}$ RU indicates in the RAS, not including the center RU, is assigned. A bit having a first values (for example, a value of TRUE or 1) indicates that the corresponding RU is assigned, and the bit having a second value (for example, a value of FALSE or 0) indicates that the corresponding RU is not assigned.

In an embodiment, when the RAS indicates that less than 8 RUs (excluding the center RU) are assigned, the unused bits of the eight-bit bitmap are reserved.

Figure 45:
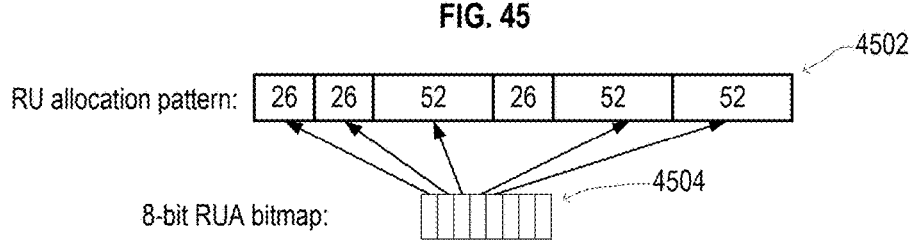
FIG. 45 illustrates an illustrative RAS pattern and an eight-bit bitmap indicating which of the RUs of the RAS pattern are assigned, according to an embodiment.

FIG. 45 illustrates an example of an RAS pattern 4502 and an eight-bit bitmap 4504 according to an embodiment. The eight-bit bitmap 4504 indicates whether the RUs of the RAS pattern 4502 are assigned.

Specifically, a first bit of the eight-bit bitmap 4504 indicates whether a first (26 tone) RU of the RAS pattern 4502 is allocated. A second bit of the eight-bit bitmap 4504 indicates whether a second (26 tone) RU of the RAS pattern 4502 is allocated. A third bit of the eight-bit bitmap 4504 indicates whether a third (52 tone) RU of the RAS pattern 4502 is allocated.

A fourth bit of the eight-bit bitmap 4504 indicates whether a fourth (52 tone) RU, not counting the center RU, of the RAS pattern 4502 is allocated. A fifth bit of the eight-bit bitmap 4504 indicates whether a fifth (52 tone) RU, not counting the center RU, of the RAS pattern 4502 is allocated.

Figure 46:
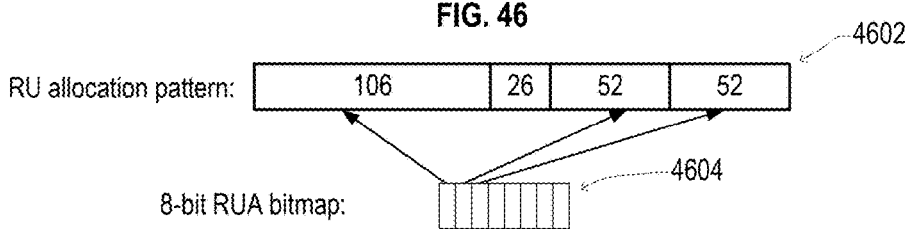
FIG. 46 illustrates another illustrative RAS pattern and an eight-bit bitmap indicating which of the RUs of the RAS pattern are assigned, according to an embodiment.

FIG. 46 illustrates another example of an RAS pattern 4602 and an eight-bit bitmap 4604 according to an embodiment. The eight-bit bitmap 4604 indicates whether the RUs of the RAS pattern 4602 are assigned.

Specifically, a first bit of the eight-bit bitmap 4604 indicates whether a first (106 tone) RU of the RAS pattern 4602 is allocated. The center (26 tone) RU is implicitly assigned.

A second bit of the eight-bit bitmap 4604 indicates whether a second (52 tone) RU, not counting the center RU, of the RAS pattern 4602 is allocated. A third bit of the eight-bit bitmap 4604 indicates whether a third (52 tone) RU, not counting the center RU, of the RAS pattern 4602 is allocated.

In another embodiment, the RUA sub-field includes a nine-bit bitmap that indicates whether RUs, including the center RU of the 20 MHz bandwidth, are assigned or unassigned.

In an embodiment, when the RAS indicates that less than 9 RUs (including the center RU) are assigned, the unused bits of the nine-bit bitmap are reserved.

Figure 47:
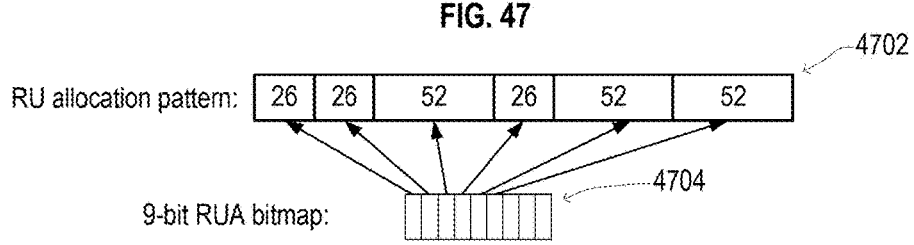
FIG. 47 illustrates an illustrative RAS pattern and a nine-bit bitmap indicating which of the RUs of the RAS pattern are assigned, according to an embodiment.

FIG. 47 illustrates an example of an RAS pattern 4702 and a nine-bit bitmap 4704 according to an embodiment. The nine-bit bitmap 4704 indicates whether the RUs of the RAS pattern 4702 are assigned.

Specifically, a first bit of the nine-bit bitmap 4704 indicates whether a first (26 tone) RU of the RAS pattern 4702 is allocated. A second bit of the nine-bit bitmap 4704 indicates whether a second (26 tone) RU of the RAS pattern 4702 is allocated. A third bit of the nine-bit bitmap 4704 indicates whether a third (52 tone) RU of the RAS pattern 4702 is allocated. The center (26 tone) RU is implicitly assigned.

A fourth bit of the nine-bit bitmap 4704 indicates whether a fourth (26 tone center) RU of the RAS pattern 4702 is allocated. A fifth bit of the nine-bit bitmap 4704 indicates whether a fifth (52 tone) RU of the RAS pattern 4702 is allocated. A sixth bit of the nine-bit bitmap 4704 indicates whether a sixth (52 tone) RU of the RAS pattern 4702 is allocated.

Figure 48:
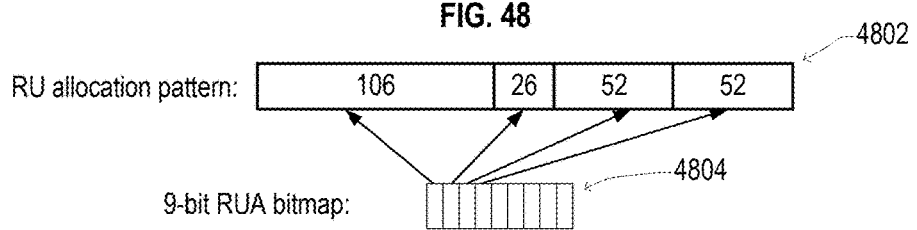
FIG. 48 illustrates another illustrative RAS pattern and a nine-bit bitmap indicating which of the RUs of the RAS pattern are assigned, according to an embodiment.

FIG. 48 illustrates another example of an RAS pattern 4802 and a nine-bit bitmap 4804 according to an embodiment. The nine-bit bitmap 4804 indicates whether the RUs of the RAS pattern 4802 are assigned.

Specifically, a first bit of the nine-bit bitmap 4804 indicates whether a first (106 tone) RU of the RAS pattern 4802 is allocated. A second bit of the nine-bit bitmap 4804 indicates whether a second (26 tone center) RU of the RAS pattern 4802 is allocated.

A third bit of the nine-bit bitmap 4804 indicates whether a third (52 tone) RU of the RAS pattern 4802 is allocated. A fourth bit of the nine-bit bitmap 4804 indicates whether a fourth (52 tone) RU of the RAS pattern 4802 is allocated.

In an embodiment, the RUA sub-field 4406 has less than eight bits, and each value of the RUA sub-field 4406 indicates a specific RU is unassigned.

For example, FIG. 49 illustrates an RUA in an embodiment wherein the sub-field 4406 has three bits, an RUA value of zero indicates that there is no unassigned RU, and other values N of the RUA indicates that an $N^{th}$ RU indicated in the RAS is unassigned.

FIG. 49 provides two examples of interpretation of the RUA value for each of two RU allocation patterns according to an embodiment. A first RU allocation pattern 4902 has a corresponding interpretation of RUA values shown in Table 24 of FIG. 49. A second RU allocation pattern 4904 has a corresponding interpretation of RUA values shown in Table 25.

In the embodiment shown in FIG. 49, whether the center (26 tone) RU is assigned is not indicated in the RAS or in the RUA, and numbering of the RUs in the RAS skips the center RU, but embodiments are not limited thereto. For example, FIG. 50 illustrates an RU allocation pattern 5002 and a corresponding interpretation of RUA values shown in Table 26, according to an embodiment.

In another embodiment, the RUA sub-field has four bits. In addition to the indications described with respect to the embodiment illustrates in FIG. 49 or the embodiment illustrated in FIG. 50, some values of the RUA are used to indicate selected cases wherein more than one RU is unassigned (such as when two unassigned RUs).

In another embodiment, the RUA sub-field has two bits, and RUA values of zero, one, two, and three respectively indicate that there is no unassigned RU, that the first RU of the RAS is unassigned, that second RU of the RAS is unassigned, and that the third RUs of the RAS is unassigned.

Figure 51:
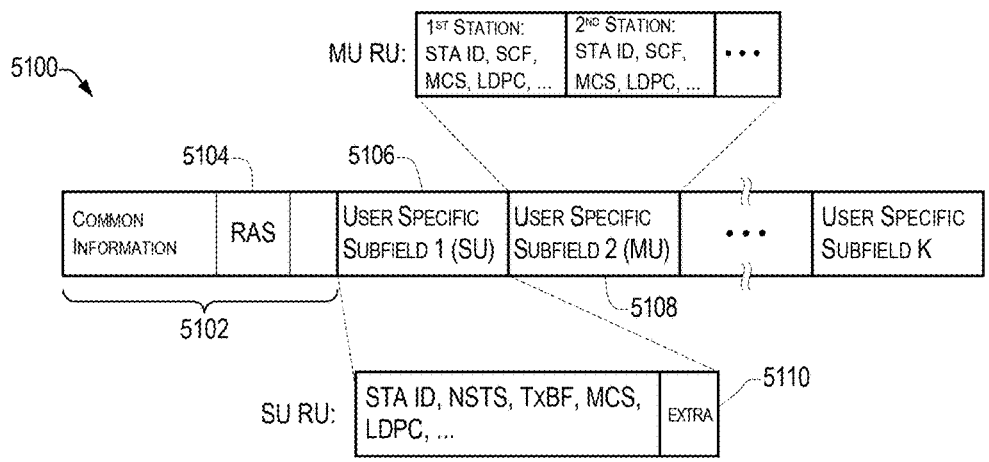
FIG. 51 illustrates an HE-SIG-B field according to an embodiment.

FIG. 51 illustrates an HE-SIG-B field 5100 according to an embodiment. The HE-SIG-B field 5100 includes a common info field 5102 and first and second user-specific sub-fields 5106 and 5108. The common info field 5102 includes a Resource Allocation Set (RAS) sub-field 5104. In the HE-SIG-B field 5100, unassigned RUs are indicated using the user-specific sub-fields 5106 and 5108.

Each user specific field contains information for a station scheduled in an MU-PPDU including the HE-SIG-B field 5100.

The first user-specific sub-field 5106 corresponds to an RU allocated for a Single User (SU) communication. The first user-specific sub-field 5106 includes an identifier of a station and indications of a Number of Spatial Streams (NSTS), transmit beamforming (TxBF), a Modulation and Coding Scheme (MCS), and whether Low Density Parity Coding (LDPC) is used.

The second user-specific sub-field 5108 corresponds to an RU allocated for a Multi-User-MIMO (hereinafter, an MU) communication. For each station participating in the MU communication, the second user-specific sub-field 5108 includes an identifier of the station, Spatial Configuration Fields (SCF), an MCS indication and an LDPC indication.

In some embodiments, a number of bits needed to convey the information described above of the first user-specific (SU) sub-field 5106 is less that a number of bits needed to convey the information described above of the second user-specific (MU) sub-field 5108. As a result, when the first user-specific (SU) sub-field 5106 has a same length as the second user-specific (MU) sub-field 5108, extra bits are available in the first user-specific (SU) sub-field 5106, which extra bits are referred to herein as an extra sub-field 5110 of the first user-specific sub-field 5106.

In some embodiment, there are two bits in the extra sub-field 5110 and the two bits are used to indicate whether the 0, 1, 2, or 3 next RUs, as indicated in the RAS sub-field 5104, are unassigned. Each SU user-specific sub-field in the HE-SIG-B field 5100 uses two the bits in the SU user-specific sub-field's respective extra sub-field to indicate whether there is an unassigned RU following the RU that the user-specific sub-field corresponds to (that is, following the reference RU). Depending on the size of the extra subfield 5110, one or more user-specific subfield associated with the RUs immediately before the unassigned RU indicate the information about the unassigned RU. If the first RU indicated in a RAS is unassigned, a dummy per-user specific field is carried in HE SIG-B.

In an embodiment, the two bits having a first value (e.g., 00) indicates that there is not an unassigned RU immediately after the reference RU. The two bits having a second value (e.g., 01) indicates that there is one unassigned RU immediately after the reference RU. The two bits having a third value (e.g., 10) indicates that there are two consecutive unassigned RUs immediately after the reference RU. The two bits having a fourth value (e.g., 11) indicates that there are three consecutive unassigned RUs immediately after the reference RU.

In another embodiment, one bit in the extra sub-field 5110 is used to indicate whether a subsequent RU is assigned or unassigned. The bit having a first value (e.g., 0) indicates that there is not an unassigned RU immediately after the reference RU. The bit bits having a second value (e.g., 1) indicates that there is an unassigned RU immediately after the reference RU.

In some embodiments, wherein the extra sub-field 5110 includes two bits, the two bits within the extra sub-field of the user-specific sub-field of each of the SU RUs of a given RAS are set to same bit values. In some embodiments, this same bit value indicates which of the SU RUs of the said RAS are left unassigned.

A first value of the two bits of each extra sub-field 5110, such as zero value, indicates that there is no unassigned RU among all the RUs listed by a RAS. A second value of the two bits indicates that a first RU among all the RUs listed by a RAS is an unassigned RU. A third value of the two bits indicates that a second RU among all the RUs listed by a RAS is an unassigned RU. A fourth value of the two bits indicates that a third RU among all the RUs listed by a RAS is an unassigned RU.

In some embodiments, the extra sub-field 5110 of each of the SU user-specific sub-fields 5106 of the HE-SUG-B field 5100 has three bits. The three bits of the extra sub-field 5110 of each of the SU user-specific sub-field are set to a same three-bit value.

In some embodiments, this three-bit value indicates which of the SU RUs of the said RAS are left unassigned. In such cases, a station that decodes HE SIG-B field obtains the bits obtained from the "extra sub-field" and interprets the arrangement of the RUs in the indicated RAS accordingly. For example, in an embodiment the station uses the process 5200 shown in FIG. 52 to determine which RUs correspond to which user-specific sub-fields.

In an embodiment, a first three-bit value of the extra sub-field 5110 (for example, 000) indicates that there is no unassigned RU among all the RUs listed in the RAS. Other three-bit values of the extra sub-field 5110 respective indicate that a given RU (such as the first, second, third, fourth, fifth, sixth or seventh RU) is an unassigned RU among all the RUs listed in the indicated RAS.

In an embodiment, for a given RAS, three-bit values of the extra sub-field 5110 without a corresponding RU in the RAS are reserved. For example, when the RAS indicates an allocation having only four RUs, three-bit values that would correspond to a fifth, sixth, or seventh RU are reserved. In an embodiment, when a station determines that the three-bit value of the extra sub-field 5110 is a reserved value of the RAS, the station takes no additional action beyond what the obtained RAS value indicates.

In some embodiments, an interpretation of the extra sub-field 5110 is applied for a given set of RAS values, and the extra sub-field 5110 is reserved for other RAS values. For instance, in an embodiment, an interpretation of the extra sub-field 5110 is applied only for RAS values that indicate a number of resources in a RAS that is lower than a predetermined number of stations value NSTA.

For example, in an embodiment, an interpretation of the extra sub-field 5110 is applicable only to an RAS that have four or fewer allocated. In another embodiment, another interpretation of the extra sub-field 5110 is applicable only to an RAS that has five or less allocated resources (in addition to the implicitly assigned middle 26-tone resource).

In some embodiments, the extra sub-field 5110 has a size of one bit. The extra sub-field 5110 in all the SU user-specific sub-fields is set to a first value (for example, zero) to indicate that there is no unassigned RU, and it is set to a second value (for example, one) to indicate that there is one unassigned RU. When a station determines that the extra sub-field 5110 has the second value, the station determines that there is one fewer user-specific sub-field in the HE-SIG-B field than is indicated in the RAS field 5104.

In some embodiments, the extra sub-field 5110 has a size of two bits. The extra sub-field 5110 in all the SU user-specific sub-fields is set to a first value (for example, zero) to indicate that there is no unassigned sub-band, and it is set to a second, third, or fourth value (for example, one, two, or three) to respectively indicate that there is 1, 2, or 3 unassigned sub-band. When a station determines that the extra sub-field 5110 has the second, third, or fourth value, respectively, the station determines that there is respectively one, two, or three fewer user-specific sub-field in the HE-SIG-B field than is indicated in the RAS field 5104.

Figure 52:
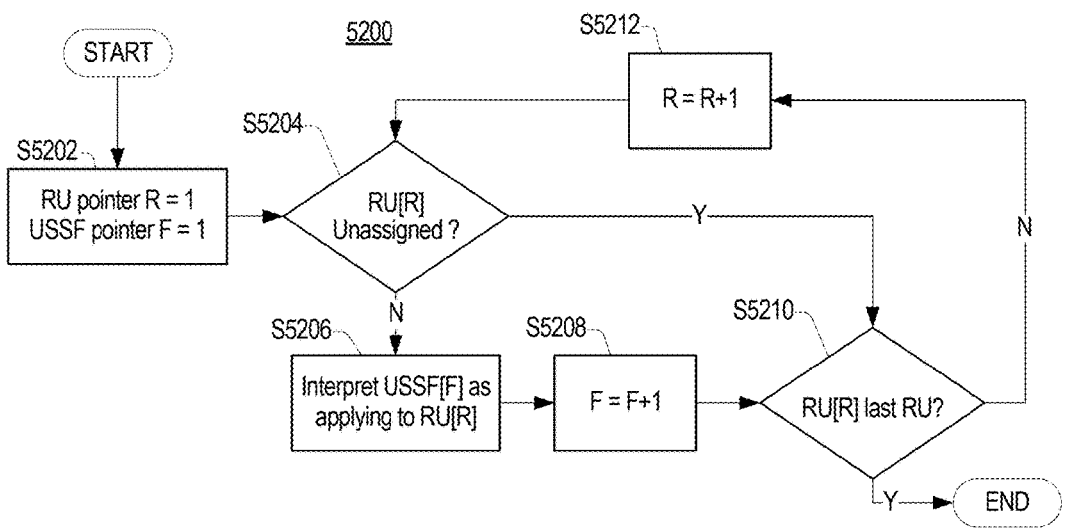
FIG. 52 illustrates a process for interpreting user-specific fields of an HE-SIG-B field according to an embodiment.

FIG. 52 illustrates a process 5200 for interpreting user-specific fields of an HE-SIG-B field according to an embodiment. A station performs the process 5200 when the station receives an MU frame (OFDMA, MIMO, or both) that includes the HE-SIG-B field.

In an embodiment, the station determines whether one or more RUs in the MU frame are unassigned using information in an extra sub field of one or more user-specific fields in the HE-SIG-B field.

In another embodiment, the station determines whether one or more RUs in the MU frame are unassigned using information in a common info field of the HE-SIG-B field.

At S5202, the process 5200 initializes an RU pointer R to indicate a first RU, and initializes a User-Specific Sub-Field (USSF) pointer F to indicate a first USSF. In an embodiment, the RU pointer R having a value N indicates an $N^{th}$ RU indicated by an RAS sub-field of the HE-SIG-B field. In an embodiment, the USSF pointer F having a value X indicates an $X^{th}$ USSF of the HE-SIG-B field.

At S5204, the process 5200 determines whether the RU indicated by the RU pointer R (RU[R]) is an unassigned RU. When the RU[R] is unassigned, the process 5200 proceeds to S5210. Otherwise, at S5204 the process 5200 proceeds to S5206.

At S5206, the process 5200 interprets the USSF indicated by the USSF pointer F (USSF[F]) as applying to (that is, carrying the attributes of) the RU indicated by the RU pointer R (RU[R]).

At S5208, the process 5200 updates the USSF pointer F to indicate the next USSF in the HE-SIG-B field.

At S5210, the process 5200 determines whether the RU indicated by the RU pointer R (RU[R]) is the last RU of the RAS sub-field of the HE-SIG-B field. When the RU[R] is the last RU, the process 5200 ends. Otherwise, at S5210 the process 5200 proceeds to S5212.

At S5212, the process 5200 updates the RU pointer R to indicate the next RU indicated by an RAS sub-field of the HE-SIG-B field.

Although the process 5200 is illustrated as being performed using specific actions and data structures, embodiments are not limited thereto, and the results produced by the process 5200 may be produced using other equivalent processes.

In embodiments, a first user-specific sub-field of the HE-SIG-B field includes respective indications that a plurality of RUs are unassigned.

An AP may determine that a plurality of RUs in a frame will be unassigned. For example, when the RAS that indicates a bandwidth allocation pattern of 26, 26, 26, 26, 26, 26, 26, 26 (not including the indication for the middle 26-tone RU), more than one of the RUs may be unassigned. In embodiments, one user-specific sub-field of the HE-SIG-B of a frame indicates all of the unassigned RUs in the frame.

In one embodiment, a user-specific sub-field of a first unassigned RU carries the information that indicates any subsequent unassigned RUs. The user-specific sub-field of the first unassigned RU has a reserved value in a known location of bits, wherein the reserved value identifying the user-specific sub-field as corresponding to an unassigned RU. Known locations of bits in the user-specific sub-field include a station identifier location, an MCS indication location, and so on.

For example, in an embodiment, an MCS field of the user-specific sub-field having a value of 1111 indicates that the user-specific sub-field corresponds to a first unassigned RU. The MCS field appears in a known location within the user-specific sub-field. Other bits in the user-specific sub-field having the MCS field with the value 1111 are used to indicate information regarding other unassigned RUs in the frame, if any, such as a number of unassigned RUs, which RUs of the RUs indicated in the RAS are unassigned, and so on.

Embodiments include processed for efficiently indicating one or more unassigned RU within an HE SIG-B field, hence avoiding an unnecessarily long HE-SIG-B field.

In an embodiment, otherwise unused values of the common-field of the HE-SIG-B field, such as otherwise unused values of an RAS sub-field, indicate common cases of bandwidth allocations having one or more unassigned RUs.

In an embodiment, extra bits in user-specific sub-fields corresponding to one or more RUs which are scheduled for respective Single User (SU) communications indicate information about the presence or location of unassigned RUs.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of the next amendment of IEEE 802.11. Furthermore, some embodiments have been described with respect to a secondary channel, but embodiments are not limited thereto.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by an Access Point (AP) for performing a Multi-User (MU) transmission, the method comprising:
   determining, by the AP, an allocation of Resource Units (RUs) of a first bandwidth of an MU frame, including determining that a first RU of the MU frame is not allocated to a station in the MU transmission;
   determining, by the AP, a value of a first RU Allocation Subfield according to the allocation of the RUs of the MU frame, the value of the first RU Allocation Subfield indicating that the first RU is not allocated;
   generating, by the AP, a first High Efficiency Signal B (HE-SIG-B) field, wherein generating the first HE-SIG-B field comprises providing the first RU Allocation Subfield in a common info field of the first HE-SIG-B field and providing a plurality of user-specific subfields in the first HE-SIG-B field;
   generating, by the AP, the MU frame, wherein generating the MU frame includes providing the first HE-SIG-B field in the MU frame; and
   transmitting, by the AP, the MU frame over a wireless channel,
   wherein the first RU Allocation Subfield provides an indication of a number of user-specific subfields in the first HE-SIG-B field.

2. The method of claim 1, wherein the MU frame is an 80 MHz frame, the first bandwidth is 2 MHz, and the first RU is a middle 26 tones in between a first set of 484 tones of the MU frame and a second set of 484 tones of the MU frame.

3. The method of claim 2, wherein the first RU Allocation Subfield includes a single bit to indicate that the first RU is not allocated to a station in the MU transmission,
   wherein the first HE-SIG-B is included in a first 20 MHz of the MU frame,
   wherein the first bandwidth is outside the first 20 MHz, and
   wherein the first RU Allocation Subfield further indicates an allocation of RUs within the first 20 MHz.

4. The method of claim 3, further comprising:
   determining, by the AP, an allocation of RUs of a second 20 MHz of the MU frame; and
   determining, by the AP, a value of a second RU Allocation Subfield according to the allocation of the RUs of the second 20 MHz and the single bit to indicate that the first RU is not allocated to a station in the MU transmission,
   wherein generating the MU frame includes providing, in the second 20 MHz, a second HE-SIG-B field, the second HE-SIG-B field including the second RU Allocation Subfield.

5. The method of claim 1, wherein the first bandwidth is 20 MHz and the first HE-SIG-B field is provided in the first bandwidth of the MU frame, the method further comprising:
   determining, by the AP, an allocation of RUs of a second bandwidth of the MU frame, wherein the second bandwidth is 20 MHz;
   determining, by the AP, a value of a second RU Allocation Subfield according to the allocation of the RUs of the second bandwidth,
   wherein generating the MU frame includes providing, in the second bandwidth, a second HE-SIG-B field, the second HE-SIG-B field including the second RU Allocation Subfield.

6. The method of claim 5, further comprising:
   determining, by the AP, that a second RU of the second bandwidth is not allocated to a station in the MU transmission,
   wherein the value of the second RU Allocation Subfield indicates that the second RU is not allocated.

7. The method of claim 1, wherein the first bandwidth is 20 MHz, the first RU is a middle 2 MHz in the first bandwidth, the first HE-SIG-B field is provided in the first bandwidth of the MU frame, and values of one or more bits in the first RU Allocation Subfield, located in the first HE-SIG-B field, indicate that the first bandwidth is unassigned.

* * * * *